(12) United States Patent
Kondo et al.

(10) Patent No.: US 8,102,333 B2
(45) Date of Patent: Jan. 24, 2012

(54) DISPLAY DEVICE SECURING MECHANISM AND DISPLAY SYSTEM THAT ROTATES DISPLAY DEVICES AROUND A ROTATIONAL AXIS

(75) Inventors: Tetsujiro Kondo, Tokyo (JP); Keiichi Totsuka, Tokyo (JP); Haruo Oba, Kanagawa (JP); Junichiro Sakata, Tokyo (JP); Yasushi Tatehira, Kanagawa (JP); Naohide Yamada, Tokyo (JP); Kazutaka Uchida, Tokyo (JP); Yoshinori Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1372 days.

(21) Appl. No.: 11/404,890

(22) Filed: Apr. 17, 2006

(65) Prior Publication Data

US 2006/0256035 A1 Nov. 16, 2006

(30) Foreign Application Priority Data

Apr. 28, 2005 (JP) ................. 2005-132067
Apr. 28, 2005 (JP) ................. 2005-132068

(51) Int. Cl.
*G09G 5/00* (2006.01)
*G09G 3/34* (2006.01)
*H04N 5/64* (2006.01)
*H05K 5/00* (2006.01)
*H05K 7/00* (2006.01)

(52) U.S. Cl. ......... 345/1.3; 345/1.1; 345/108; 345/903; 345/905; 348/836; 348/839; 348/840; 248/917; 248/919; 361/679.01; 361/679.02; 361/679.04; 361/679.06

(58) Field of Classification Search ............... 345/1.1–9, 345/108–111, 903, 905; 348/836–840; 248/917–924; 361/679.01–679.07
See application file for complete search history.

(56) References Cited

U.S. PATENT DOCUMENTS

| 5,128,662 | A  | * | 7/1992  | Failla ................... 345/903 |
| 6,189,842 | B1 | * | 2/2001  | Bergeron Gull et al. .. 248/125.1 |
| 6,275,376 | B1 | * | 8/2001  | Moon ..................... 345/168 |
| 6,919,864 | B1 | * | 7/2005  | Macor ..................... 345/1.1 |
| 7,246,780 | B2 | * | 7/2007  | Oddsen, Jr. ............... 248/917 |
| 7,446,757 | B2 | * | 11/2008 | Mochizuki et al. ......... 345/905 |
| 7,516,924 | B2 | * | 4/2009  | White et al. .............. 248/917 |
| 2002/0135535 | A1 | * | 9/2002 | Muller .................... 345/1.1 |
| 2003/0210347 | A1 |   | 11/2003 | Kondo |

FOREIGN PATENT DOCUMENTS

CN 1411573 A 4/2003

(Continued)

OTHER PUBLICATIONS

Office Action issued Apr. 26, 2011, in Japanese Patent Application No. 2005-132067.

*Primary Examiner* — Bipin Shalwala
*Assistant Examiner* — Ryan A Lubit
(74) *Attorney, Agent, or Firm* — Oblon, Spivak, McClelland, Maier & Neustadt, L.L.P.

(57) ABSTRACT

A display device securing mechanism to which a plurality of display devices that are linearly disposed are mountable includes a plurality of housings to which the plurality of display devices are mounted, first rotating members which rotate the corresponding housings around a rotational axis extending vertically with respect to the display devices, and a second rotating member which rotates all of the housings together.

12 Claims, 39 Drawing Sheets

FOREIGN PATENT DOCUMENTS

| | | |
|---|---|---|
| JP | 8-223514 | 8/1996 |
| JP | 10-333631 | 12/1998 |
| JP | 2000-20042 | 1/2000 |
| JP | 2000-242248 | 9/2000 |
| JP | 2000-276099 | 10/2000 |
| JP | 2003-195843 | 7/2003 |
| JP | 2003-280624 | 10/2003 |
| JP | 2006-171520 | 6/2006 |
| WO | WO 01/37070 A2 | 5/2001 |

* cited by examiner

DISPLAY DEVICE SECURING MECHANISM AND DISPLAY SYSTEM THAT ROTATES DISPLAY DEVICES AROUND A ROTATIONAL AXIS

CROSS REFERENCES TO RELATED APPLICATIONS

The present invention contains subject matter related to Japanese Patent Application JP 2005-132068 and Japanese Patent Application JP 2005-132067, both of which were filed in the Japanese Patent Office on Apr. 28, 2005, the entire contents of which are incorporated herein by reference.

BACKGROUND OF THE INVENTION

1. Field of the Invention

The present invention relates to a display device securing unit and a display system. More particularly, the present invention relates to a display device securing unit and a display system, which can provide a multi-television system which can flexibly change a display structure.

The present invention also relates to a display device and method, a recording medium, and a program. More particularly, the present invention also relates to a display device and method, a recording medium, and a program, which can facilitate determination of another display device in a multi-television system.

2. Description of the Related Art

A multi-television system having a plurality of displays (televisions) disposed horizontally or vertically is available. This multi-television system is used, for example, when watching and listening to different channels at the same time or watching at the same time images which have been picked up at different predetermined intervals and then which have been arranged in a time series.

The applicant has previously proposed a scalable multi-television system as a multi-television system (refer to, for example, Japanese Unexamined Patent Application Publication No. 2003-195843). The scalable multi-television system makes it possible to change the number of displays disposed in rows and columns.

FIG. 1 shows a multi-television system 1 in which, for example, a total of nine displays (televisions) are disposed in three rows and three columns.

The related multi-television system 1 is secured to a housing 4 so that nine displays 2a to 2i face the same side. Therefore, although the number of displays used to form the multi-television system 1 can be arbitrarily determined at the stage of designing the multi-television system 1, the number of displays cannot be changed after manufacturing the multi-television system 1.

In addition, since, in the multi-television system 1, the nine displays 2a to 2i face the same side, when, for example, the multi-television system 1 is installed so that a user 3a in a living room can watch and listen to the displays 2a and 2i as shown in FIG. 1, a user 3b in a dining room situated opposite to the living room with the multi-television system 1 in between cannot watch and listen to the displays 2a to 2i of the multi-television system 1.

FIG. 2 shows a multi-television system in which a total of 16 televisions are disposed in four rows and four columns. The multi-television system shown in FIG. 2 includes 16 televisions $202_{11}$, $202_{12}$, $202_{13}$, $202_{14}$, $202_{21}$, $202_{22}$, $202_{23}$, $202_{24}$, $202_{31}$, $202_{32}$, $202_{33}$, $202_{34}$, $202_{41}$, $202_{42}$, $202_{43}$, and $202_{44}$. Here, the suffix $_{ij}$ in television $202_{ij}$ indicates an ith row and a jth column (ith row from the top and jth column from the left) in the multi-television system. When the televisions $202_{ij}$ do not need to be particularly distinguished, they will be referred to as the "televisions 202."

For example, in the multi-television system, when one image is displayed by all of the televisions 202 that are connected together, an image that each television 202 displays is changed depending upon where the televisions 202 are disposed in the entire multi-television system. To achieve this, the following method may be used. In this method, a predetermined one of the 16 televisions 202 of the multi-television system is made to serve as a controlling device for controlling the entire multi-television system (16 televisions 202), and this television 202 serving as the controlling device provides information regarding the locations of the televisions 202 in the entire multi-television system to the other televisions 202 serving as non-controlling devices.

Here, the following method for connecting wires (signal wires) which connect the 16 televisions $202_{ij}$ (i=1 to 4 and j=1 to 4) together may be used. In this method, as shown in FIG. 3, the bottom leftmost television $202_{41}$, serving as the controlling device among the 16 televisions 202, is connected to the remaining televisions 202.

In other words, in FIG. 3, the television $202_{11}$ and the television $202_{41}$ are connected to each other by a cable $211_{11}$, the television $202_{21}$ and the television $202_{41}$ are connected to each other by a cable $211_{21}$, and the television $202_{31}$ and the television $202_{41}$ are connected to each other by a cable $211_{31}$. In addition, the television $202_{12}$ and the television $202_{41}$ are connected to each other by a cable $211_{12}$, the television $202_{22}$ and the television $202_{41}$ are connected to each other by a cable $211_{22}$, the television $202_{32}$ and the television $202_{41}$ are connected to each other by a cable $211_{32}$, and the television $202_{42}$ and the television $202_{41}$ are connected to each other by a cable $211_{42}$.

Further, the television $202_{13}$ and the television $202_{41}$ are connected to each other by a cable $211_{13}$, the television $202_{23}$ and the television $202_{41}$ are connected to each other by a cable $211_{23}$, the television $202_{33}$ and the television $202_{41}$ are connected to each other by a cable $211_{33}$, and the television $202_{43}$ and the television $202_{41}$ are connected to each other by a cable $211_{43}$.

Similarly, the television $202_{14}$ and the television $202_{41}$ are connected to each other by a cable $211_{14}$, the television $202_{24}$ and the television $202_{41}$ are connected to each other by a cable $211_{24}$, the television $202_{34}$ and the television $202_{41}$ are connected to each other by a cable $211_{34}$, and the television $202_{44}$ and the television $202_{41}$ are connected to each other by a cable $211_{44}$.

In the connecting method shown in FIG. 3, connectors and the wires, used for connecting the non-controlling televisions 202 to the controlling television 202, are concentrated at a particular location. This makes it difficult to mount a large number of connectors to the controlling television 202, thereby limiting the number of non-controlling televisions 202 that can be connected to the controlling television, that is, limiting the number of televisions 202 used to form the multi-television system.

SUMMARY OF THE INVENTION

As can be understood from the foregoing description, even if the related multi-television system includes a plurality of displays, after determining its structure once, the structure cannot be changed, thereby limiting the number of ways in which the multi-television system can be watched and listened to by using a plurality of displays. As a result, the structure of the multi-television system is not flexibly changed.

Accordingly, it is desirable to provide a multi-television system which makes it possible to flexibly change a display structure.

It is desirable that the number of displays is not limited when it is possible to flexibly change the display structure. In addition, it is desirable that televisions of the multi-television system be easily connected to each other through wires and that, when the number of televisions of the multi-television system is changed, each television easily recognize this change.

Further, it is desirable that another display device of the multi-television system be easily recognized.

According to a first embodiment of the present invention, there is provided a display device securing mechanism including a plurality of housings to which a plurality of display devices are mounted, first rotating members which rotate the corresponding housings around a rotational axis extending vertically with respect to the display devices, and a second rotating member which rotates all of the housings together.

In a first form, the display device securing mechanism further includes a securing member which secures the display device securing mechanism to another display device securing mechanism adjacent thereto.

In a second form, the display device securing mechanism further includes a cylindrical member which is axially disposed in the plurality of housings in a direction in which the plurality of housings are disposed in a line. The cylindrical member has a wire disposed along an inner side thereof, the wire being connected to each of the plurality of display devices and being used to supply an image or a sound signal and electrical power that is supplied to the plurality of display devices.

In a third form based on the second form, the cylindrical member has openings in the corresponding housings for bringing out the wire which is connected to each display device and used for supplying the signal and the electrical power.

In a fourth form, the display device securing mechanism further includes electrically conductive members each disposed in the corresponding housing and having a cylindrical shape that is coaxial with a rotary shaft of the corresponding housing. Each electrically conductive member comes into contact with a wire at an inner side of the cylindrical shape and with a signal input terminal or a power-supply-receiving terminal of the corresponding display device at an outer side of the cylindrical shape. The wire is connected to each display device and used for supplying an image or a sound signal and electrical power which is supplied to each display device.

In a fifth form, the display device securing mechanism further includes a distributor which distributes an image or a sound signal and electrical power that are supplied from another device to the plurality of display devices and to another display device securing mechanism that is adjacent to the display device securing mechanism.

According to a second embodiment of the present invention, there is provided a display system including a plurality of display devices, a plurality of housings to which the corresponding display devices are mounted, and rotating members which rotate the corresponding housings around a rotational axis extending vertically with respect to the display devices.

According to the embodiments and forms of the present invention, a plurality of display devices are mounted to a plurality of housings, and the plurality of housings each rotate around a rotational axis extending in a direction perpendicular to the display devices, so that all of the housings rotate.

According to a third embodiment of the present invention, there is provided a first display device capable of being used to form a display system by connecting the display device to at least one other display device so that the display system includes the plurality of the display devices. The display device includes at least one first connecting member, a connection detector, and a display controller. At least one direct-connection display device included in the at least one other display device is connectable to the at least one first connecting member and is directly connected to the display device which is connected to the at least one other display device. The connection detector makes a detection as to whether or not the at least one direct-connection display device is connected to the at least one first connecting member and determines a position of the display device which is connected to the at least one other display device in the display system by obtaining device-structure information from the at least one direct-connection display device when the connection detector detects that the at least one direct-connection display device is connected to the at least one first connecting member, the device-structure information being information regarding a structure of the display device or display devices of the display system linearly disposed in a direction of the at least one direct-connection display device from the display device which is connected to the at least one other display device. The display controller controls an image that is displayed on a display section of the display device which is connected to the at least one other display device, on the basis of the position of the display device detected by the connection detector.

In a first form, the display device further includes a second connecting member to which another display device included in the at least one other display device of the display system is connected. The connection detector further makes a detection as to whether or not the another display device is connected to the second connecting member and, when the another display device is connected to the second connecting member, obtains information regarding a position of the another display device with respect to the display device which is connected to the at least one other display device and provides the position of the another display device in the display system to the another display device. The display controller controls the image that is displayed on the display section of the display device, on the basis of the position of the another display device.

In a second form, the display device further includes a rotation information obtaining section which obtains rotational information indicating whether the display section is facing front or back with respect to a predetermined user when the display device which is connected to the at least one other display device and which is rotatable around a predetermined axis as a center is rotated. The display controller controls the image that is displayed on the image display section, on the basis of the rotational information.

In a third form, the device structure information includes rotational information indicating whether display sections of the other display devices face front or back with respect to a predetermined user, when the display sections are rotated around a predetermined axis as a center, and the display controller controls the image that is displayed on the display section of the display device which is connected to the at least one other display device, on the basis of the rotational information of the display sections of the other display devices.

In a fourth form, the direction of the at least one direct-connection display device with respect to the display device is any one of rightward, leftward, upward, or downward.

In a fifth form based on the fourth form, the display device further includes a first input-output portion, a second input-output portion, and a calculator. A first electrical signal from the direct-connection display device disposed leftward or upward from the display device which is connected to the at least one other display device is input to the first input-output portion, and a second electrical signal is output from the first input-output portion to the direct-connection display device disposed leftwards or upwards from the display device. The second electrical signal from the direct-connection display device disposed rightward or downward from the display device which is connected to the at least one other display device is input to the second input-output portion and the first electrical signal is output is output from the second input-output portion to the direct-connection display device disposed rightward or downward from the display device. The calculator calculates using the first and second electrical signals a total number of the display devices of the display system that is connected either horizontally in the rightward/leftward direction or vertically in the upward/downward direction to the display device which is connected to the at least one other display device.

In a sixth form based on the fifth form, the calculator includes a first adding portion which adds the one display device which is connected to the at least one other display device to a number indicated by the first electrical signal, a second adding portion which adds the one display device to a number indicated by the second electrical signal, and an adder which adds a result of the first adding portion and a value indicated by the second electrical signal. The first input-output portion outputs a result of the second adding portion as the second electrical signal to the direct-connection display device disposed leftwards or upwards, and the second input-output portion outputs the result of the first adding portion as the first electrical signal to the direct-connection display device disposed rightwards or downwards.

According to a fourth embodiment of the present invention, there is provided a first displaying method of a display device capable of being used to form a display system by connecting the display device to at least one other display device so that the display system includes the plurality of the display devices. The first displaying method includes the steps of detecting connection and controlling display. In the step of detecting connection, a detection is made as to whether or not a direct-connection display device included in the at least one other display device is connected to a connecting member and a position of the display device which is connected to the at least one other display device in the display system is determined by obtaining device-structure information from the direct-connection display device when the direct-connection display device is connected to the connecting member, the direct-connection display device being connectable to the connecting member and being directly connected to the display device, the device-structure information being information regarding a structure of the display device or display devices of the display system linearly disposed in a direction of the direct-connection display device from the display device which is connected to the at least one other display device. In the step of controlling display, an image that is displayed on a display section of the display device which is connected to the at least one other display device is controlled on the basis of the position of the display device in the display system.

According to a fifth embodiment of the present invention, there is provided a first program causing a computer to execute a controlling operation on a display device capable of being used to form a display system by connecting the display device to at least one other display device so that the display system includes the plurality of the display devices. The program includes the steps of detecting connection and controlling display. In the step of detecting connection, a detection is made as to whether or not a direct-connection display device included in the at least one other display device is connected to a connecting member and a position of the display device which is connected to the at least one other display device in the display system is determined by obtaining device-structure information from the direct-connection display device when the direct-connection display device is connected to the connecting member, the direct-connection display device being connectable to the connecting member and being directly connected to the display device, the device-structure information being information regarding a structure of the display device or display devices of the display system linearly disposed in a direction of the direct-connection display device from the display device which is connected to the at least one other display device. In the step of controlling display, an image that is displayed on a display section of the display device which is connected to the at least one other display device is controlled on the basis of the position of the display device in the display system.

In the first display device, display method, and program according to the embodiments of the present invention, when a detection is made as to whether or not a direct-connection display device is directly connected to a connecting member for connection to the direct-connection display device, and the direct-connection display device is connected to the connecting member, device structure information regarding the structure of the at least one other display device of the display system linearly disposed in the direction of the direct-connection display device from the display device is obtained from the direct-connection display device, and the position of the display device in the display system is determined. On the basis of the position of the display device in the display system, an image to be displayed on the display section of the display device is controlled.

According to a sixth embodiment of the present invention, there is provided a second display device capable of being used to form a display system by connecting the display device to at least one other display device so that the display system includes the plurality of the display devices. The second display device includes a connecting member to which another display device included in the at least one other display device of the display system is connected, a first position information obtaining section which obtains a relative position of the display device with respect to the another display device, a second position information obtaining section which provides the relative position to the another display device and obtains an absolute position of the display device in the display system from the another display device, and a display controller which controls an image that is displayed on a display section of the display device, on the basis of the absolute position of the display device in the display system.

In a first form, the second display device further includes a rotation information obtaining section which obtains rotational information indicating whether the display section is facing front or back with respect to a predetermined user when the display device which is rotatable around a predetermined axis as a center is rotated. The second position information obtaining section further provides the rotational information of the display device to the another display device and obtains from the another display device rotational information indicating whether the another display device is facing front or back with respect to the predetermined user. The display controller controls the image that is displayed on the display section, on the basis of the rotational information of the display device and the rotational information of the another display device.

According to a seventh embodiment of the present invention, there is provided a second displaying method of a display device capable of being used to form a display system by connecting the display device to at least one other display device so that the display system includes the plurality of the display devices. The second displaying method includes the steps of obtaining first position information, obtaining second position information, and controlling display. In the step of obtaining first position information, a relative position of the display device with respect to another display device included in the at least one other display device and connected to a connecting member is obtained. In the step of obtaining second position information, the relative position is provided to the another display device and an absolute position of the display device in the display system is obtained from the another display device. In the step of controlling display, an image that is displayed on a display section of the display device is controlled on the basis of the absolute position of the display device in the display system.

According to an eighth embodiment of the present invention, there is provided a second program causing a computer to execute a controlling operation on a display device capable of being used to form a display system by connecting the display device to at least one other display device so that the display system includes the plurality of the display devices. The second program includes the steps of obtaining first position information, obtaining second position information, and controlling display. In the step of obtaining first position information, a relative position of the display device with respect to another display device included in the at least one other display device and connected to a connecting member is obtained. In the step of obtaining second position information, the relative position is provided to the another display device and an absolute position of the display device in the display system is obtained from the another display device. In the step of controlling display, an image that is displayed on a display section of the display device is controlled on the basis of the absolute position of the display device in the display system.

In the second display device, display method, and program according to the embodiments and form of the present invention, the position of the display device relative to the position of another display device connected to the connecting member is obtained and this relative position is provided to the another display device. The absolute position of the display device in the display system is obtained from the another display device. On the basis of the absolute position of the display device in the display system, an image to be displayed on the display section of the display device is controlled.

DESCRIPTION OF THE PREFERRED EMBODIMENTS

A first embodiment of the present invention will hereunder be described. Claimed structural features and specific forms in the first embodiment according to the present invention correspond to each other by way of exemplification as follows. This correspondence description is for confirming that specific forms that support claimed inventions are stated in the description of the preferred embodiments. Therefore, if a specific form is set forth in the first embodiment according to the present invention but not as one that corresponds to a claimed structural feature, this does not mean that this specific form does not correspond to the claimed structural feature. In contrast, if a specific form is set forth here as one that corresponds to a claimed structural feature, this does not mean that this specific form does not correspond to any claimed structural feature other than the claimed structural feature to which the specific form corresponds here.

Further, this correspondence description does not necessarily imply that all inventions corresponding to the specific forms set forth in the description of the first embodiment according to the present invention are set forth in the claims. In other words, this correspondence description refers to the inventions corresponding to the specific forms set forth in the first embodiment according to the present invention and does not deny the existence of an invention not set forth in the claims of this application, that is, does not deny the existence of an invention resulting from a divisional application or addition by amendment in the future.

Figure 4:
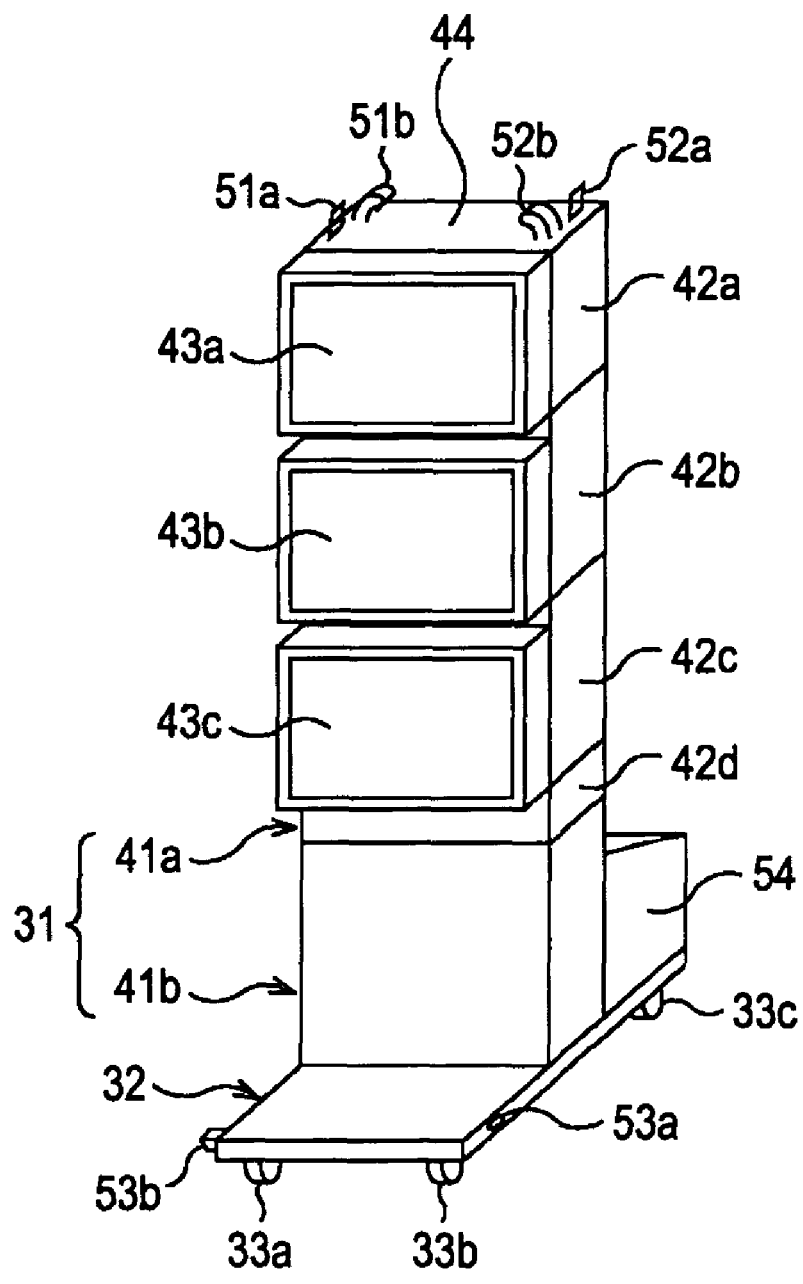
FIG. 4 is a perspective view of a multi-television unit 21 according to an embodiment to which the present invention is applied.

According to an embodiment of the present invention, there is provided a display device securing mechanism (for example, a multi-television unit 21 shown in FIG. 4) including a plurality of housings (for example, an upper display section 42a, a central display section 42b, and a lower display section 42c shown in FIG. 4) to which a plurality of display devices are mounted, first rotating members (for example, a bearing 141 shown in FIG. 17) which rotate the corresponding housings around a rotational axis extending vertically with respect to the display devices, and a second rotating member (for example, a bearing 123 shown in FIG. 14) which rotates all of the housings together.

In a first form, the display device securing mechanism further includes a securing member (for example, a fitting 51a and a retainer pawl 51b, and a recess 53a and a protrusion 53b) which secures the display device securing mechanism to another display device securing mechanism adjacent thereto.

In a second form, the display device securing mechanism further includes a cylindrical member (for example, a pipe 121 shown in FIG. 14) which is axially disposed in the plurality of housings in a direction in which the plurality of housings are disposed in a line. The cylindrical member has a wire disposed along an inner side thereof, the wire being connected to each of the plurality of display devices and being used to supply an image or a sound signal and electrical power that is supplied to the plurality of display devices.

In a third form based on the second form, the cylindrical member has openings (for example, opening 143 shown in FIG. 17) in the corresponding housings for bringing out the wire which is connected to each display device and used for supplying the signal and the electrical power.

In a fourth form, the display device securing mechanism further includes electrically conductive members (for example, signal ring 171a shown in FIG. 19) each disposed in the corresponding housing and having a cylindrical shape that is coaxial with a rotary shaft of the corresponding housing. Each electrically conductive member comes into contact with a wire at an inner side of the cylindrical shape and with a signal input terminal or a power-supply-receiving terminal of the corresponding display device at an outer side of the cylindrical shape. The wire is connected to each display device and used for supplying an image or a sound signal and electrical power which is supplied to each display device.

In a fifth form, the display device securing mechanism further includes a distributor (for example, a distributor 102 shown in FIG. 10) which distributes an image or a sound signal and electrical power that are supplied from another device to the plurality of display devices and to another display device securing mechanism that is adjacent to the display device securing mechanism.

According to another embodiment of the present invention, there is provided a display system (for example, the multi-television unit 21 shown in FIG. 4) to which a plurality of display devices that are disposed in a line are mounted. The display system includes the plurality of display devices (for example, displays 43a to 43c shown in FIG. 4), a plurality of housings (for example, the upper display section 42a, the central display section 42b, and the lower display section 42c shown in FIG. 4) to which the corresponding display devices are mounted, first rotating members (for example, the bearing 141 shown in FIG. 17) which rotate the corresponding housings around a rotational axis extending vertically with respect to the display devices, and a second rotating member (for example, the bearing 123 shown in FIG. 14) which rotates all of the housings together.

The first embodiment of the present invention will hereunder be given with reference to the drawings.

FIG. 4 is a perspective view of the multi-television unit (display device securing device) 21 according to the first embodiment to which the present invention is applied.

The multi-television unit 21 shown in FIG. 4 is a unit to which the three displays (televisions) 43a to 43c can be mounted in a column. The displays 43a to 43c display images corresponding to image signals applied to the displays 43a to 43c.

FIG. 4 shows a state in which the three displays 43a to 43c are mounted. In FIG. 4, a side which the three displays 43a to 43c face (that is, the side opposite to a side to which a cover 54 (described later) is mounted) is defined as a front side of the multi-television unit 21.

The multi-television unit 21 includes a vertically long rectangular parallelepiped display unit 31 and a plate base unit 32. The three displays 43a to 43c can be mounted vertically in a column to the display unit 31. A side of the base unit 32 facing the floor has a wide area for stably installing the display unit 31 to the floor.

Figure 5:
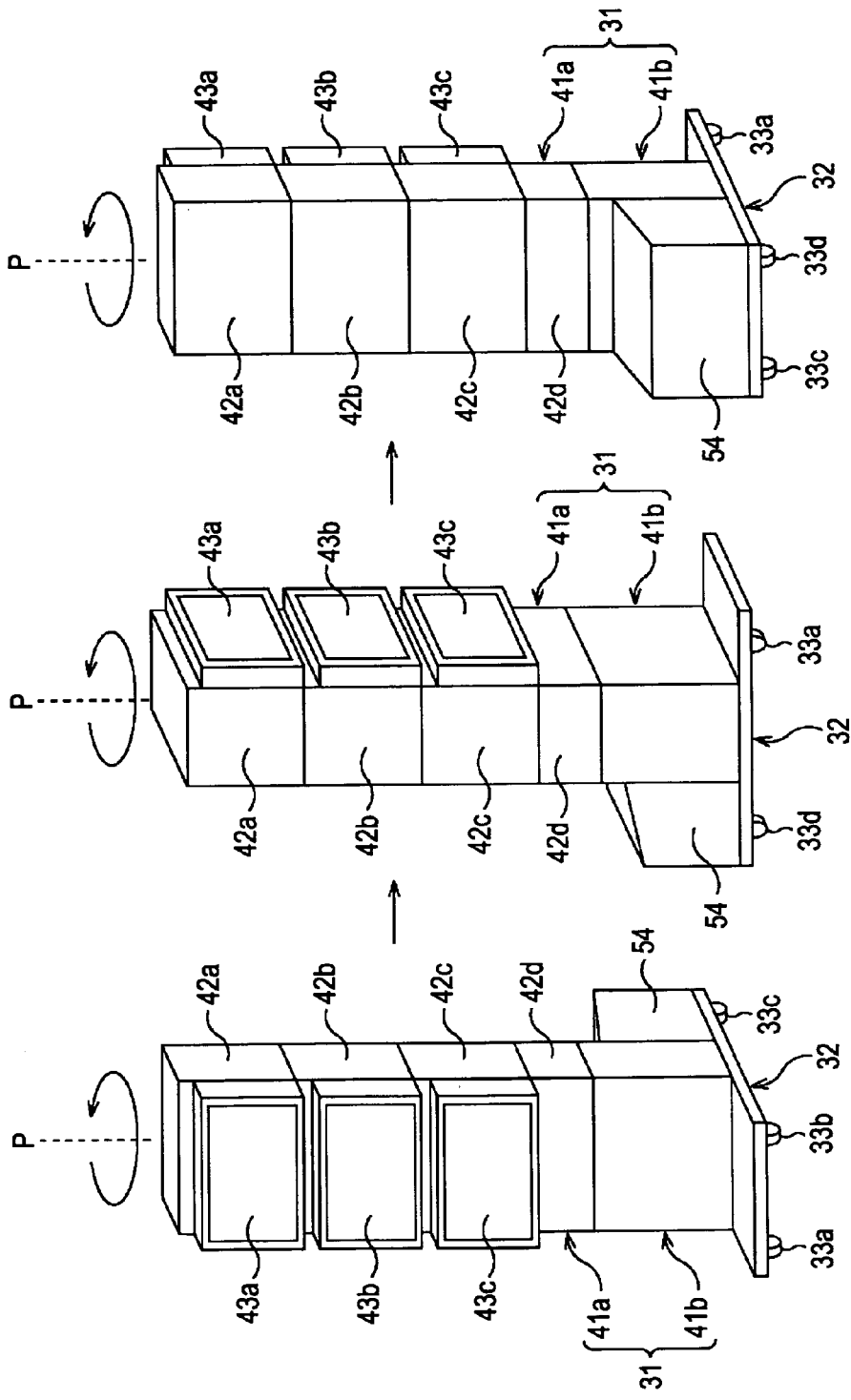
FIGS. 5A to 5C illustrate operations of the multi-television unit 21.

A bottom surface (lower surface) of the display unit 31 and a top surface of the base unit 32 are brought into contact with and secured to each other. Casters 33a to 33d (caster 33d is shown in FIGS. 5B and 5C) are secured to respective four corners of the bottom surface (lower surface) of the base unit 32.

The display unit 31 is divided vertically so as to include an upper display mount 41a and a lower accommodating portion 41b. The displays 43a to 43c are mounted to the upper display mount 41a. The lower accommodating portion 41b accommodates, for example, the distributor 102 (refer to FIG. 10) for distributing a cable 101 (also refer to FIG. 10) used for electrical power and signals (image or sound signals) supplied to the displays 43a to 43c.

The display mount 41a includes from the top the upper display section 42a to which the display 43a is mounted, the central display section 42b to which the display 43b is mounted, the lower display section 42c to which the display 43c is mounted, and a display mount base 42d.

Figure 10:
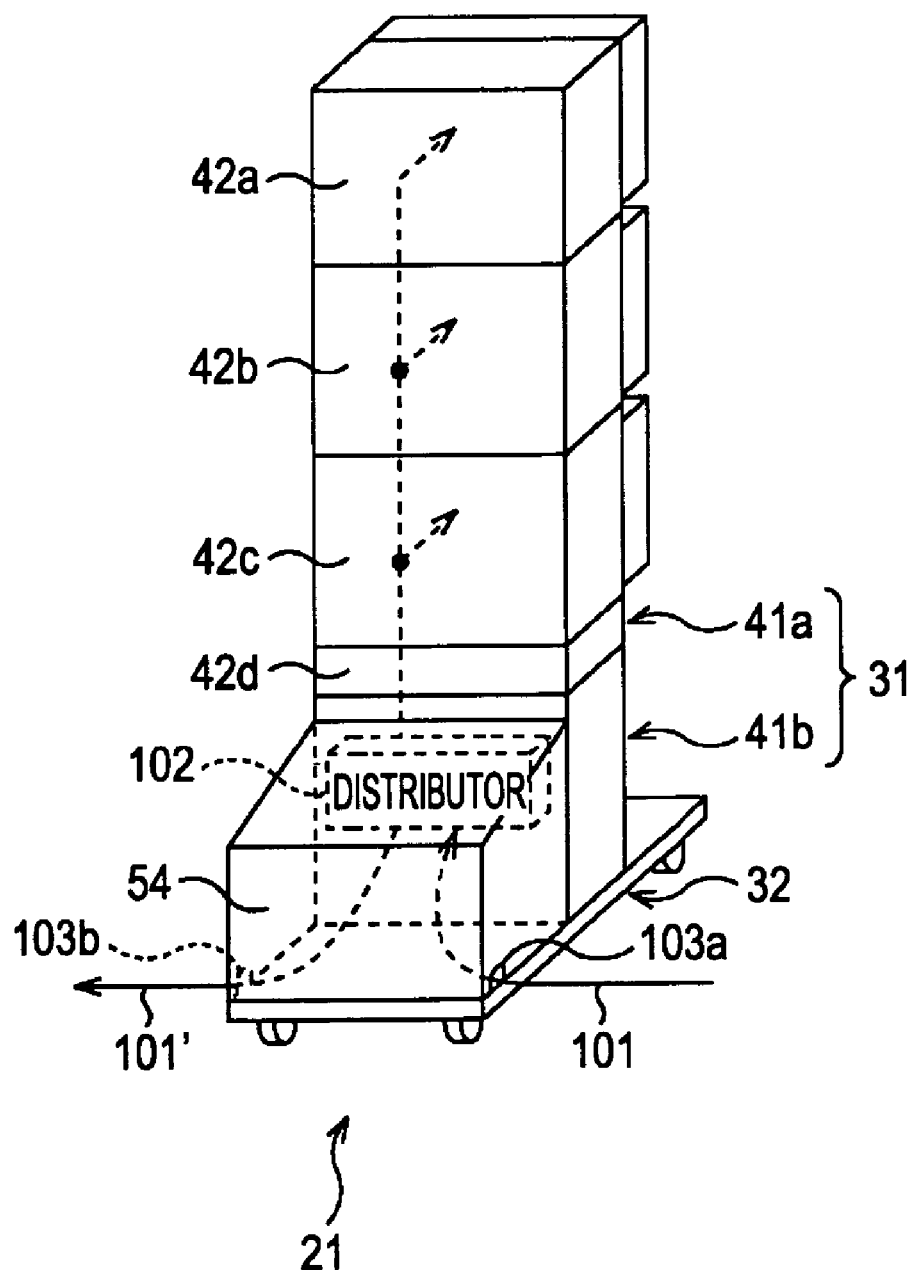
FIG. 10 illustrates a structure of the back of the multi-television unit 21.

The displays 43a to 43c output images and sounds corresponding to signals supplied through the cable 101 (refer to FIG. 10). (In other words, the displays 43a to 43c display images.) The displays 43a, 42b, and 43c are removable from the respective upper display section 42a, central display section 42b, and lower display section 42c.

Fittings and retainer pawls used for securing the multi-television unit 21 to an adjacent multi-television unit (not shown) when they are disposed next to each other horizontally in the figure are mounted to a top surface 44 of the display unit 31. In other words, the fitting 51a and the retainer pawl 51b for securing a multi-television unit (not shown) on the left of the multi-television unit 21 are mounted to the left side (that is, a location close to a left edge) of the top surface 44 of the display unit 31, and a fitting 52a and a retainer pawl 52b for securing a multi-television unit (not shown) on the right of the multi-television unit 21 are mounted to a right side (that is, a location close to a right edge) of the top surface 44 of the display unit 31.

The recess 53a and the protrusion 53b used for securing the multi-television unit 21 to an adjacent multi-television unit 21 (not shown) when they are disposed next to each other horizontally in the figure are provided at a right side surface and a left side surface of the base unit 32, respectively.

The cover 54 for covering the cable 101 (refer to FIG. 10) connected to another device (including an adjacent multi-television unit 21) is mounted to the upper surface of the base unit 32 at a back side of the display unit 31.

For example, as shown in FIGS. 5A to 5C, the multi-television unit 21 having the above-described structure can be rotated around an axis P (center of gravity) by the casters 33a to 33d secured to the bottom surface of the base unit 32. Here, the axis P serves as a center when viewed from the top of the display unit 31.

Although FIGS. 5A to 5C in that order show an example in which the multi-television unit 21 is rotated counterclockwise around the axis P as a center, the multi-television unit 21 can obviously be rotated clockwise.

Figure 6:
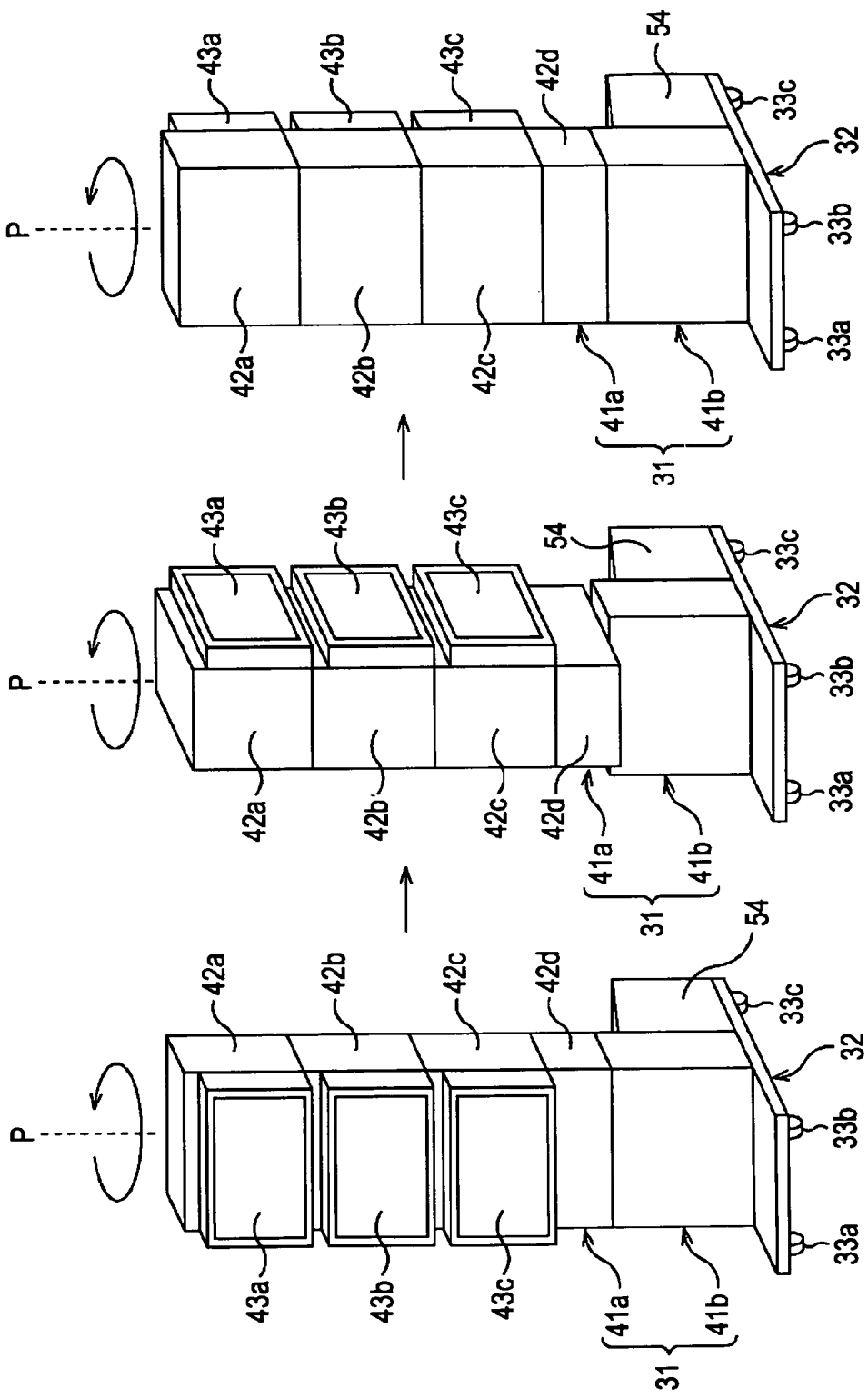
FIGS. 6A to 6C illustrate operations of the multi-television unit 21.

As mentioned above, the multi-television unit 21 is divided into the display mount 41a to which the three displays 43a to 43c are mounted and the accommodating portion 41b, so that, as shown in FIGS. 6A to 6C, the upper display mount 41a can be rotated counterclockwise around the axis P as a center through an angle of 180 degrees while a portion of the multi-television unit 21 extending downward from an upper side of the accommodating portion 41b faces the front. In this case, the displays 43a to 43c can be oriented in a predetermined direction from the front side to the back side as an integral unit.

As mentioned above, the display mount 41a of the multi-television unit 21 is divided into the upper display section 42a to which the display 43a is mounted, the central display section 42b to which the display 43b is mounted, and the lower display section 42c to which the display 43c is mounted, so that, as shown in FIGS. 7A to 7C, the upper display section 42a, the central display section 42b, and the lower display section 42c can each be rotated counterclockwise around the axis P as a center through an angle of 180 degrees, independently of the lower display mount base 42d (and the accommodating portion 41b) facing the front. FIGS. 7A to 7C illustrate an example in which the upper display section 42a is rotated counterclockwise.

By forming the recess 53a, the protrusion 53b, etc., at the left and right side surfaces of the base unit 32, any plural number of multi-television units 21 (any n multi-television units 21) can be disposed horizontally in a row to easily construct a multi-television system which displays images as a result of 3n displays working together.

Figure 8:
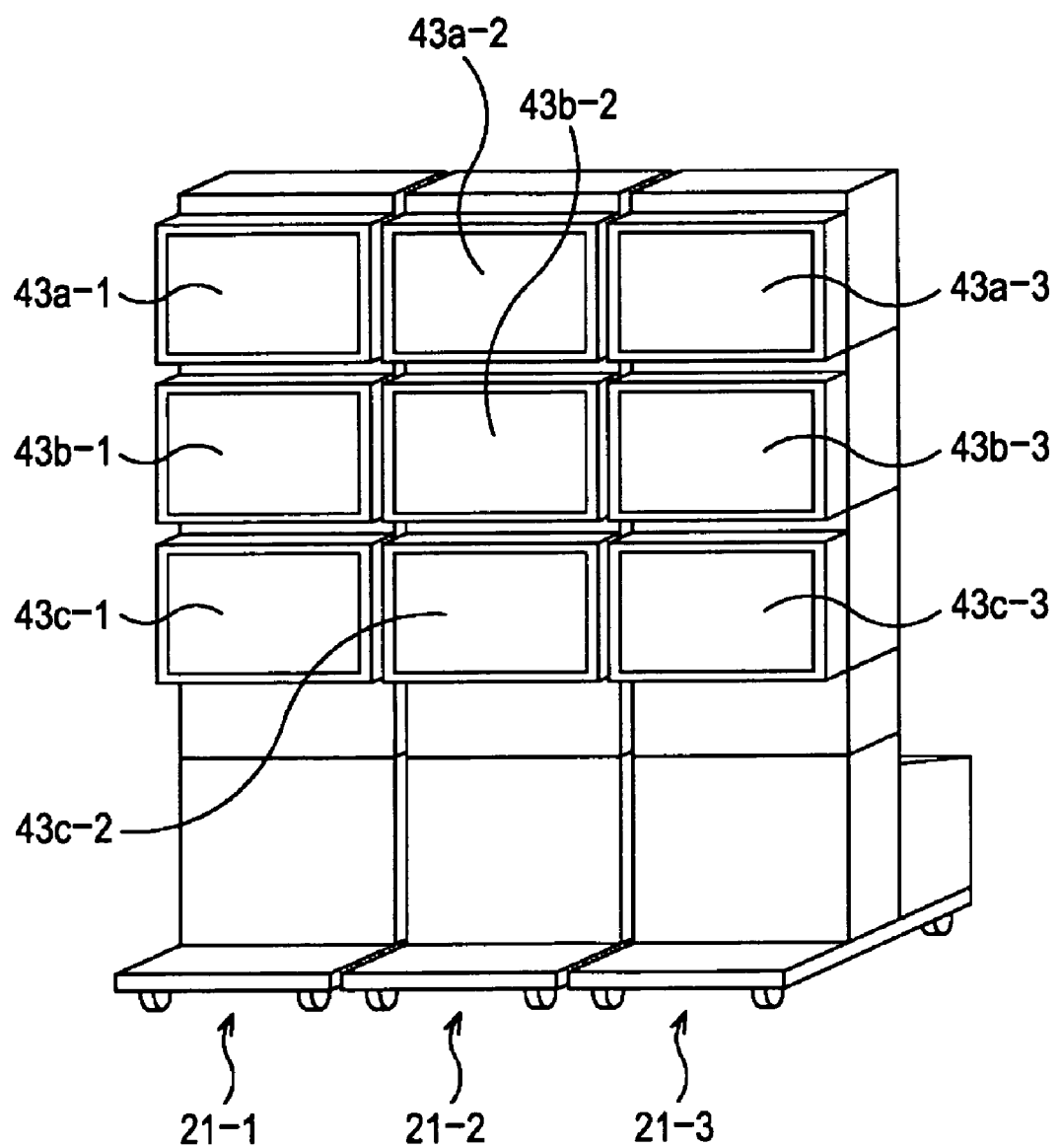
FIG. 8 is a perspective view of a multi-television system including three multi-television units 21.

FIG. 8 shows a multi-television system including three multi-television units 21.

In order to distinguish between n multi-television units 21 below, these multi-television units will be referred to as television units 21-1 to 21-n. The same will apply to each part of the multi-television units 21.

Figure 9:
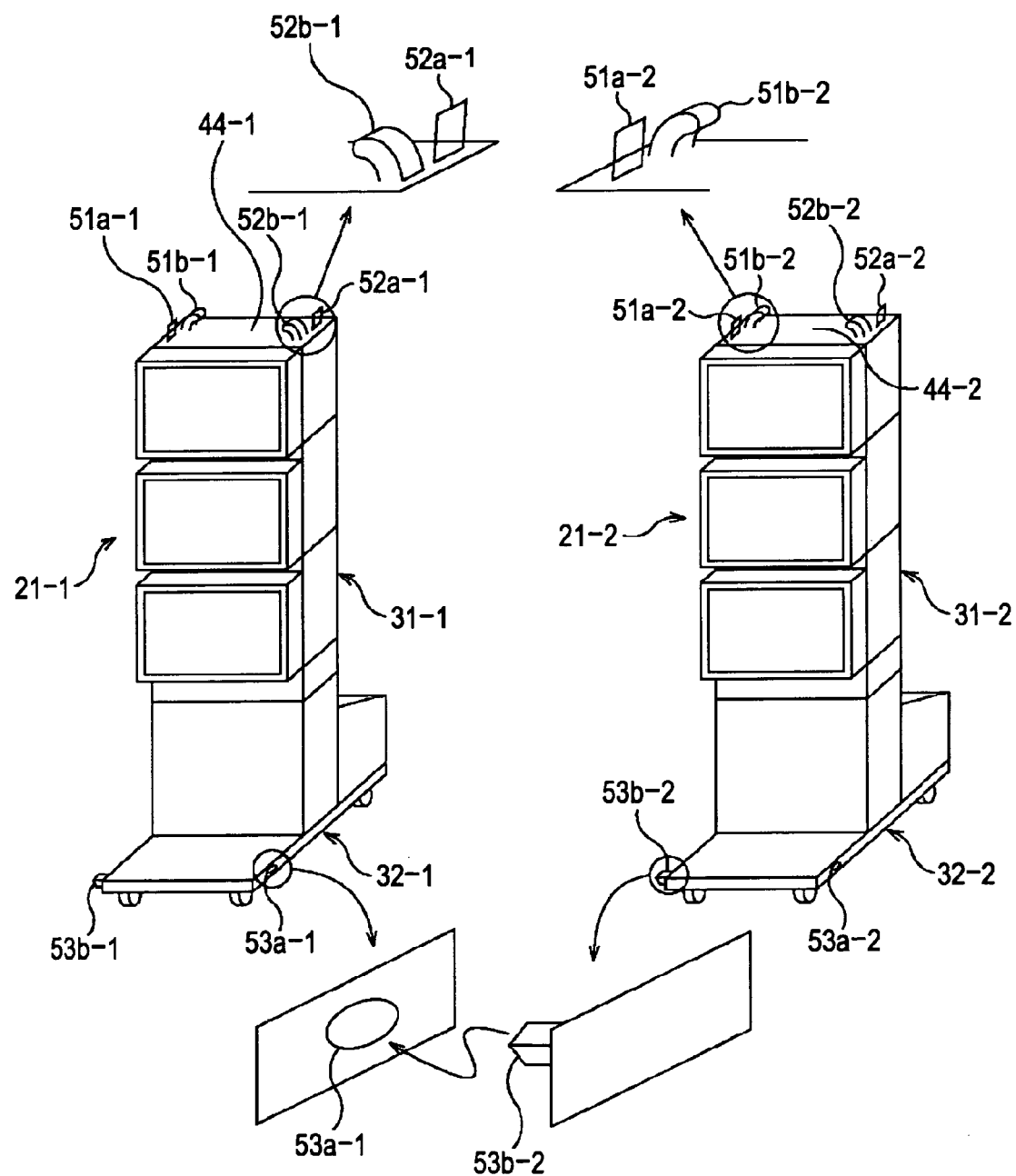
FIG. 9 illustrates a method for securing multi-television units 21, which are disposed side by side horizontally, to each other.

Referring to FIG. 9, a method of securing a plurality of multi-television units 21 together when the plurality of multi-television units 21 are disposed horizontally in a row as shown in FIG. 8 will be described.

The multi-television unit 21-1 is secured to the multi-television unit 21-2 by securing a fitting 52a-1 and a retainer pawl 52b-1 (mounted to a top surface 44-1 of a display unit 31-1) to a fitting 51a-2 and a retainer pawl 51b-2 (mounted to a top surface 44-2 of a display unit 31-2).

By retaining the fitting 52a-1 of the multi-television unit 21-1 by the retainer pawl 51b-2 of the multi-television unit 21-2, the multi-television units 21-1 and 21-2 are secured together. In addition, by retaining the fitting 51a-2 of the multi-television unit 21-2 by the retainer pawl 52b-1 of the multi-television unit 21-1, the multi-television units 21-1 and 21-2 are secured together.

Further, the multi-television units 21-1 and 21-2 are also secured together by fitting a recess 53a-1 in a right side surface of a base unit 32-1 of the multi-television unit 21-1 to a protrusion 53b-2 on a left side surface of a base unit 32-2 of the multi-television unit 21-2.

In this way, the fitting 51a-2 and the retainer pawl 52b-1, the fitting 52a-1 and the retainer pawl 51b-2, and the recess 53a and the protrusion 53b make it possible to easily, quickly, and precisely secure (position) the multi-television unit 21-1 and the multi-television unit 21-2. This similarly applies to cases in which n adjacent multi-television units 21-n are connected to each other.

In the multi-television units 21, when, as shown in FIGS. 6A to 6C or FIGS. 7A to 7C, any one of or all of the displays 43a to 43c are rotated around the axis P as a center, the recess 53a and the protrusion 53b are only used, so that the fitting 51a, the retainer pawl 52b, the fitting 52a, and the retainer pawl 51b are not used.

FIG. 10 is a perspective back view of the multi-television unit 21.

The distributor 102 is accommodated in the accommodating portion 41b of the display unit 31, and distributes electrical power and signals supplied through the cable 101 from a right multi-television unit (not shown) into the displays 43a to 43c and into a left multi-television unit (not shown) through a cable 101', the left multi-television unit being disposed opposite to the right multi-television unit to which the cable 101 is connected.

Figure 11:
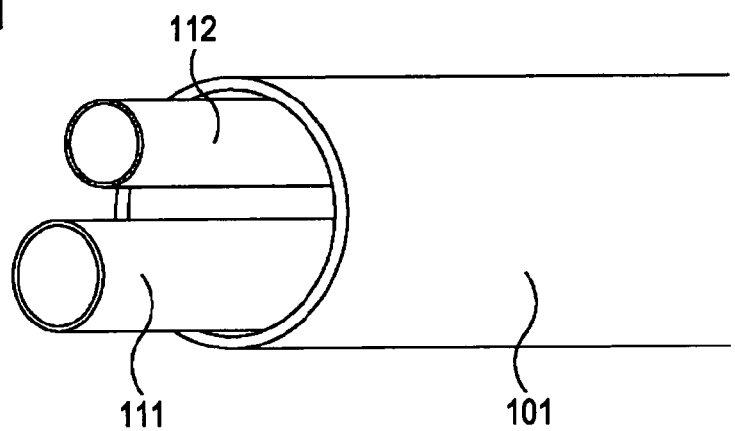
FIG. 11 illustrates a cable 111.

As shown in FIG. 11, the cable 101 is a cable in which a signal cable portion 111 for transmitting a signal and a power supply cable portion 112 for supplying electrical power are integrally formed.

Figure 12:
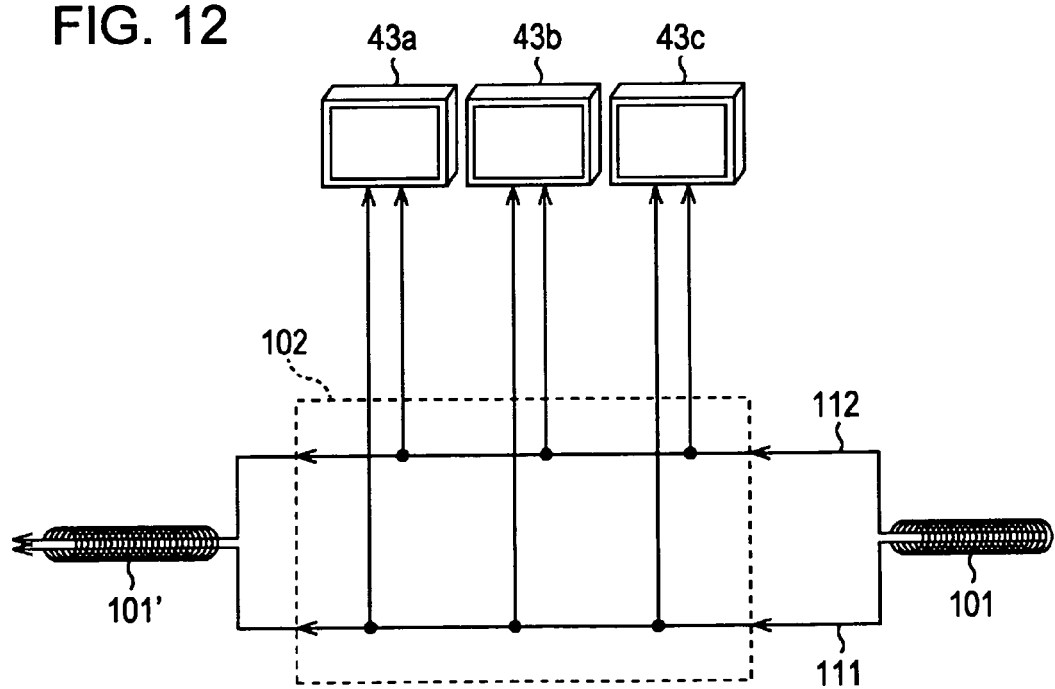
FIG. 12 illustrates a distributor 102.

As shown in FIG. 12, the distributor 102 distributes (supplies) signals and electrical power supplied from the right multi-television unit through the cable 101 to the displays 43a to 43c, mounted to the multi-television unit 21, and to the left adjacent multi-television unit through the cable 101'.

Returning to FIG. 10, at the back side of the multi-television unit 21, the cover 54 is secured and mounted to the display unit 31 and to the base unit 32 so as to cover the top surface of the base unit 32 and the back side of the accommodating portion 41b.

A left side surface and a right side surface (facing the respective adjacent left and right multi-television units) of the cover 54 have a notch 103a and a notch 103b, respectively, for passing the respective cable 101 and the cable 101', which are connected to the respective adjacent multi-television units.

Figure 13:
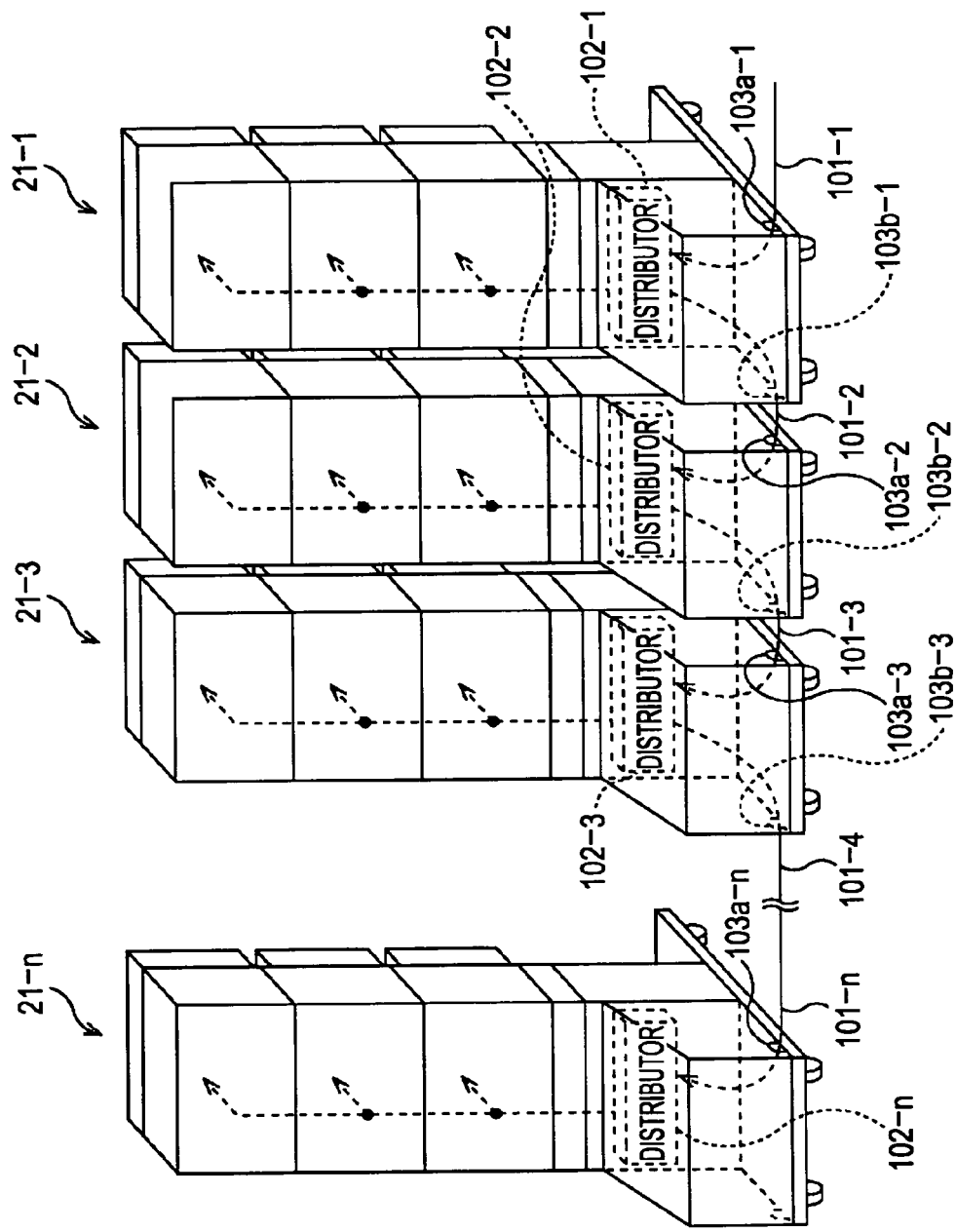
FIG. 13 illustrates an example of connections of cables 111 when n multi-television units 21-1 to 21-$n$ are disposed in parallel.

Therefore, when, as shown in FIG. 13, n multi-television units 21-1 to 21-n are disposed horizontally in a row, a second end of a cable 101-1 (corresponding to the cable 101 in FIG. 10) having a first end connected to another multi-television unit (not shown) to which signals and electrical power are supplied is connected to a distributor 102-1 through a notch 103a-1 of the multi-television unit 21-1.

A cable 101-2 (corresponding to the cable 101' shown in FIG. 10) having one end connected to the distributor 102-1 is connected to a distributor 102-2 of the multi-television unit 21-2 through a notch 103b-1 and a notch 103a-2. This makes it possible for the multi-television unit 21-1 to receive electrical power and signals from another multi-television unit and the electrical power and the signals to be supplied to the multi-television unit 21-2.

Similarly, cables 101-3 to 101-n connect adjacent multi-television units 21 among the multi-television units 21-2 to 21-n to supply the electrical power and the signals supplied from the respective right multi-television units 21.

This reduces the number of cables used to supply the signals and the electrical power to the multi-television units 21-1 to 21-n, and allows all of the multi-television units 21-1 to 21-n that are connected together to receive the signals and the electrical power.

Since the cables 101-1 to 101-n are covered by covers 54-1 to 54-n, it is possible to provide a wiring that has a good appearance.

A mechanism for rotating the displays 43a to 43c shown in FIGS. 6A to 6C and in FIGS. 7A to 7C will be described.

Figure 14:
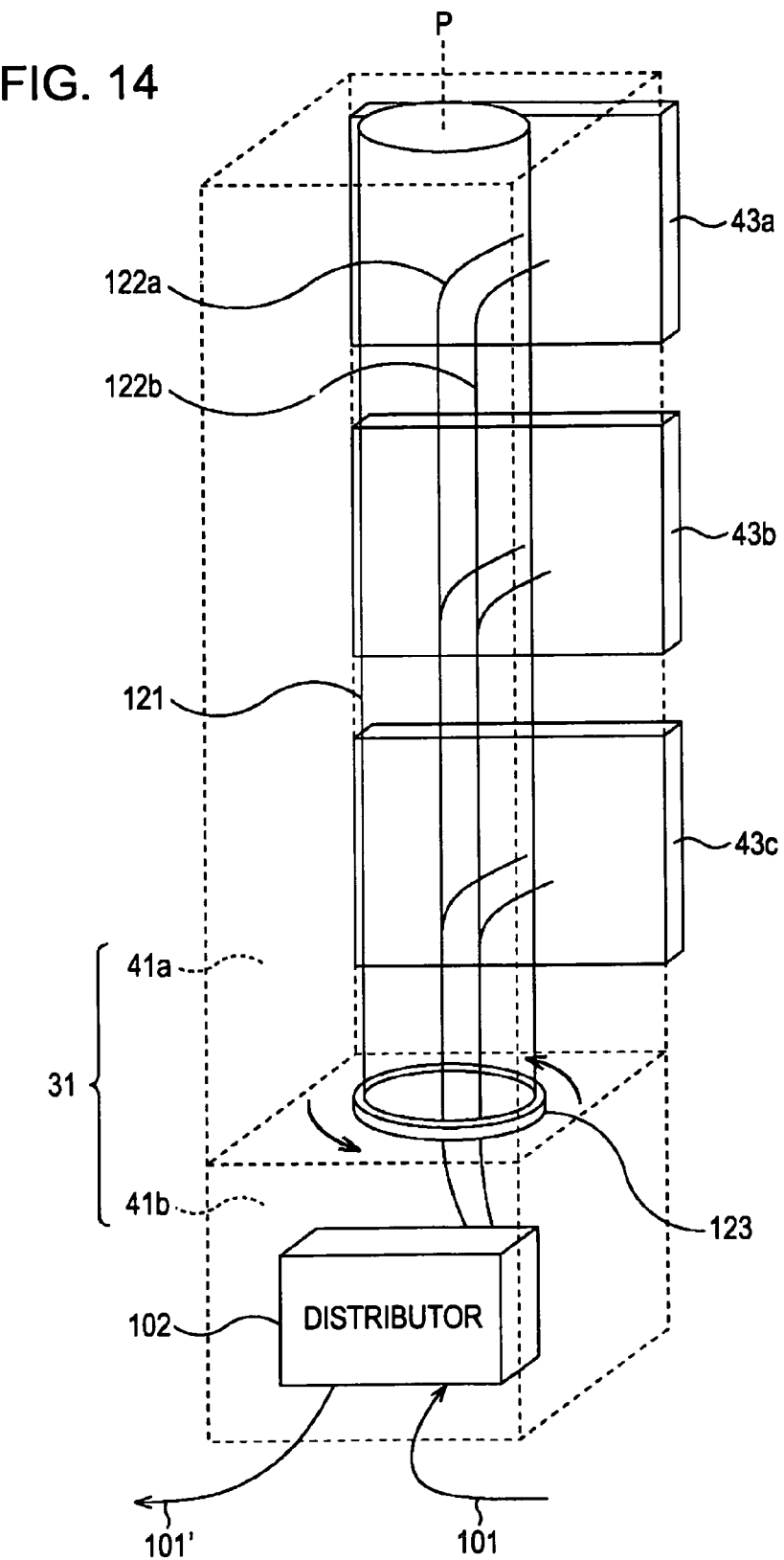
FIG. 14 illustrates rotation of a display mount 41$a$.

FIG. 14 is a perspective back view of the display unit 31.

As shown in FIG. 14, the cylindrical pipe 121 which axially vertically passes through the display mount 41a is disposed in the display mount 41a (to which the displays 43a to 43c are mounted), at an upper side where the display unit 31 is vertically divided.

The pipe 121 is a hollow pipe in which a signal cable 122a and a power supply cable 122b, which supply signals and electrical power, respectively, to the displays 43a to 43c, are laid.

The bearing 123 is disposed on a bottom surface of the vertically long parallelepiped display mount 41a.

The bearing 123 has, for example, its outer ring (not shown) secured to (a housing of) the display mount 41a and its inner ring (not shown) secured to the pipe 121. When a force which rotates the display mount 41a counterclockwise around the axis P as a center is applied, a ball (not shown) interposed between the outer ring and the inner ring in the bearing 123 rolls, so that, as shown in FIG. 15, the display mount 41a rotates (is rotated) counterclockwise.

Figure 15:
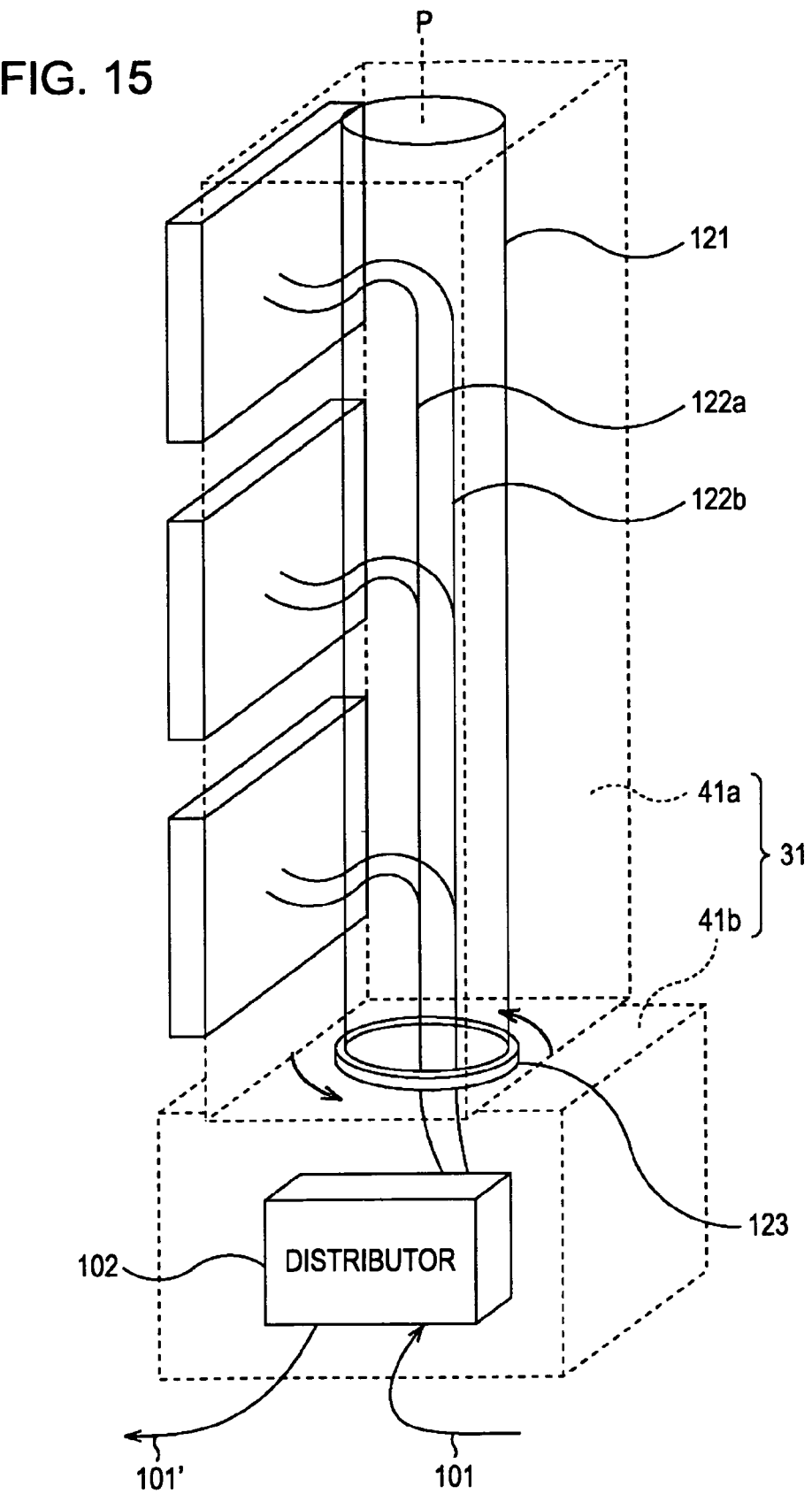
FIG. 15 illustrates the rotation of the display mount 41$a$.

FIG. 15 shows a state in which the display mount 41a facing the front has been rotated counterclockwise through an angle of 90 degrees (from the state shown in FIG. 14).

Figure 16:
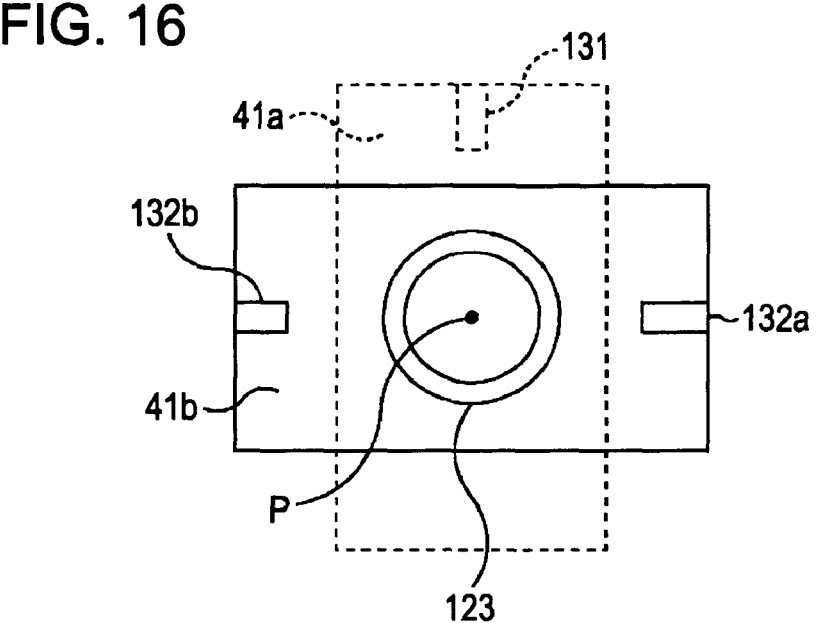
FIG. 16 illustrates the rotation of the display mount 41$a$.

FIG. 16 is a top view of the display unit 31 in the state shown in FIG. 15.

In FIG. 16, a stopper (protrusion) 131 is mounted on the bottom surface of the display mount 41a so as to be situated at a location near a central portion of one short side of the rectangular bottom surface of the display mount 41a.

Stoppers 132a and 132b are mounted on the upper side of the accommodating portion 41b so as to be situated at locations near central portions of respective short sides of the rectangular upper surface of the accommodating portion 41b.

When the display mount 41a is further rotated counterclockwise around the axis P as center from the state shown in FIG. 16 in which the display mount 41a has been rotated through an angle of 90 degrees, the stopper 131, mounted to the bottom surface of the display mount 41a, collides with the stopper 132b, mounted to the upper surface of the accommodating portion 41b, thereby stopping the rotation of the display mount 41a. At this time, the displays 43a to 43c are rotated by 180 degrees as viewed from the front of the multi-television unit 21.

In contrast, when the display mount 41a is rotated clockwise around the axis P as a center from the state shown in FIG. 16 in which the display mount 41a has been rotated by 90 degrees, the stopper 131, mounted to the bottom surface of the display mount 41a, collides with the stopper 132a, mounted to the upper surface of the accommodating portion 41b, thereby stopping the rotation of the display mount 41a. At this time, the displays 43a to 43c face the front side of the multi-television unit 21.

Accordingly, the display mount 41a is made rotatable by the bearing 123, and the rotation of the display mount 41a can be controlled in the range of from 0 degrees to 180 degrees by the stopper 131, the stopper 132a, and the stopper 132b.

When the upper display section 42a, the central display section 42b, and the lower display section 42c are each to be rotated around the axis P as a center, the same mechanism is used.

Figure 17:
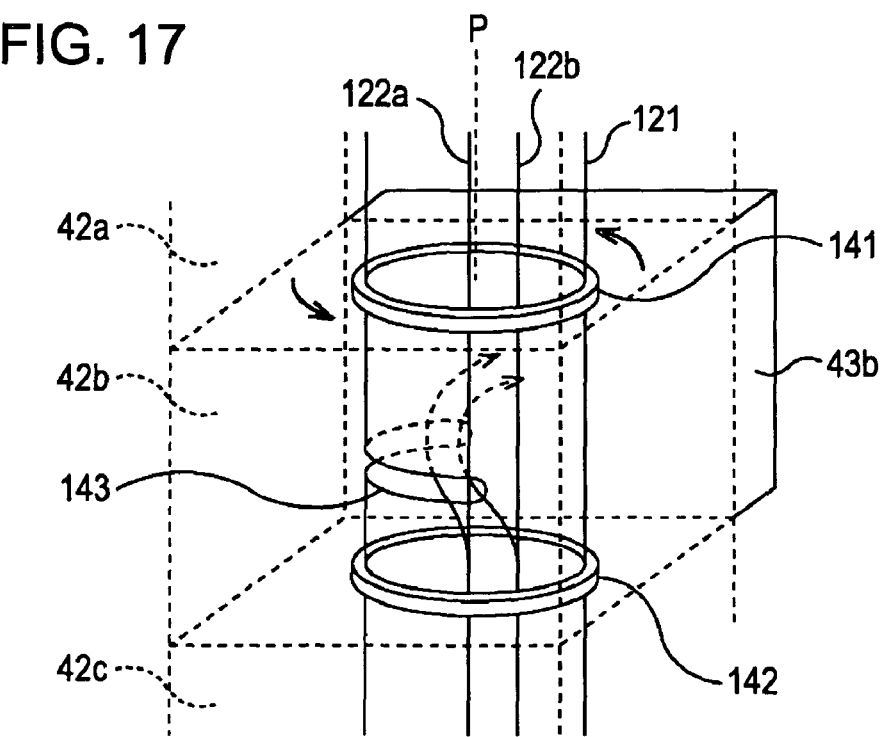
FIG. 17 illustrates rotation of a central display section 42$b$.
Figure 18:
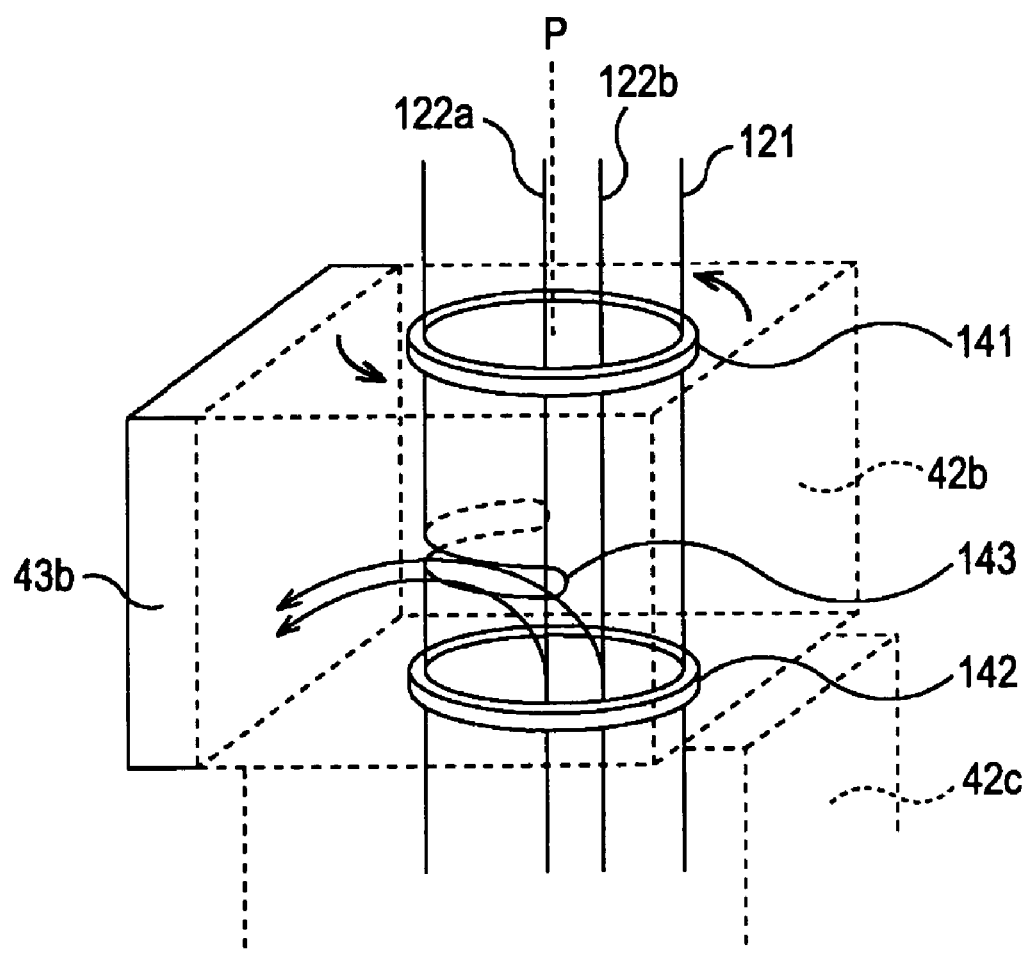
FIG. 18 illustrates the rotation of the central display section 42$b$.

FIGS. 17 and 18 show an example in which the central display section 42b is rotated.

The bearing 141 is mounted to a top surface of the central display section 42b. An outer ring (not shown) of the bearing 141 is secured to a housing of the central display section 42b, and an inner ring (not shown) thereof is secured to the pipe 121.

A bearing 142 is mounted to a bottom surface (lower surface) of the central display section 42b. An outer ring (not shown) of the bearing 142 is secured to the housing of the central display section 42b, and an inner ring (not shown) thereof is secured to the pipe 121.

By this, when a force which rotates the central display section 42b counterclockwise around the axis P as a center is applied, as shown in FIG. 18, the central display section 42b rotates (is rotated) without rotating the pipe 121.

It is possible to rotate the display mount 41a, the upper display section 42a, the central display section 42b, or the lower display section 43c by mounting the aforementioned bearings 123, 141, 142, etc., so as to face a vertical direction.

The pipe 121, disposed in the central display section 42b shown in FIG. 17, has the opening 143 for bringing out the signal cable 122a and the power supply cable 122b, which are connected to the display 43b, from the interior of the pipe 121.

The pipe 121 has the opening 143 that is in correspondence with a rotation range of the central display section 42b so that the signal cable 122a and the power supply cable 122b can follow the rotation of the central display section 42b (display 43b). That is, a horizontal width of the opening 143 in a circumferential direction of the pipe 121 is set in correspondence with a rotational angle of the central display section 42b.

Therefore, since portions of the signal cable 122a and the power supply cable 122b in the pipe 121 are unrelated to the rotation of the central display section 42b, that is, since the signal cable 122a and the power supply cable 122b do not move even if the central display section 42b rotates, they are not twisted.

Since portions of the signal cable 122a and the power supply cable 122b outside the pipe 121 (that is, the portions from the pipe 121 to the display 43b) do not move in the opening 143 following the rotation of the central display section 42b, they are not twisted.

As shown in FIGS. 17 and 18, although the signal cable 122a and the power supply cable 122b are not twisted in the mechanism in which the opening 143 in correspondence with the rotation range of the central display section 42b is formed in the pipe 121, they move slightly.

Figure 19:
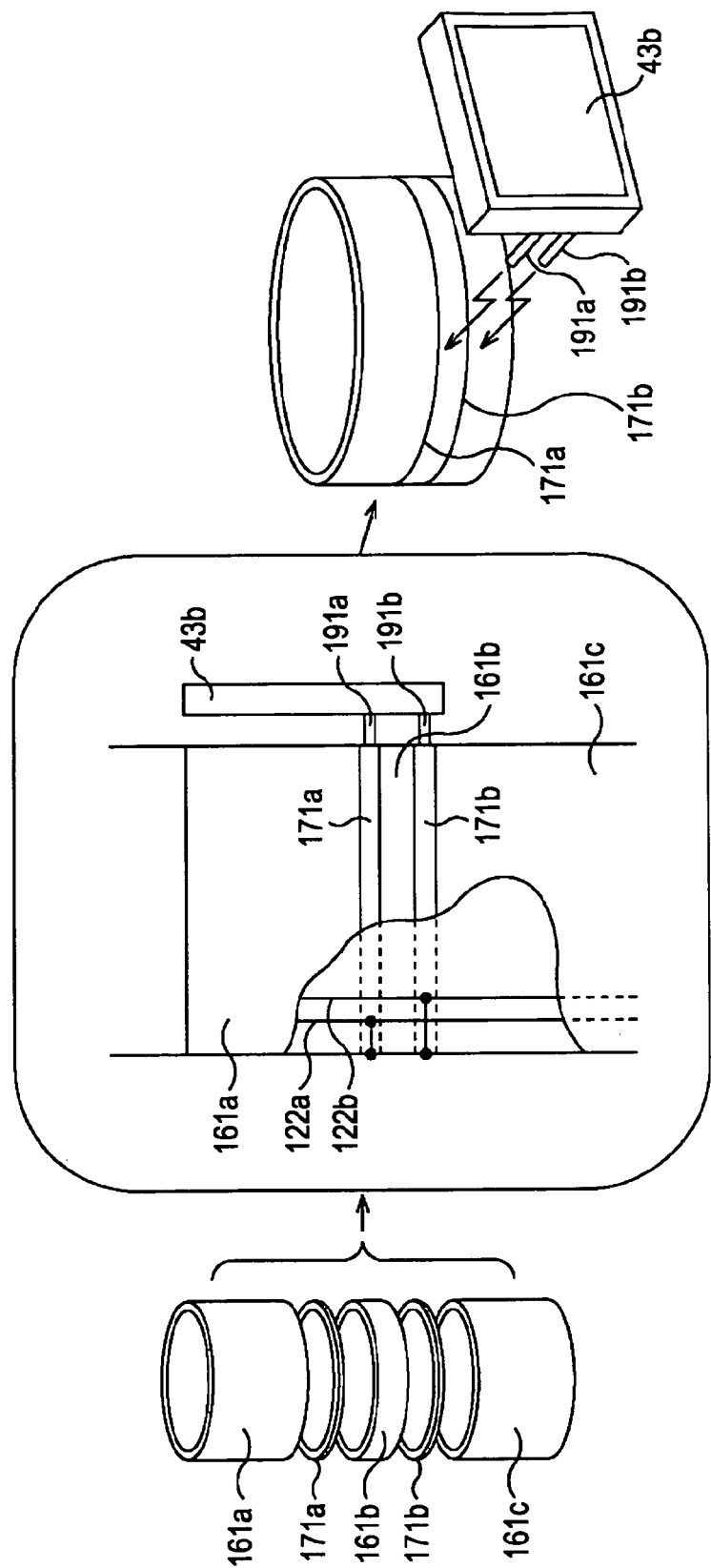
FIG. 19 illustrates the rotation of the central display section 42$b$.

Accordingly, it is possible to use a mechanism shown in FIG. 19 which is designed so as not to move the signal cable 122a and the power supply cable 122b.

In FIG. 19, a pipe 161 (pipe portions 161a to 161c) is used instead of the pipe 121. As shown on the left side in FIG. 19, in the central display section 42b, the pipe 161 is divided into the pipe portions 161a to 161c. The pipe portion 161a and the pipe portion 161b sandwich the signal ring 171a, and the pipe portion 162b and the pipe portion 162c sandwich a power supply ring 171b.

As shown in the center of FIG. 19, a signal input terminal 191a for inputting a signal thereto and a power supply terminal 191b for receiving electrical power protrude in the form of pins from the display 43b mounted to the central display section 42b and are in contact with the signal ring 171a and the power supply ring 171b, respectively.

The signal ring 171a has the same diameter as the pipe 161, is formed of an electrically conductive metal, contacts the signal cable 122a at an inner side of the signal ring 171a, and contacts the signal input terminal 191a of the display 43b at an outer side of the signal ring 171a. The signal ring 171a transmits a signal from the signal cable 122a to the signal input terminal 191a of the display 43b.

The power supply ring 171b has the same diameter as the pipe 161, is formed of an electrically conductive metal, contacts the power supply cable 122b at an inner side of the power supply ring 171b, and contacts the power supply terminal 191b of the display 43b at the outer side of the power supply ring 171b. The power supply ring 171b transmits electrical power from the power supply cable 122b to the power supply terminal 191b of the display 43b.

When the central display section 42b is rotated as illustrated in FIGS. 17 and 18, the display 43b mounted to the central display section 42b is also rotated. As shown at the right side in FIG. 19, the signal input terminal 191a and the power supply terminal 191b of the display 43b are in contact with the signal ring 171a and the power supply ring 171b, respectively, and can, thus, continuously receive a signal and power supply. In this case, the signal cable 122a and the power supply cable 122b do not move.

As can be understood from the foregoing description, the multi-television unit 21 shown in FIG. 4 can obviously rotate as a single unit around the vertical axis P as a center as shown in FIGS. 5A to 5C, or the display unit 31 of the multi-television unit 21 can be rotated without rotating the lower portion of the multi-television unit 21 (that is, the base unit 32 and the accommodating portion 41b of the display unit 31) as shown in FIGS. 6A to 6C. This allows the displays 43a to 43c to rotate as an integral unit in the range of 180 degrees from their forward facing orientation).

Figure 7:
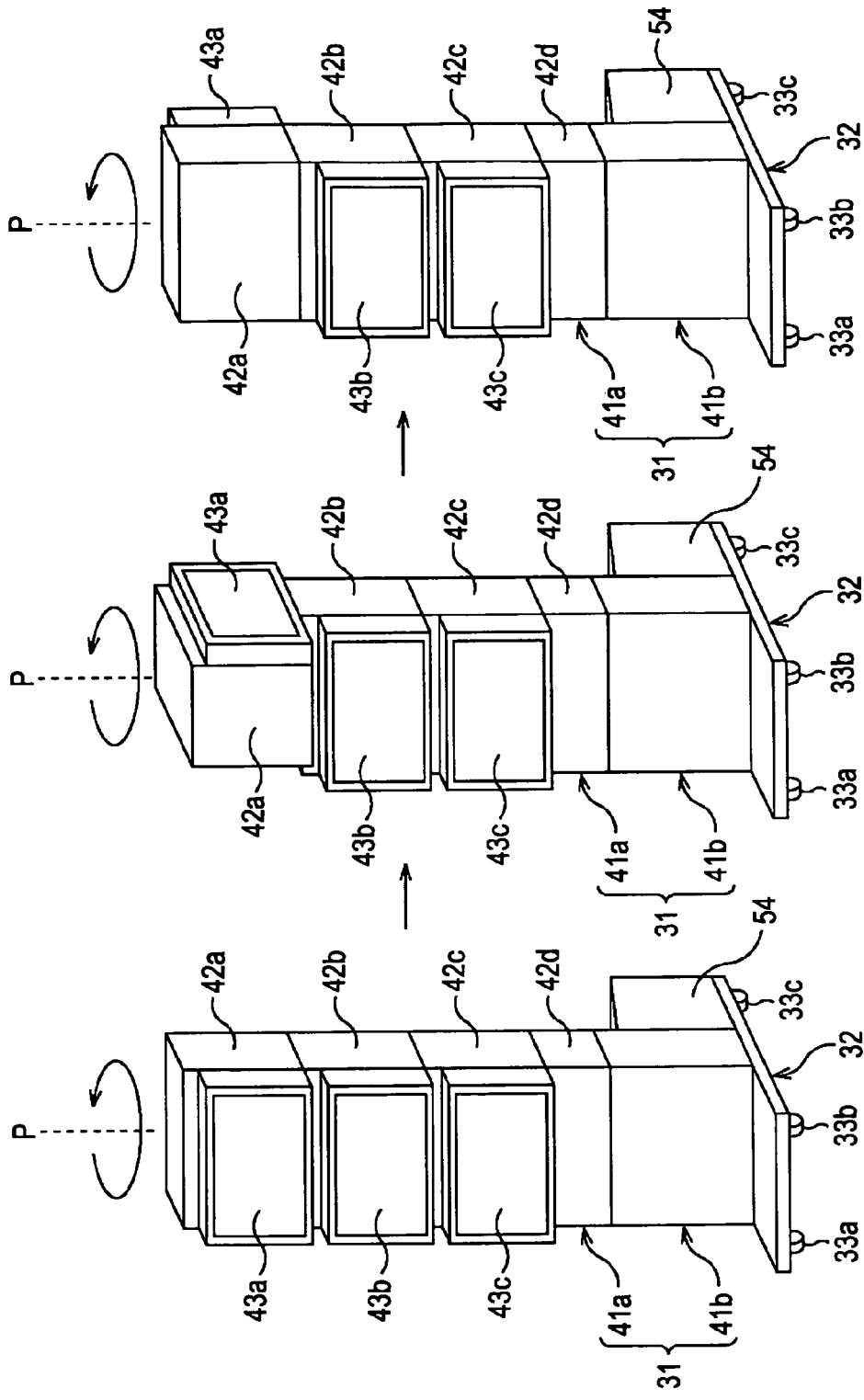
FIGS. 7A to 7C illustrate operations of the multi-television unit 21.

Further, according to the multi-television unit 21, as shown in FIG. 7, the upper display section 42a, the central display section 42b, and the lower display section 42c can be individually rotated (in the range of 180 degrees from their forward facing orientation).

The multi-television unit 21 can be easily, quickly, and precisely secured to an adjacent multi-television unit 21 by the fitting 51a, the retainer pawl 52b, the fitting 52a, and the retainer pawl 51b (which are mounted to the top surface 44 of the display unit 31), or the recess 53a and the protrusion 53b (disposed at the respective side surfaces of the base unit 32).

Figure 20:
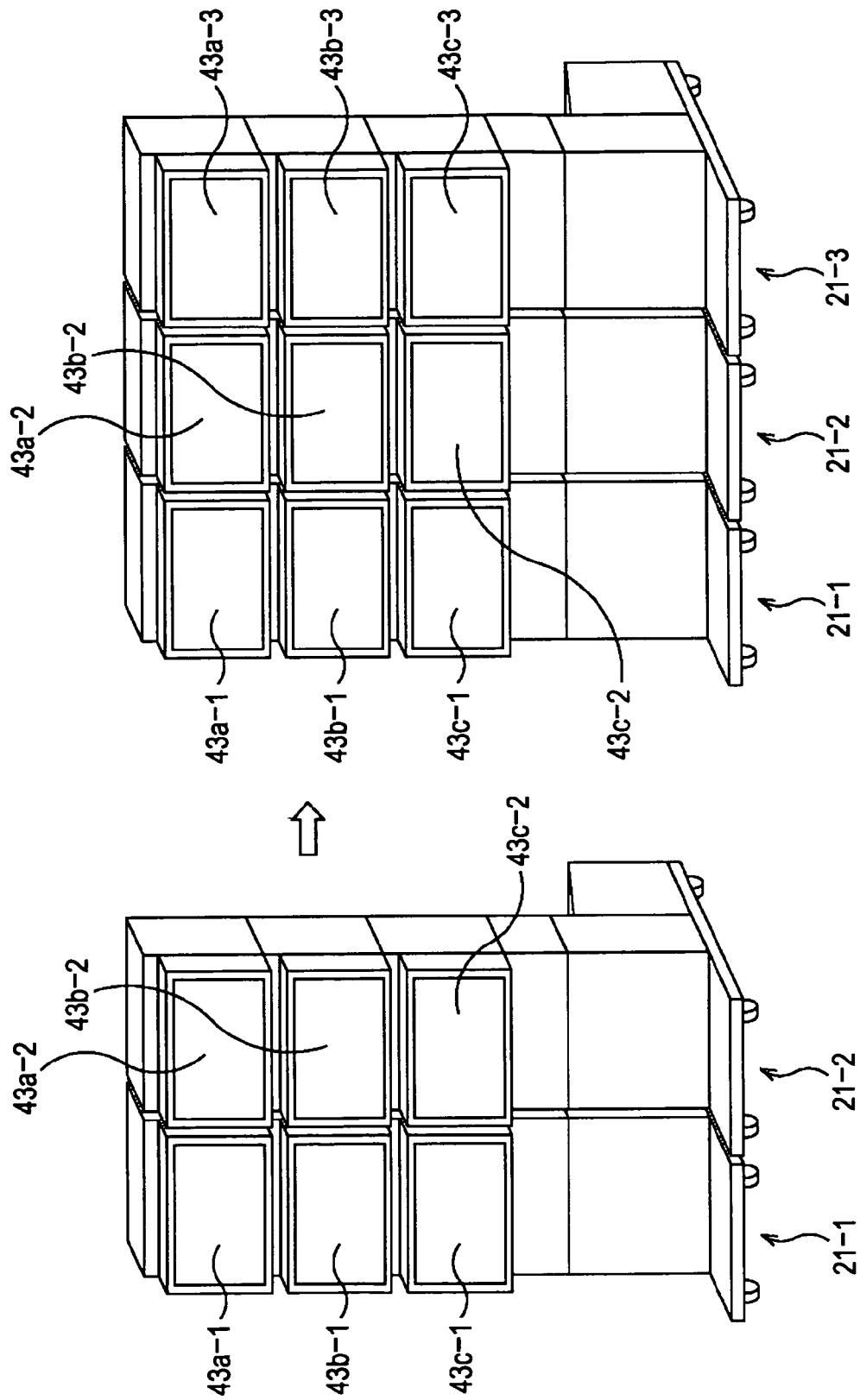
FIG. 20 shows a multi-television system including a plurality of the multi-television units 21 shown in FIG. 4.

Therefore, it is possible to easily construct a multi-television system including n multi-television units 21-n, such as a multi-television system shown in FIG. 20 including two multi-television units 21-1 and 21-2 or three multi-television units 21-1 to 21-3. In other words, a multi-television system whose display structure can be flexibly changed can be provided.

Figure 21:
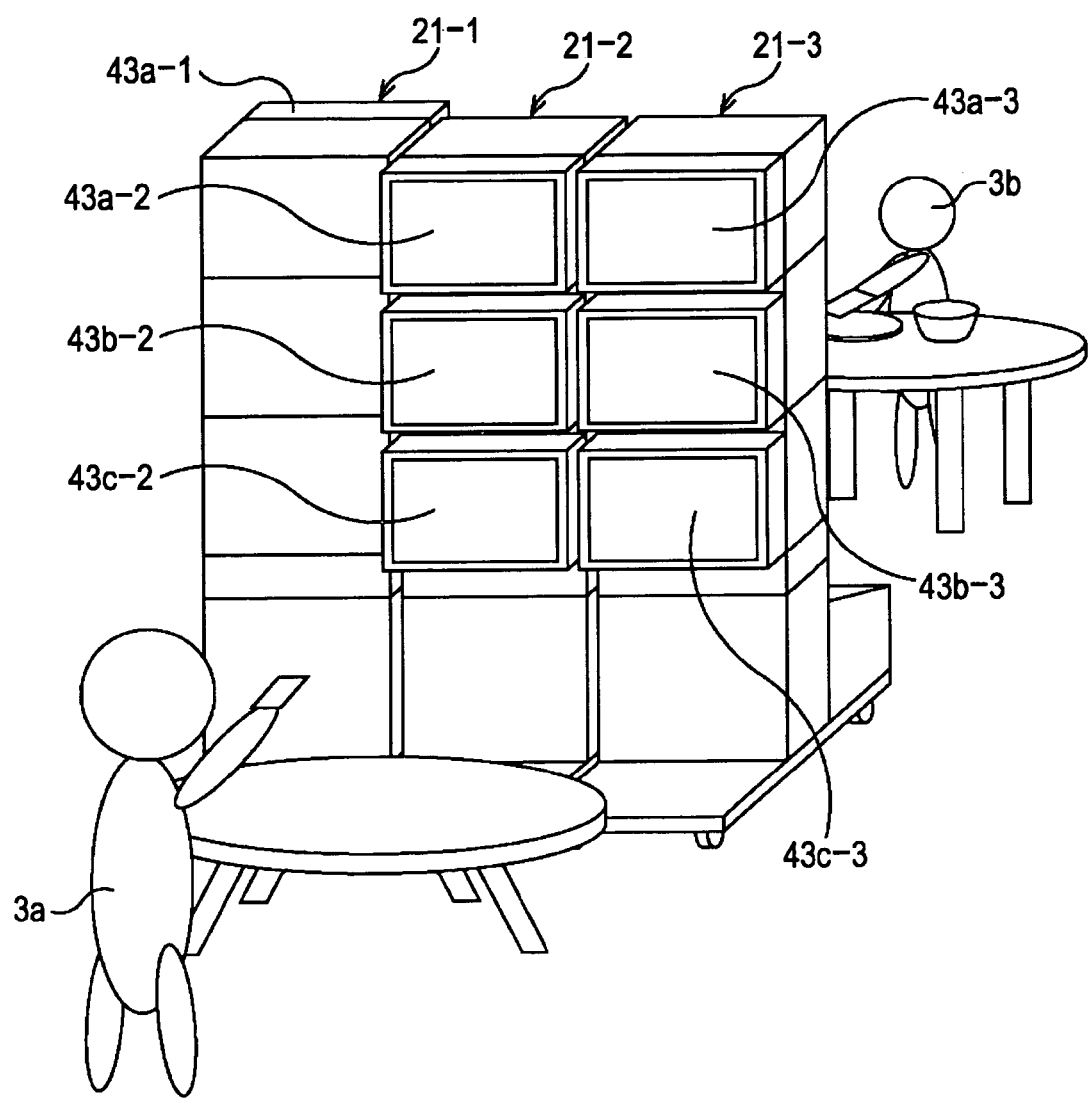
FIG. 21 shows a multi-television system using a plurality of the multi-television units 21 shown in FIG. 2.

For example, as shown in FIG. 21, when a multi-television system includes three multi-television units 21-1 to 21-3, any number of displays among nine displays 43a-1 to 43c-3 may be inverted in accordance with the purpose of use of the displays.

In FIG. 21, in the multi-television system including the three multi-television units 21-1 to 21-3, the three displays 43a-1 to 43c-1 of the multi-television unit 21-1 are inverted.

In this case, among the displays of the three multi-television units 21-1 to 21-3, a user 3a in a living room watches and listens to a program through the six displays 43a-2 to 43c-2 and 43c-1 to 43c-3, and a user 3b in a dining room watches and listens to a program through the three displays 43a-1 to 43c-1.

Although, in the above-described multi-television unit 21, the three displays 43a to 43c is described as being disposed vertically in one column and rotating singly or all together, the three displays 43a to 43c may be disposed horizontally in one row and rotated singly or all together.

The number of displays which are mounted to the multi-television unit 21 is not limited to three, so that any number of them can be mounted.

According to the first embodiment of the present invention, it is possible to provide a multi-television system whose display structure can be flexibly changed.

A second embodiment of the present invention will hereunder be described. Claimed structural features and specific forms in the second embodiment according to the present invention correspond to each other by way of exemplification as follows. This correspondence description is for confirming that specific forms that support claimed inventions are stated in the description of the preferred embodiments. Therefore, if a specific form is set forth in the second embodiment according to the present invention but not as one that corresponds to a claimed structural feature, this does not mean that this specific form does not correspond to the claimed structural feature. In contrast, if a specific form is set forth here as one that corresponds to a claimed structural feature, this does not mean that this specific form does not correspond to any claimed structural feature other than the claimed structural feature to which the specific form corresponds here.

Further, this correspondence description does not necessarily imply that all inventions corresponding to the specific forms set forth in the description of the second embodiment according to the present invention are set forth in the claims. In other words, this correspondence description refers to the inventions corresponding to the specific forms set forth in the second embodiment according to the present invention and does not deny the existence of an invention not set forth in the claims of this application, that is, does not deny the existence of an invention resulting from a divisional application or addition by amendment in the future.

According to an embodiment of the present invention, there is provided a display device (for example, television 230 shown in FIG. 28) capable of being used to form a display system (for example, a display system 221 shown in FIG. 22) by connecting the display device to at least one other display device so that the display system includes the plurality of the display devices. The display device includes at least one first connecting member (for example, IEEE1394 connectors $C_R$, $C_L$, $C_U$, or $C_N$), a connection detector (for example, a position detector 251 shown in FIG. 28), and a display controller (for example, a controller 252 shown in FIG. 28). The at least one direct-connection display device included in the at least one other display device is connectable to the at least one first connecting member and is directly connected to the display device which is connected to the at least one other display device. The connection detector makes a detection as to whether or not the at least one direct-connection display device is connected to the at least one first connecting member and determines a position of the display device which is connected to the at least one other display device in the display system by obtaining device-structure information from the at least one direct-connection display device when the connection detector detects that the at least one direct-connection display device is connected to the at least one first connecting member, the device-structure information being information regarding a structure of the display device or display devices of the display system linearly disposed in a direction of the at least one direct-connection display device from the display device which is connected to the at least one other display device. The display controller controls an image that is displayed on a display section of the display device which is connected to the at least one other display device, on the basis of the position of the display device detected by the connection detector.

In one form, the display device further includes a second connecting member (for example, IEEE1394 connectors $C_1$ to $C_8$ shown in FIG. 29) to which another display device included in the at least one other display device of the display system is connected. The connection detector further makes a detection as to whether or not the another display device is connected to the second connecting member and, when the another display device is connected to the second connecting member, obtains information regarding a position of the another display device with respect to the display device which is connected to the at least one other display device and provides the position of the another display device in the display system to the another display device. The display controller controls the image that is displayed on the display section of the display device, on the basis of the position of the another display device.

The second embodiment of the present invention will hereunder be described with reference to the drawings.

Figure 22:
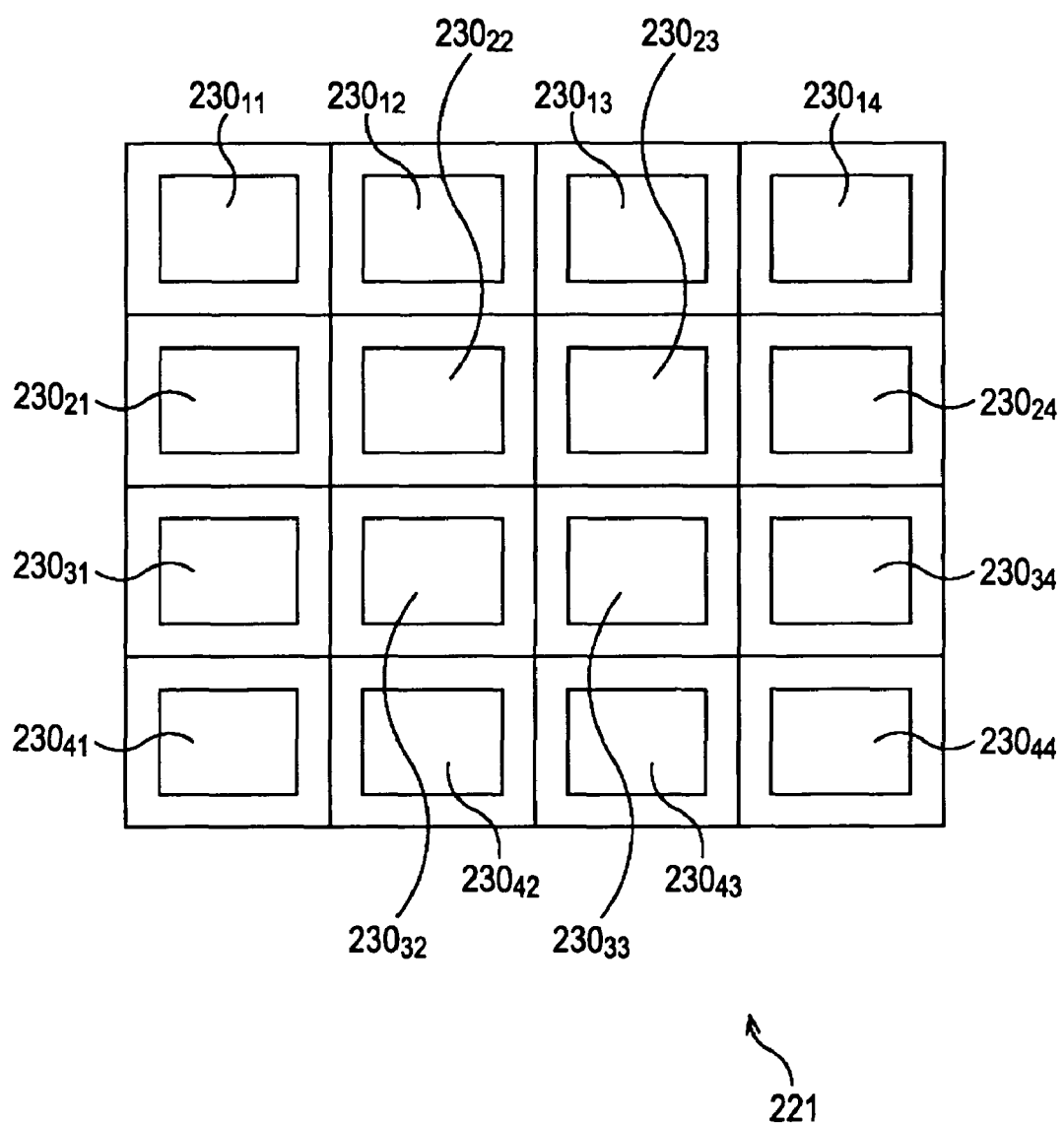
FIG. 22 shows a structure of a multi-television system according to an embodiment to which the present invention is applied.

FIG. 22 shows a structure of a multi-television system according to the second embodiment to which the present invention is applied.

A multi-television system 221 shown in FIG. 22 includes 16 televisions, that is, televisions $230_{11}$, $230_{12}$, $230_{13}$, $230_{14}$, $230_{21}$, $230_{22}$, $230_{23}$, $230_{24}$, $230_{31}$, $230_{32}$, $230_{33}$, $230_{34}$, $230_{41}$, $230_{42}$, $230_{43}$, and $230_{44}$.

Figure 1:
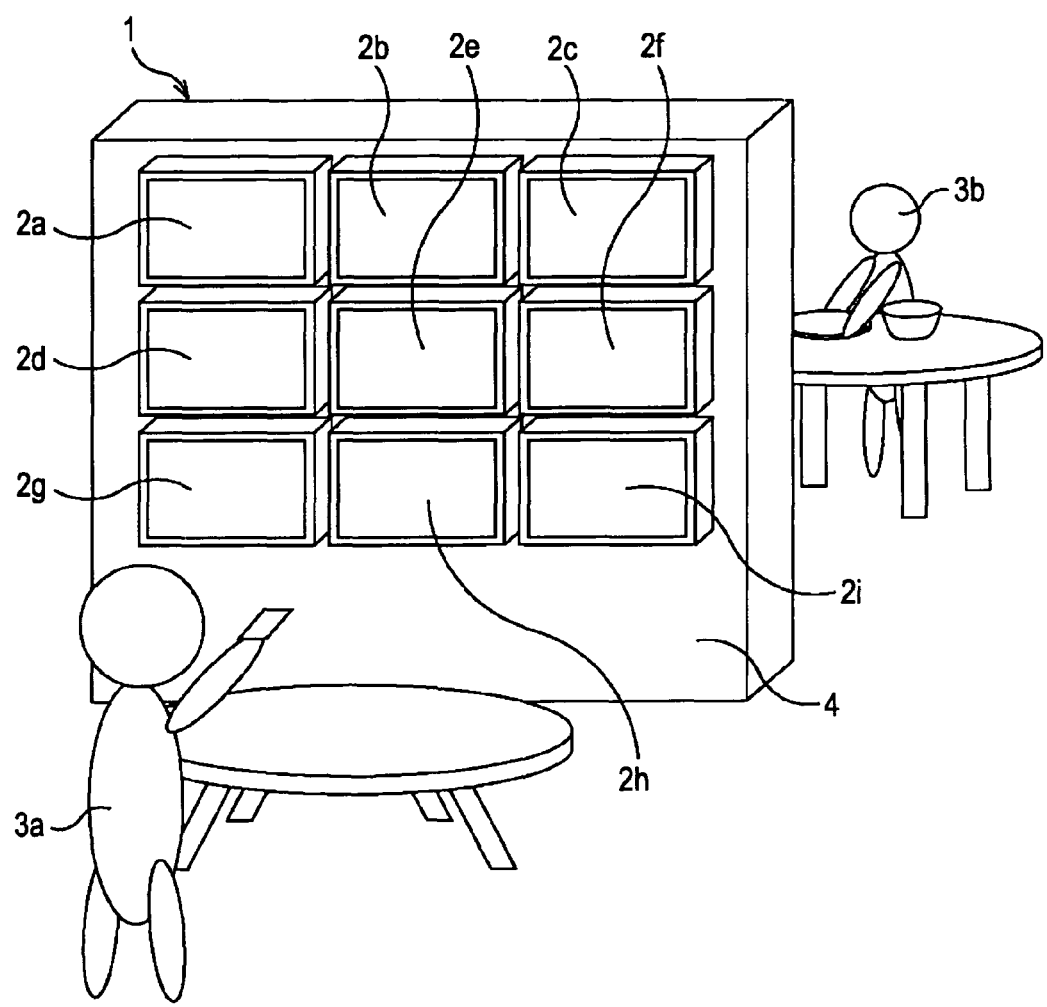
FIG. 1 shows an example of a related multi-television system.
Figure 2:
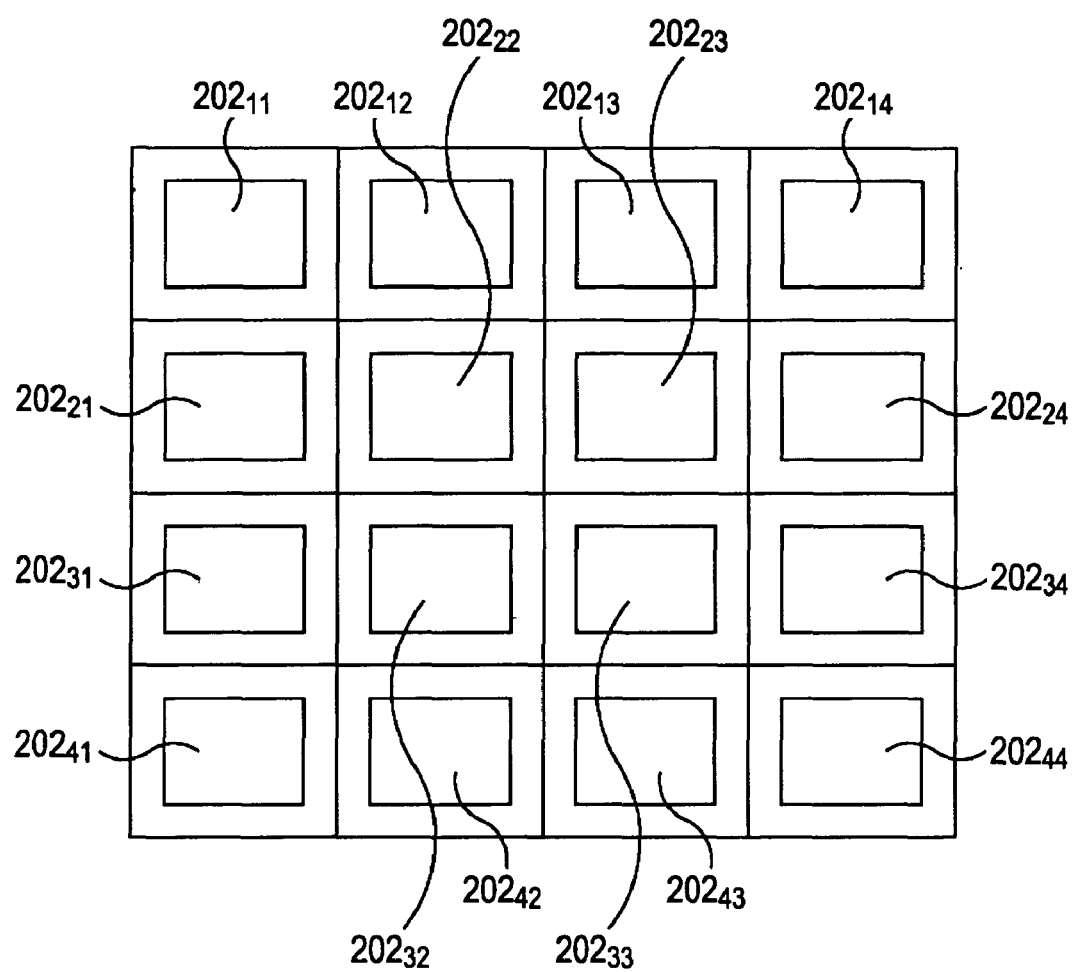
FIG. 2 shows a related 4×4 multi-television system.

Here, as in the case shown in FIG. 2, the suffix ij in television $230_{ij}$ indicates an ith row and a jth column (ith row from the top and jth column from the left) in the multi-television system 221. When the televisions $230_{ij}$ do not need to be particularly distinguished, they will be referred to as the "televisions 230."

Figure 23:
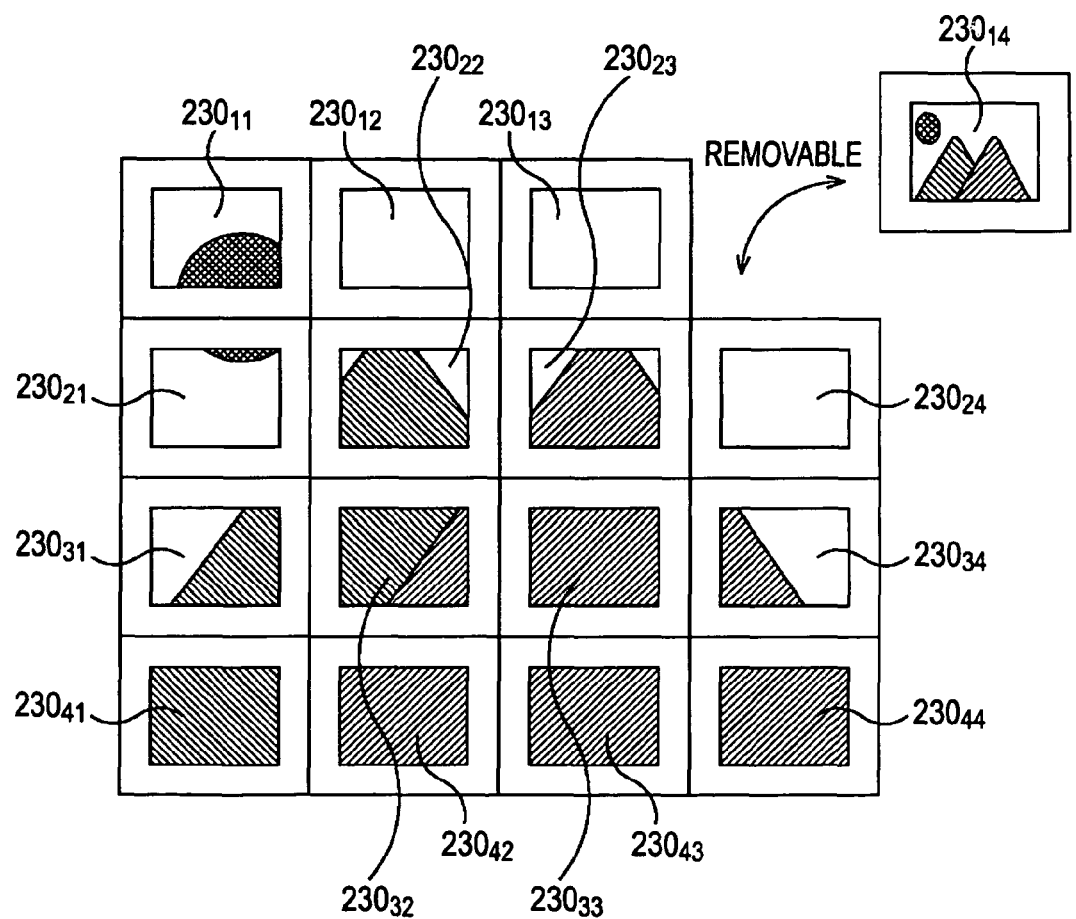
FIG. 23 illustrates a multi-television system 221.

The televisions 230 making up the multi-television system 221 are secured to a special-purpose rack (securing plate) 291 (refer to FIGS. 32 and 37A and 37B) from their back surfaces. In addition, it is possible to secure the televisions 230 making up the multi-television system 221 together. As shown in FIG. 23, the televisions 230 are each removable, so that any television 230 may be removed from the multi-television system 221 or a television 230 may be added to the multi-television system 221.

Figure 24:
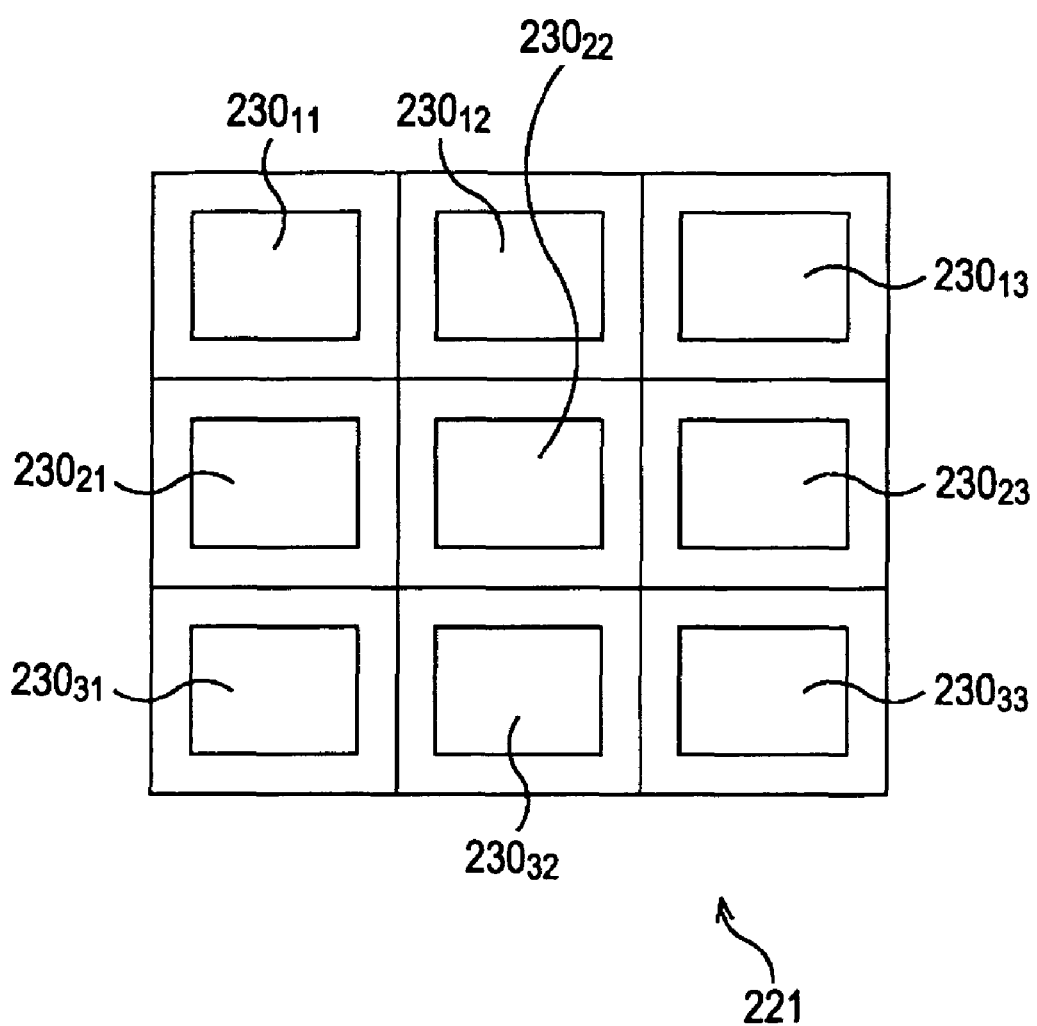
FIG. 24 shows a structure of a multi-television system according to another embodiment to which the present invention is applied.

For example, when, in the multi-television system 221 shown in FIG. 23, the televisions $230_{14}$, $230_{24}$, $230_{34}$, and $230_{44}$ in a left column and the televisions $230_{41}$, $230_{42}$, $230_{43}$, and $230_{44}$ in a bottom row are removed, the multi-television system 221 is one including nine televisions, that is, the televisions $230_{11}$, $230_{12}$, $230_{13}$, $230_{21}$, $230_{22}$, $230_{23}$, $230_{31}$, $230_{32}$, and $230_{33}$ as shown in FIG. 24.

By connecting the plurality of televisions 230 with each other, the multi-television system 221 can provide functions that are not provided by a single television 230. For example, the multi-television system 221 can provide a large screen for displaying one image with nine televisions 230 or a stroboscopic function for displaying a static image (formed by stopping a moving image for a predetermined period of time) successively on each television 230 in a time series.

The rack 291 (refer to FIGS. 37A and 27B) to which the televisions 230 are secured allows each television 230 making up the multi-television system 221 to rotate around a vertical axis of the television through an angle of 180 degrees, so that even a user at the back side of the televisions 230 can watch and listen to an image.

Figure 25A:
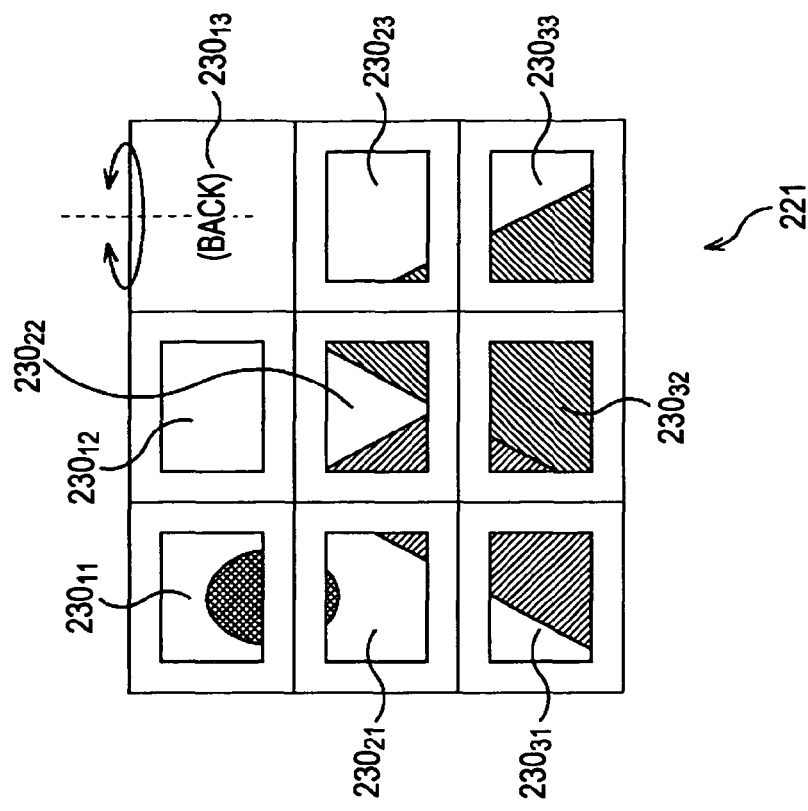
FIGS. 25A and 25B illustrate a multi-television system 221.
Figure 25B:
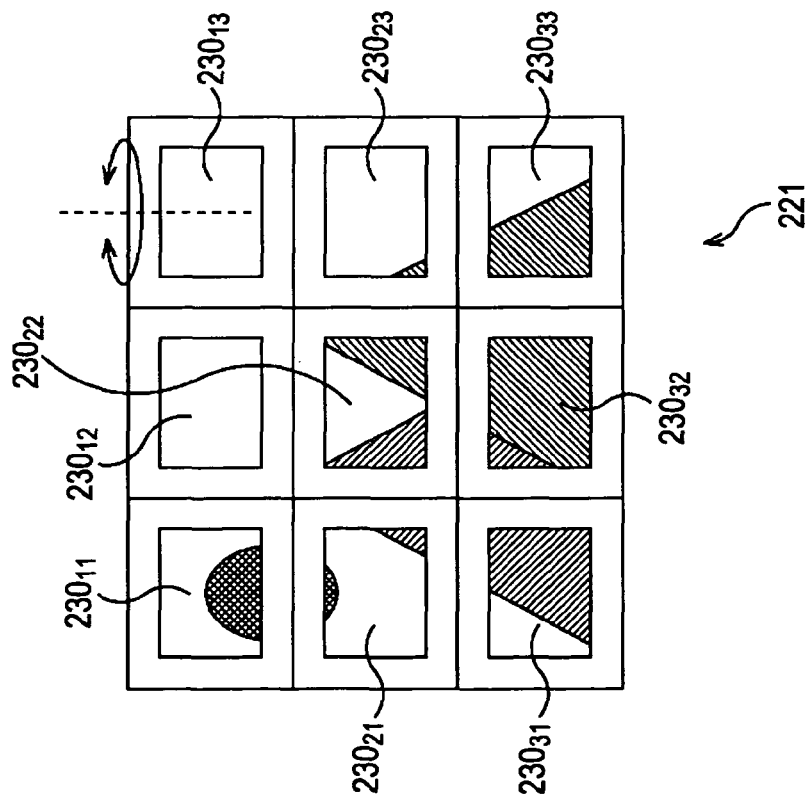

The number of televisions 230 to be rotated may be one or more televisions 230. FIGS. 25A and 25B show an example in which, of nine televisions 230 making up a multi-television system 221, only a television $230_{13}$ is rotated. More specifically, FIG. 25A shows a state in which the television $230_{13}$ faces the same side (front side) as eight other televisions $230_{11}$, $230_{12}$ and $230_{21}$ to $230_{33}$, and FIG. 25B shows a state in which the television $230_{13}$ faces a back side that is opposite to the front side which the eight other televisions $230_{11}$, $230_{12}$ and $230_{21}$ to $230_{33}$ face.

Figure 26A:
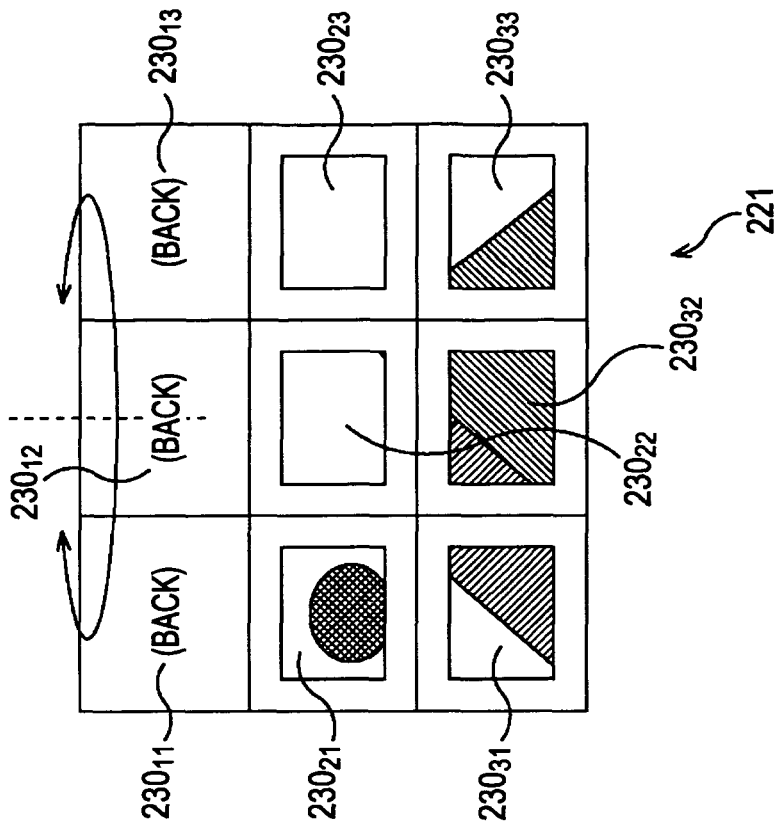
FIGS. 26A and 26B illustrate the multi-television system 221.
Figure 26B:
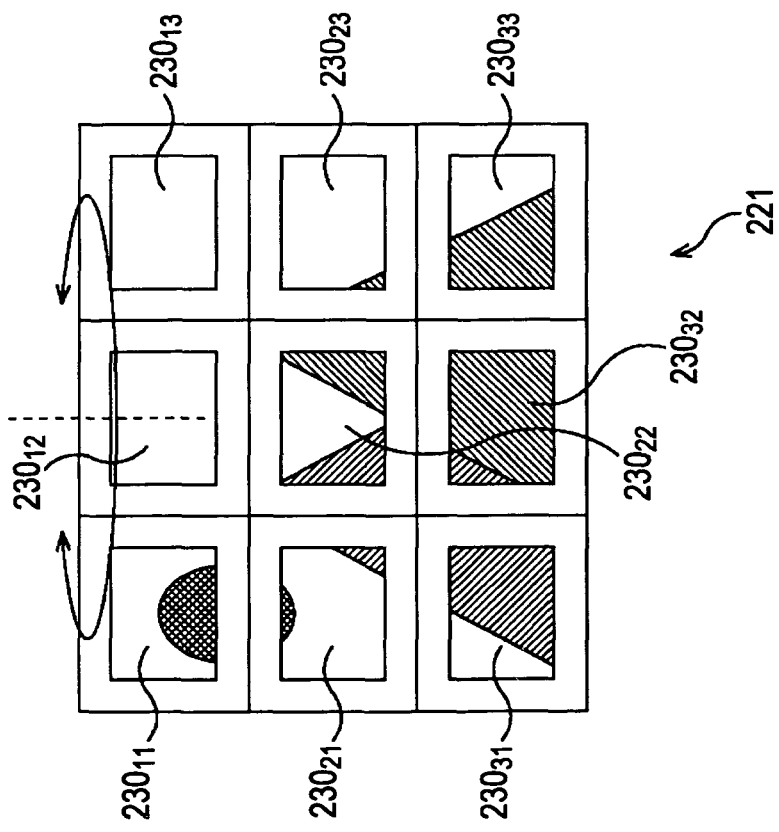

FIGS. 26A and 26B show an example in which, of the nine televisions 230 making up the multi-television system 221, the televisions $230_{11}$ to $230_{13}$ in the first row are rotated around an axis passing though the center of the television $230_{12}$. More specifically, FIG. 26A shows a state in which the televisions $230_{11}$ to $230_{13}$ in the first row face the same side (front side) as the six other televisions $230_{21}$ to $230_{33}$, and FIG. 26B shows a state in which the televisions $230_{11}$ to $230_{13}$ face the back side that is opposite to the front side which the six other televisions $230_{21}$ to $230_{33}$ face.

When the structure (state) of the televisions 230 making up the multi-television system 221 is changed due to removal or rotation of a television or televisions 230 making up the multi-television system 221, this change in the structure (state) can be detected to display an image in accordance with the change in the structure (state).

For example, as shown in FIG. 26A, when the nine televisions $230_{11}$ to $230_{33}$ all face the same side (the front side), the nine televisions $230_{11}$ to $230_{33}$ each display 1/9th of an entire image so as to display the one entire image by the nine televisions $230_{11}$ to $230_{33}$.

As shown in FIG. 26B, when the televisions $230_{11}$ to $230_{13}$ in the first row are rotated around the axis passing through the center of the television $230_{12}$ and face the back side, the remaining six televisions $230_{21}$ to $230_{33}$ each display 1/6th of the one entire image so that the entire image is displayed by the six televisions $230_{21}$ to $230_{33}$. In contrast, of the televisions $230_{11}$ to $230_{13}$ facing the back side, one of them (such as the television $230_{13}$) displays the entire image. In other words, when the television $230_{13}$ is facing the front side, it displays 1/9th of the entire image, whereas when the television $230_{13}$ is facing the back side, it displays the entire image.

The display mode that determines the number of televisions 230 among the televisions 230 facing the same side to be used for a displaying operation and the kind of image to be displayed using the television(s) 230 is not limited to that of the aforementioned example, so that it is possible to use various other display modes.

The multi-television system shown in FIG. 22 including 16 televisions 230 and the multi-television system 221 shown in FIG. 24 including nine televisions 230 are formed by combining a plurality of multi-television units including one television 230 serving as a controlling device and a plurality of televisions 230 serving as non-controlling devices.

A single multi-television unit may be defined as a multi-television system including a plurality of televisions 230.

Figure 27:
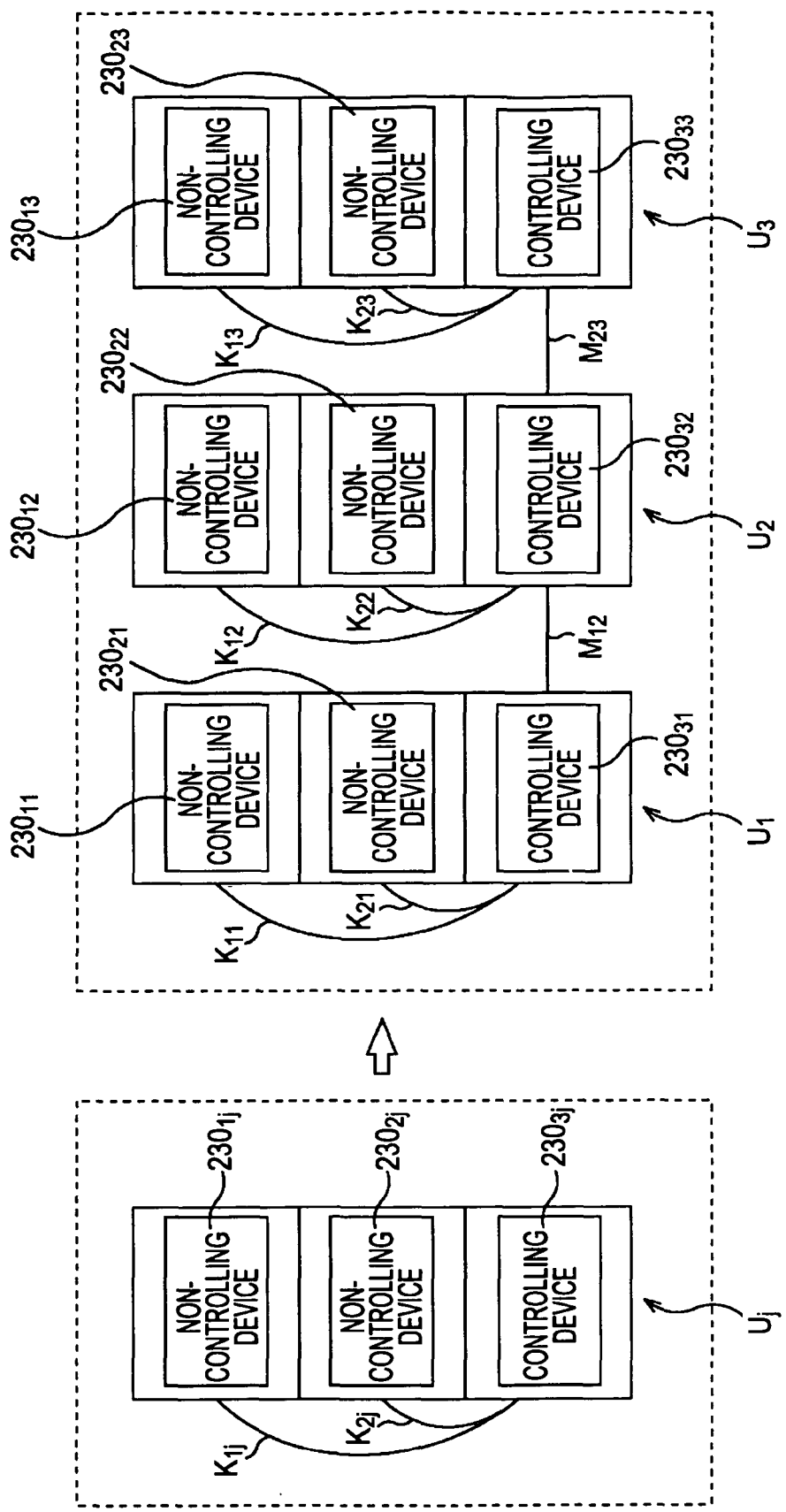
FIG. 27 illustrates a multi-television system 221.

As shown in FIG. 27, the multi-television system 221 shown in FIG. 24 including the nine televisions 230 is, for example, formed by horizontally connecting three multi-television units $U_j$ including three televisions $230_{1j}$ to $230_{3j}$ (j=1, 2, or 3) disposed vertically in a column. In other words, the multi-television system 221 including the nine televisions 230 is formed by multi-television units $U_1$ to $U_3$.

The television $230_{3j}$ disposed at the bottommost portion of each multi-television unit $U_j$ (j=1, 2, or 3) is the controlling device, and the two upper televisions $230_{1j}$ and $230_{2j}$ of each multi-television unit $U_j$ are non-controlling devices.

Each controlling television $230_{3j}$ is connected to all non-controlling devices within its associated multi-television unit $U_j$ and to the controlling device of another multi-television unit $U_h$ (j≠h) or to the controlling devices of the other multi-television units $U_h$. The non-controlling televisions $230_{1j}$ and $230_{2j}$ are connected to only the controlling device of their corresponding multi-television unit $U_j$.

More specifically, the televisions $230_{1j}$ and $230_{2j}$, which are non-controlling devices in the multi-television unit $U_j$ (j=1, 2, or 3) are connected to the television $230_{3j}$, which is the controlling device, by a cable $K_{1j}$ and $K_{2j}$, respectively. That is, in the multi-television unit $U_1$, the television $230_{11}$ and the television $230_{31}$ are connected to each other by the cable $K_{11}$, and the television $230_{21}$ and the television $230_{31}$ are connected to each other by the cable $K_{21}$. In the multi-television unit $U_2$, the television $230_{12}$ and the television $230_{32}$ are connected to each other by the cable $K_{12}$, and the television $230_{22}$ and the television $230_{32}$ are connected to each other by the cable $K_{22}$. In the multi-television unit $U_3$, the television $230_{13}$ and the television $230_{33}$ are connected to each other by the cable $K_{13}$, and the television $230_{23}$ and the television $230_{33}$ are connected to each other by the cable $K_{23}$.

The multi-television unit $U_1$ and the multi-television unit $U_2$ are connected to each other by a cable $M_{12}$, and the multi-television unit $U_2$ and the multi-television $U_3$ are connected to each other by a cable $M_{23}$.

When the cables $K_{1j}$ and cables $M_{12}$ and $M_{23}$ do not hereunder particularly need to be distinguished, they will simply be called the "cables K" and "cables M." Similarly, when the multi-television units $U_j$ do not particularly need to be distinguished, they will simply be called the "multi-television units U."

Figure 3:
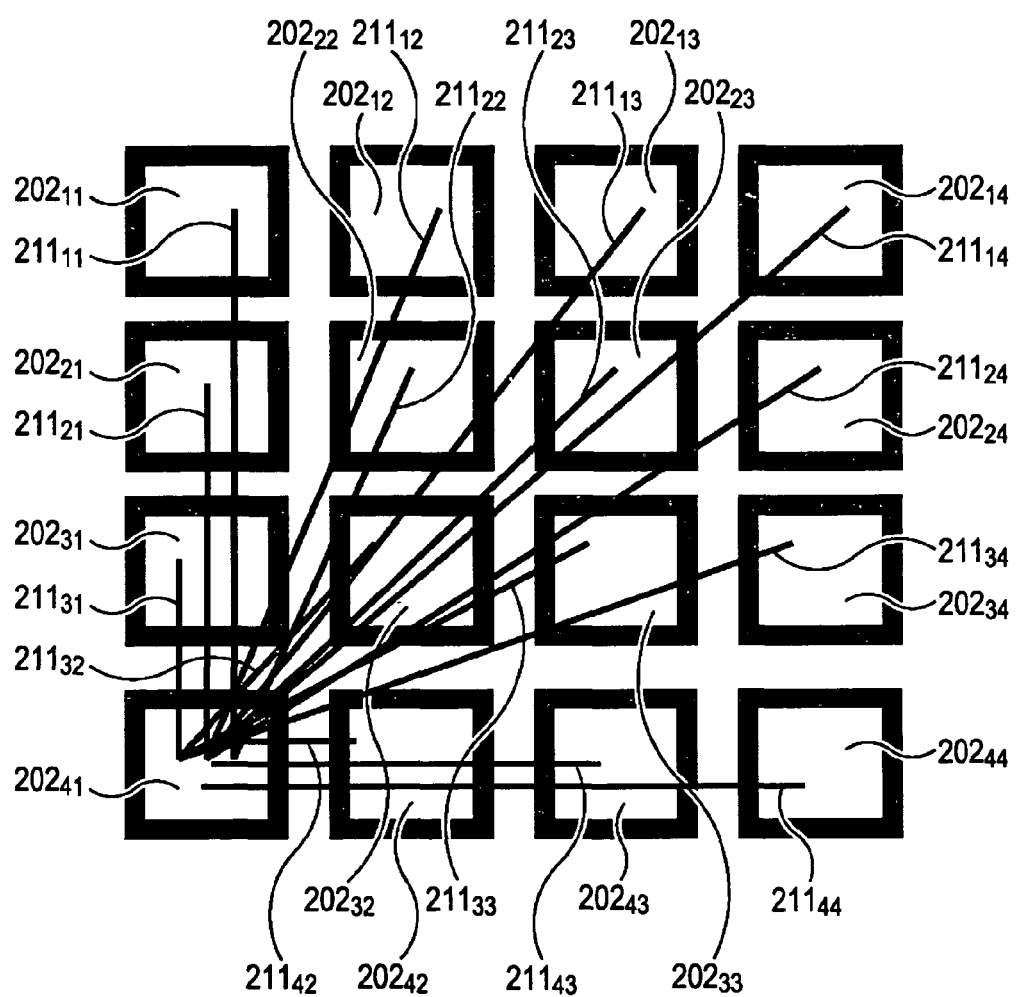
FIG. 3 shows an example of connections in the multi-television system shown in FIG. 2.

As shown in FIG. 27, when the multi-television system 221 is formed so as to include a plurality of multi-television units $U_j$ having controlling devices and non-controlling devices, that is, when the multi-television units $U_j$ are connected in a cascade form, even if the multi-television system 221 is a large-scale system, it is possible to reduce the number of non-controlling devices and to prevent the cables (cables K and M) from being concentrated at the controlling devices. In other words, compared to the method shown in FIG. 3 of connecting cables between the related televisions 202, the method of connection shown in FIG. 27 is far simpler (has considerably fewer connections).

Each television 230 of each multi-television unit $U_j$ (multi-television system 221) can become either a controlling device or a non-controlling device. Therefore, it is possible to, when three televisions $230_{i1}$ to $230_{i3}$ (i=1, 2, or 3) disposed horizontally in a row form one multi-television unit $U_j$, form the multi-television system 221 shown in FIG. 24 by connecting three of them in the vertical direction.

Next, a television 230 which operates as a controlling device or a non-controlling device in the multi-television unit $U_j$ (the multi-television system 221) will be described in more detail.

Figure 28:
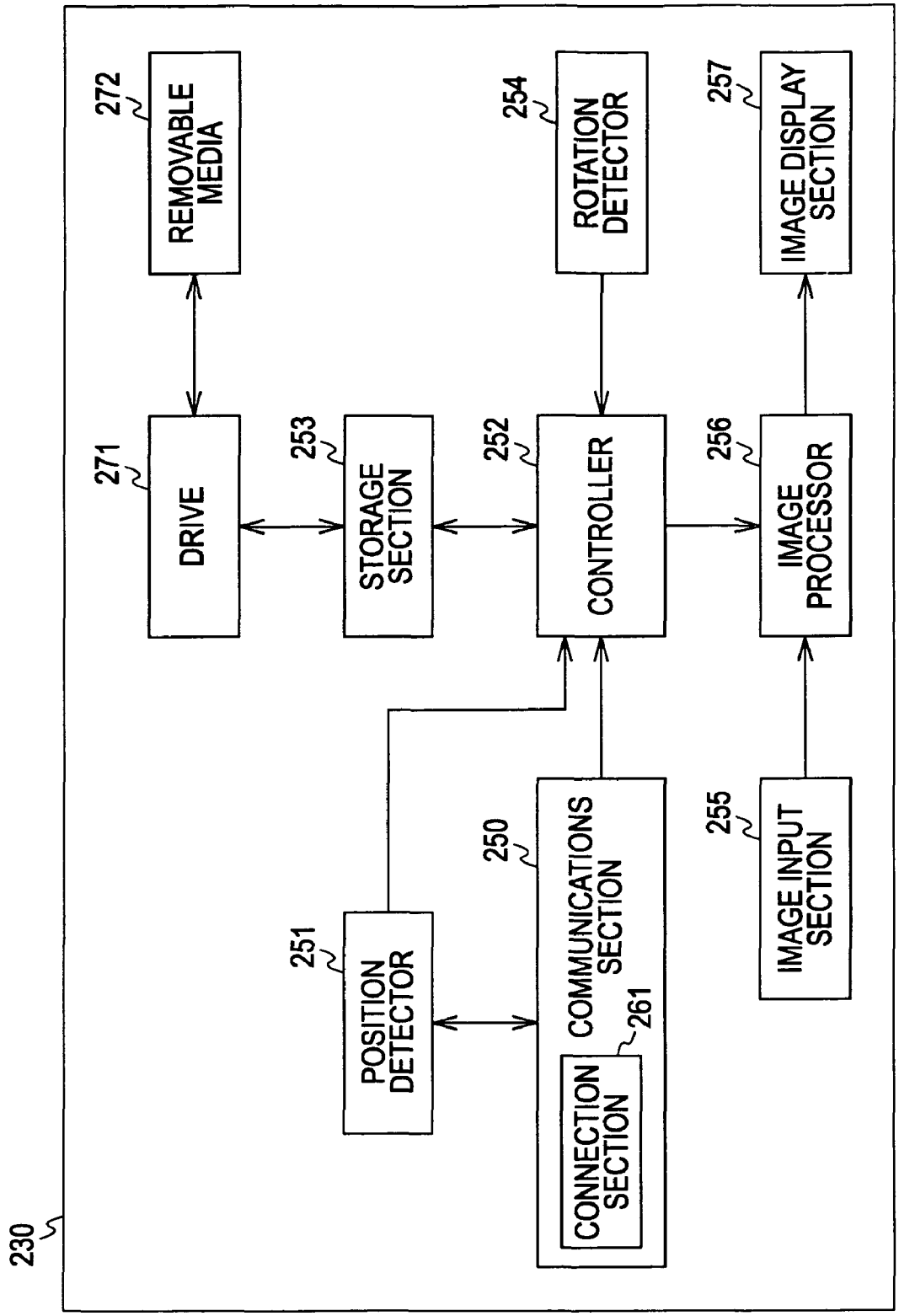
FIG. 28 is a block diagram of an example of a structure of a television 230.

FIG. 28 is a block diagram of an example of a structure of a television 230 in the multi-television unit $U_j$ (the multi-television system 221).

A communication section 250 has a connection section 261 and performs communication with another television 230 through cables K or M connected to the connection section 261. In other words, for example, the communication section 250 performs serial communication (hereunder referred to as "IEEE1394 communication" when appropriate) in accordance with an Institute of Electrical and Electronics Engineers (IEEE) 1394 standard. The connection section 261 has a plurality of IEEE1394 connectors to which the cables K or M are connected as IEEE1394 cables.

The communication section 250 also performs communication with a remote controller (not shown) by, for example, infrared light, and receives a command from a user. For example, the communication section 250 receives, for example, a display mode of the television 230 instructed by the user, and supplies it to the controller 252. Here, examples of the display mode are the aforementioned large-screen mode for executing a large-screen function and the aforementioned stroboscopic mode for executing a stroboscopic function.

When the position detector 251 is such that it (television 230) is a controlling device, and performs IEEE1394 communication with a controlling television 230 of another multi-television unit U, the position detector 251 obtains information regarding how many and in what direction(s) (rightward, leftward, upward, or downward) televisions 230 other than those of its own multi-television unit U are connected. In addition, the position detector 251 performs calculations on each non-controlling television in its own multi-television unit U to determine where in the entire multi-television system 221 each television 230 is disposed (that is, to obtain information concerning disposition of the non-controlling televisions 230), and transmits this information through the communication section 250 by IEEE 1394 communication.

In contrast, when the position detector 251 is such that it (television 230) is a non-controlling device, and performs IEEE 1394 communication with a controlling television 230 through the communication section 250, it (the television 230) determines where it (the television 230) is disposed in the multi-television system 221.

In order for each television 230 making up the multi-television system 221 to display a consistent image in terms of the multi-television system 221 as a whole, the disposition (physical position) of each television 230 in the multi-television system 221 and the rotational state of each television 230 (whether it is facing front or back) are determined.

Accordingly, the controller 252 controls an image processor 256 so that it (television 230) displays a consistent image in terms of the multi-television system 221 as a whole.

In other words, its (the television 230) information is supplied to the controller 252 from the position detector 251 and a result of determination as to whether it (the television 230) is facing front or back is supplied to the controller 252 from a rotation detector 254. In addition, rotational states of other televisions 230 are supplied to the controller 252 from the communication section 250.

The controller 252 causes the disposition information supplied from the position detector 251 to be stored in a storage section 253. The controller 252 controls the image processor 256 in accordance with the display mode (instructed by the user) supplied from the communication section 250, the result of determination from the rotation detector 254, and the rotational states of the other televisions 230.

The controller 252 transmits to another television 230 through the communication section 250 the rotational state of the result of determination as to whether it (the television 230) is facing the front or back. Here, the front or back of the television 230 is determined in common with each television 230 making up the multi-television system 221 with reference to a predetermined position (for example, the position of a certain user).

The storage section 253 stores its (the television 230) disposition information supplied from the controller 252. The storage section 253 stores data used by the controller 252 to perform a controlling operation.

The rotation detector 254 obtains a rotation signal indicating its (the television 230) rotation state. Then, from the obtained result, the rotation detector 254 supplies to the controller 252 the result of determination as to whether the television 230 is facing front or back.

An image input section 255 includes, for example, an antenna and a tuner and an external input terminal, and supplies a predetermined image signal that is being input to the image processor 256.

Under the control of the controller 252, the image processor 256 performs a predetermined operation on the image signal supplied from the image input section 255 and supplies the processed image signal to an image display section 257. For example, when the display mode is in the large-screen mode, the image processor 256 generates, of a one-screen image supplied from the image input section 255, an image of an area that it displays (partial image), and supplies the partial image to the image display section 257. On the other hand, when the display mode is in the stroboscopic mode, the image processor 256 supplies, of a dynamic image supplied from the image input section 255, one image (static image) of its display timing and supplies the selected image to the image display section 257.

The image display section 257 includes, for example, a thin display such as a PDP, an organic electroluminescence (EL) display, or a liquid crystal display (LCD), and displays the image supplied from the image processor 256.

A drive 271 is connected to the storage section 253 when appropriate. In addition, removable media (recording media) 272, such as semiconductor memories, magneto-optical discs, optical discs, or magnetic discs, are mounted to the drive 271, when appropriate. Further, a program or data read out from the removable media is installed in the storage section 253 as appropriate.

Figure 29:
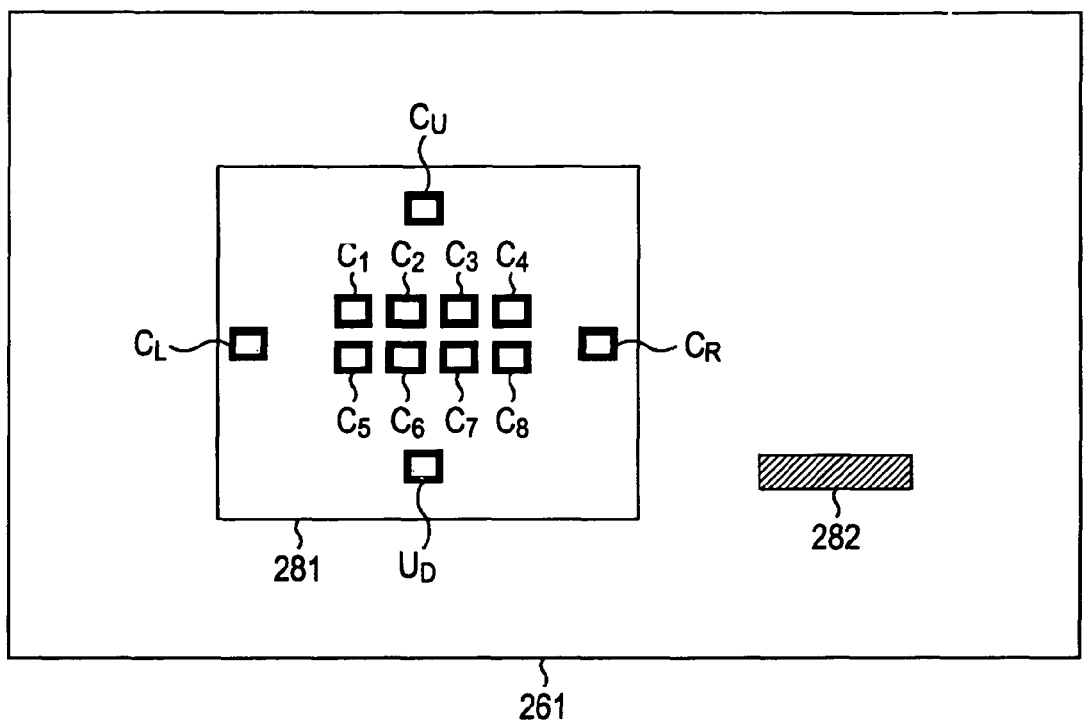
FIG. 29 shows an example of a structure of a connection section 261 shown in FIG. 28.

FIG. 29 shows an example of a structure of a connection section 261 disposed at the back surface (opposite to the front surface) of the television 230.

The connection section 261 has an IEEE1394 connection portion 281 where the IEEE1394 connectors are disposed and a connector 282 connected to a rack 291 (described later) shown in FIG. 32.

The IEEE1394 connection portion 182 has the IEEE1394 connectors $C_R$, $C_L$, $C_U$, and $C_D$ (first connectors) to which the cables (IEEE1394 cables) M which connect controlling devices of multi-television units U are mounted and IEEE1394 connectors $C_1$ to $C_8$ (second connectors) to which the cables (IEEE1394 cables) K which connect a controlling device with non-controlling devices in a multi-television unit U are mounted.

When the television 230 functions as a controlling device, the IEEE1394 connectors $C_R$, $C_L$, $C_U$, and $C_D$ are connectors to which are mounted the cables M for connection to controlling televisions 230 of other multi-television units U disposed on the right, left, top, and bottom of the television 230, respectively. Therefore, when a cable M is not mounted to the IEEE1394 connector $C_R$, $C_L$, $C_U$, or $C_D$, this means that a multi-television unit U is not connected to the IEEE1394 connector $C_R$, $C_L$, $C_U$, or $C_D$.

The IEEE1394 connectors $C_R$, $C_L$, $C_U$, and $C_D$ are disposed in the IEEE1394 connection portion 281 in accordance with the directions of connection. More specifically, as shown in FIG. 29, the IEEE1394 connector $C_R$ to which the cable M for connection with the right multi-television unit U is mounted is disposed at the right in the IEEE1394 connection portion 281, and the IEEE1394 connector $C_L$ to which the cable M for connection with the left multi-television unit U is mounted is disposed at the left in the IEEE1394 connection portion 281.

Similarly, the IEEE1394 connector $C_U$ to which the cable M for connection with the upper multi-television unit U is mounted is disposed at the top in the IEEE1394 connection portion 281, and the IEEE1394 connector $C_D$ to which the cable M for connection with the lower multi-television unit U is mounted is disposed at the bottom in the IEEE1394 connection portion 281.

The IEEE 1394 connectors $C_1$ to $C_8$ are connectors to which are mounted the cables K for connecting the non-controlling devices with the controlling device in their own multi-television unit U.

Figure 30:
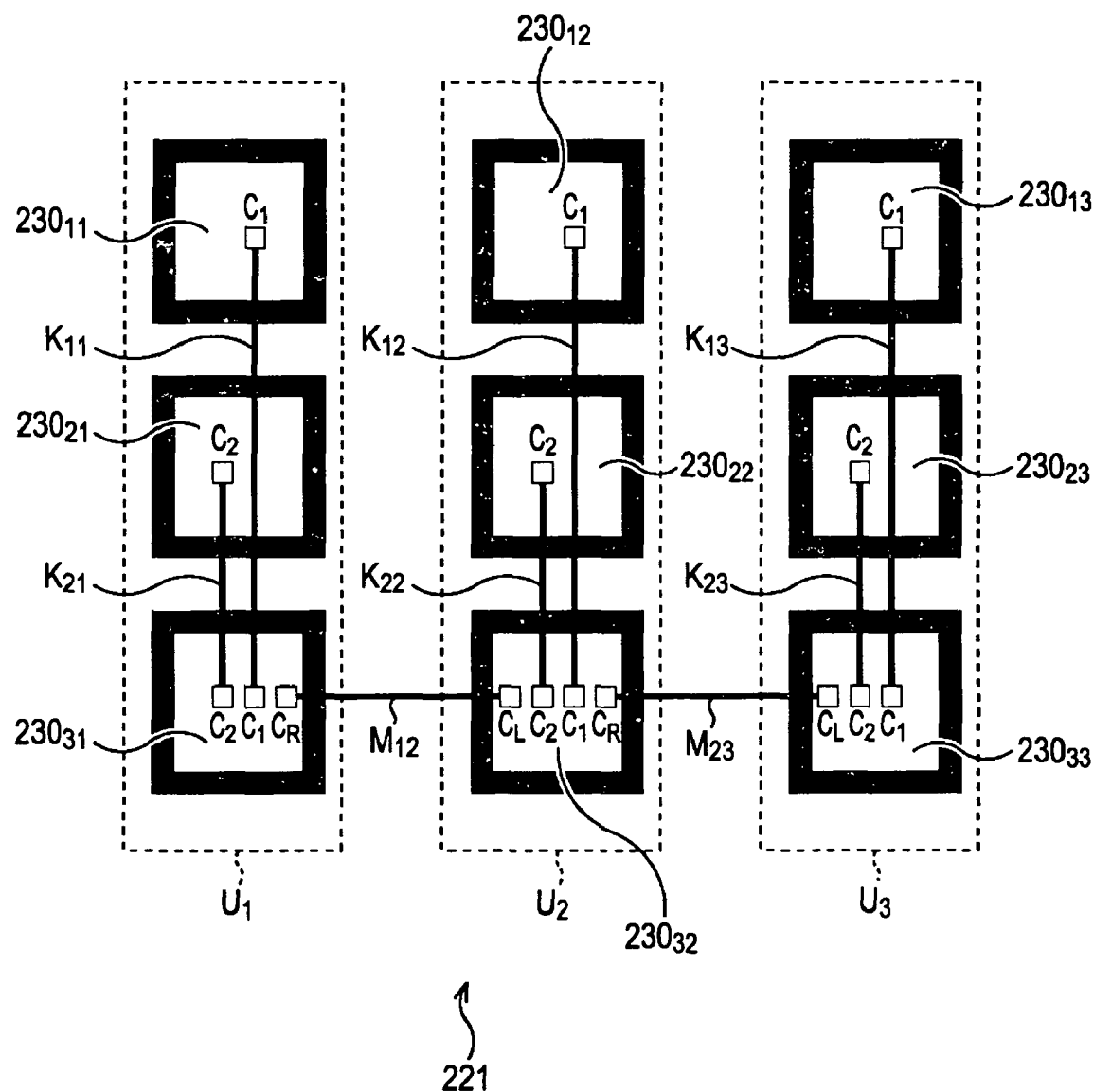
FIG. 30 shows an example of connections of IEEE1394 cables in the multi-television system 221.

FIG. 30 shows examples of connections of the IEEE1394 cables when the multi-television system 221 includes nine televisions 230, and the multi-television units $U_1$ to $U_3$ shown in FIG. 27.

In the multi-television unit $U_1$, the IEEE1394 connector $C_1$ of the non-controlling television $230_{11}$ and the IEEE1394 connector $C_1$ of the controlling television $230_{31}$ are connected to each other by the cable $K_{11}$. In addition, the IEEE1394 connector $C_2$ of the non-controlling television $230_{21}$ and the IEEE1394 connector $C_2$ of the controlling television $230_{31}$ are connected to each other by the cable $K_{21}$.

In the multi-television unit $U_2$, the IEEE1394 connector $C_1$ of the non-controlling television $230_{12}$ and the IEEE1394 connector $C_1$ of the controlling television $230_{32}$ are connected to each other by the cable $K_{12}$. In addition, the IEEE1394 connector $C_2$ of the non-controlling television $230_{22}$ and the IEEE1394 connector $C_2$ of the controlling television $230_{32}$ are connected to each other by the cable $K_{22}$.

In the multi-television unit $U_3$, the IEEE1394 connector $C_1$ of the non-controlling television $230_{13}$ and the IEEE1394 connector $C_1$ of the controlling television $230_{33}$ are connected to each other by the cable $K_{13}$. In addition, the IEEE1394 connector $C_2$ of the non-controlling television $230_{23}$ and the IEEE1394 connector $C_2$ of the controlling television $230_{33}$ are connected to each other by the cable $K_{23}$.

The IEEE1394 connector $C_R$ of the controlling television $230_{31}$ of the multi-television unit $U_1$ and the IEEE1394 connector $C_L$ of the controlling television $230_{32}$ of the multi-television unit $U_2$ (that is, the multi-television units $U_1$ and $U_2$) are connected to each other by the cable $M_{12}$. In addition, the IEEE1394 connector $C_R$ of the controlling television $230_{32}$ of the multi-television unit $U_2$ and the IEEE1394 connector $C_L$ of the controlling television $230_{33}$ of the multi-television unit $U_3$ (that is, the multi-television units $U_2$ and $U_3$) are connected to each other by the cable $M_{23}$.

Accordingly, for one television 230 in the multi-television system 221, there is a television 230 (direct-connection display device) that is directly connected to this one television 230 and a television 230 (indirect connection display device) that is indirectly connected to this one television 230. In addition, a controlling television 230 is connected to non-controlling televisions 230 in its own multi-television unit U, and is (can be) connected to a controlling television 230 of an adjacent multi-television unit U. The non-controlling televisions 230 are only connected to the controlling television 230 in their own multi-television unit U.

Figure 31:
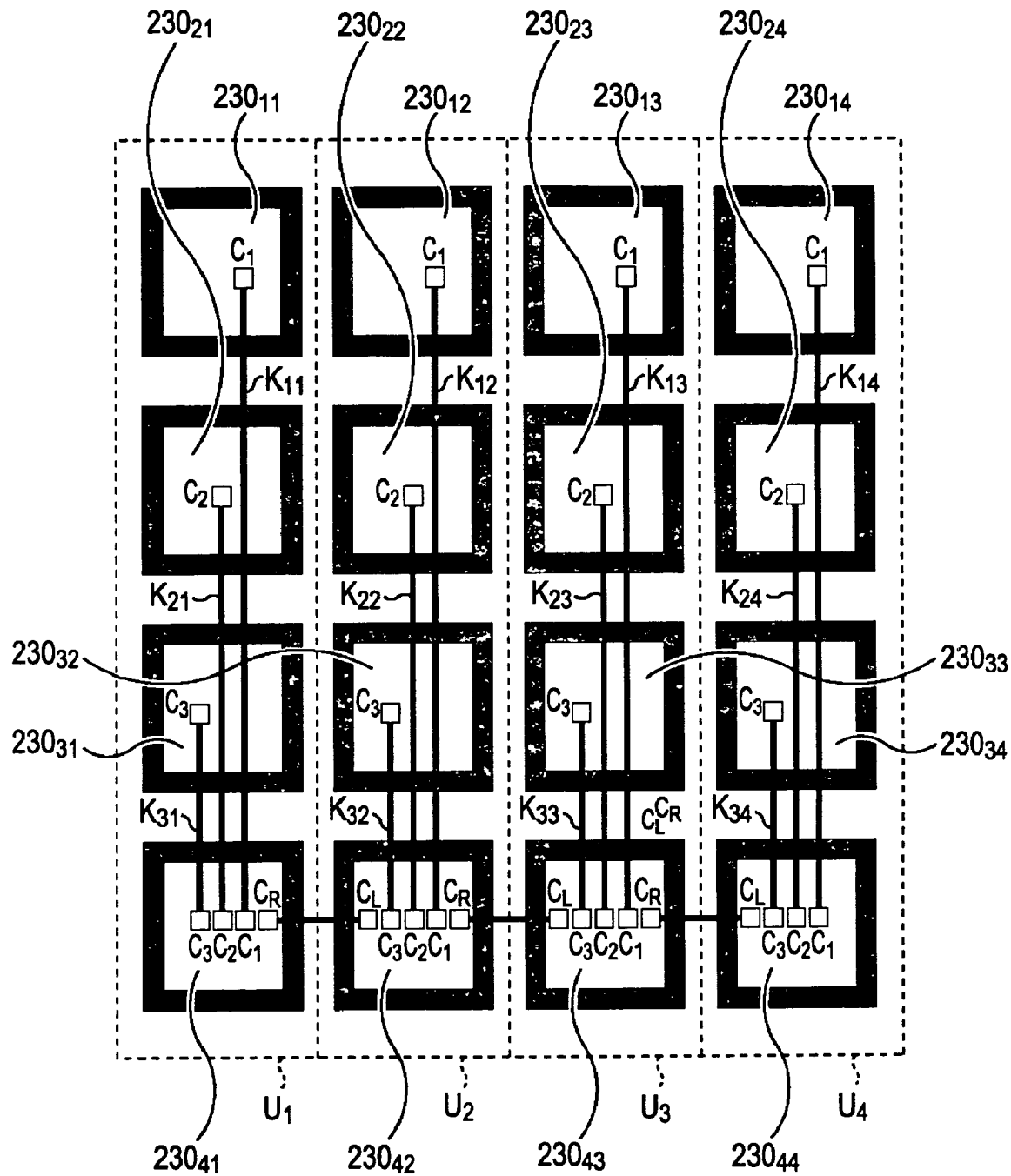
FIG. 31 shows an example of connections of IEEE1394 cables in a multi-television system 221.

FIG. 31 shows examples of connections of the IEEE1394 cables when the multi-television system 221 includes 16 televisions 230 shown in FIG. 22, and the multi-television units $U_1$ to $U_4$.

Any one of the eight IEEE1394 connectors $C_1$ to $C_8$ of the IEEE1394 connection portion 281 (FIG. 29) may be used for connecting the cables K of the multi-television system 221. In the embodiment, since the eight IEEE1394 connectors $C_1$ to $C_8$ are provided in the IEEE1394 connection portion 281, when a television 230 functions as a controlling device, a maximum of eight non-controlling televisions can be connected. However, the number of IEEE1394 connectors for connection to non-controlling televisions is not limited to eight, so that any number of them may be connected.

Electrical connection between the televisions 230 of the multi-television system 221 is not limited to the use of IEEE1394, so that, for example, LAN (IEEE802) may be used. In addition, the electrical connection between the televisions 230 of the multi-television system 211 may be a wired or a wireless connection.

When the televisions 230 in each multi-television unit U shown in FIG. 30 or FIG. 31 are connected by cables K, the controlling television 230 is informed about the positions of the non-controlling devices 230 with respect to the controlling television 230 in the multi-television unit U.

Figure 32:
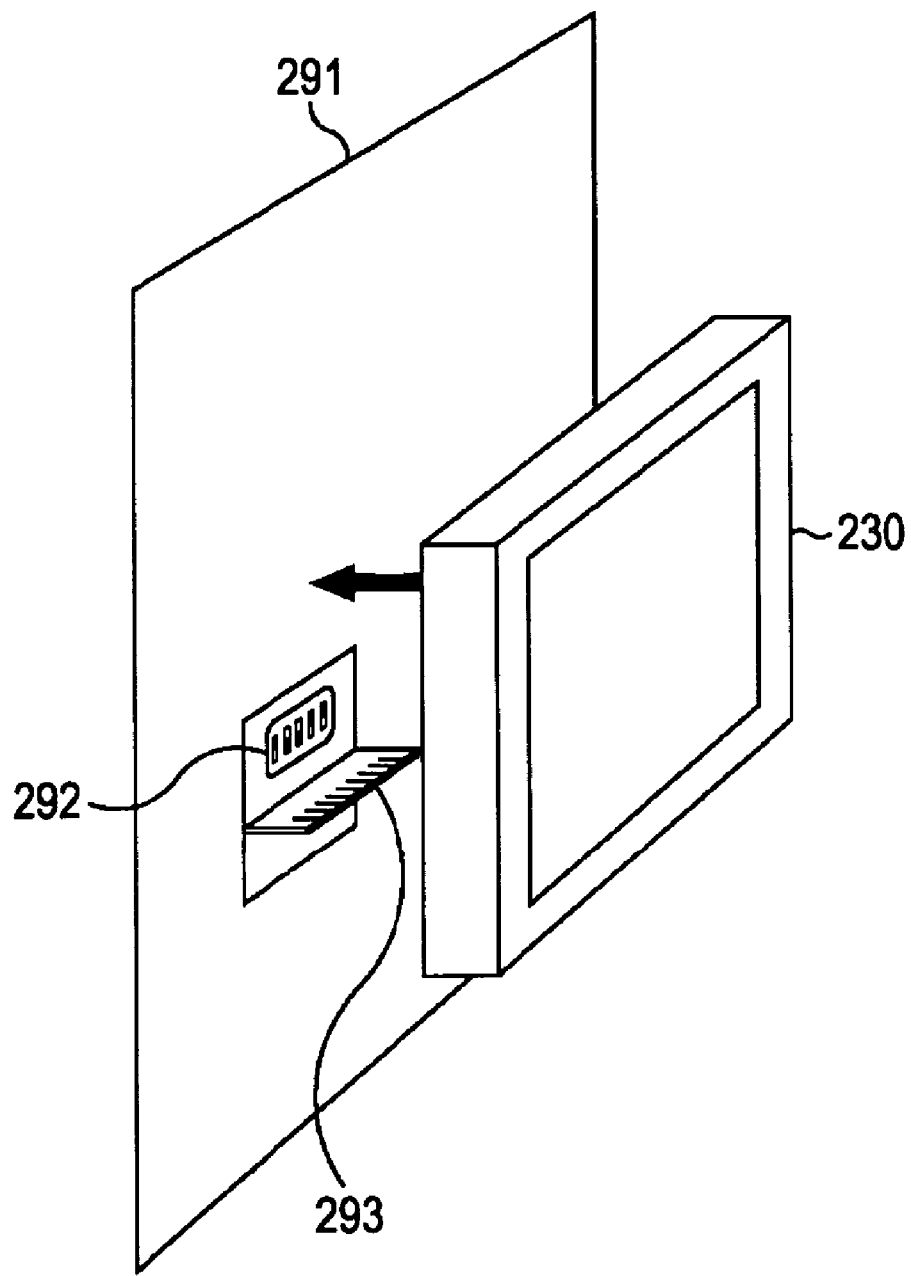
FIG. 32 illustrates a DIP switch 292 for obtaining positional information of a non-controlling device.

Accordingly, as shown in FIG. 32, in the multi-television system 221, positional information of each non-controlling television 230 in the multi-television unit U is previously set at a DIP switch 292 disposed at the rack 291 to which each non-controlling television 230 is secured. The positional information set here is information of the positions of the non-controlling devices 230 relative to the controlling television 230 in the multi-television unit U.

When each non-controlling television 230 is secured to the rack 291, the connector 282 (see FIG. 29) of each non-controlling television 230 and a connector 293 of the rack 291 contact each other, and each non-controlling television 230 reads the positional information set at the DIP switch 292 through the connectors 282 and 293. Then, each non-controlling television 230 sends (by IEEE1394 communication) the read positional information to its corresponding controlling television 230 through the cable K.

In addition to obtaining positional information (information regarding the position of each television 230 relative to the controlling device) using the DIP switch 292, it may also be obtained by causing each television 230 to perform non-contact communication with an IC tag mounted to the rack 291 and storing the positional information. Further, the positional information may also be obtained by, for example, wireless LAN.

Instead of receiving the positional information from each non-controlling television 230, the positional information of each non-controlling television 230 may be directly set at its corresponding controlling television 230.

With reference to the flowchart shown in FIG. 33, an operation of determining a disposition state that is performed by a controlling television 230 in a multi-television unit U will be described.

First, in Step S1, the position detector 251 detects a connector or connectors among the IEEE1394 connectors $C_1$ to $C_8$ to which the cable or cables K are connected. The position detector 251 obtains positional information from a non-controlling television or non-controlling televisions 230 connected to it (the controlling television 230). This causes the position detector 251 to determine the number of non-controlling televisions 230 in its own multi-television unit U and the positions of the non-controlling television or televisions 230 relative to the position detector 251, and the process proceeds to Step S2.

In Step S2, on the basis of the number of non-controlling devices and the position of the non-controlling device or devices determined in Step S1, the position detector 251 transmits the information regarding the structure of each television 230 (including itself) of its own multi-television unit U to another controlling television 230 connected to any one of the IEEE1394 connectors $C_R$, $C_L$, $C_U$, and $C_D$, and the process proceeds to Step S3.

In Step S3, the position detector 251 performs an operation for obtaining disposition information from another controlling television 230 connected to any one of the IEEE1394 connectors $C_R$, $C_L$, $C_U$, and $C_D$. This operation will be described in detail later with reference to FIG. 34. This operation allows the position detector 251 to obtain information (disposition information) regarding how many of and in what directions (rightward, leftward, upward, or downward) televisions 230 (other than those of its own multi-television unit U) are connected.

In Step S4, on the basis of the disposition information of the other multi-television unit or units U obtained in Step S3, the disposition of each television 230 in its own multi-television unit U (absolute position of each television 230 of its own multi-television unit U in the multi-television system 221) is calculated, and the process proceeds to Step S5.

In Step S5, the position detector 251 supplies to the controller 252 the disposition (absolute position) of its own television 230 in the multi-television system 221. The controller 252 causes the disposition to be stored in the storage section 253, and controls the image processor 256 so that it (television 230) displays a consistent image in terms of the multi-television system 221 as a whole. Then, process proceeds to Step S6.

In Step S6, the position detector 251 makes use of IEEE1394 communication to send to the non-controlling television or televisions 230 in its own multi-television unit U disposition information indicating where in the entire multi-television system 221 the non-controlling television or televisions 230 are disposed (absolute position or positions in the multi-television system 221), and the process ends.

Next, with reference to the flowchart in FIG. 34, an operation of obtaining disposition information that is performed in Step S2 in FIG. 33 will be described.

First, in Step S21, the position detector 251 determines whether or not a cable M is connected to the upper IEEE1394 connector $C_U$.

When, in Step S21, it determines that a cable M is not connected to the upper IEEE1394 connector $C_U$, the process proceeds to Step S22 in which the position detector 251 determines that its own multi-television unit U is the first multi-television unit from the top.

When, in Step S21, it determines that a cable M is connected to the upper IEEE1394 connector $C_U$, the process proceeds to Step S23 in which the position detector 251 communicates with the upper (controlling) television 230 connected to the upper IEEE1394 connector $C_U$ through the cable M to obtain information regarding the disposition of the upper multi-television unit U situated above its own multi-television unit U.

After Step S22 or Step S23, in Step S24, the position detector 251 determines whether or not a cable M is connected to the lower IEEE1394 connector $C_D$.

When, in Step S24, it determines that a cable M is not connected to the lower IEEE1394 connector $C_D$, the process proceeds to Step S25 in which the position detector 251 determines that its own multi-television unit U is the first multi-television unit from the bottom.

When, in Step S24, it determines that a cable M is connected to the lower IEEE1394 connector $C_D$, the process proceeds to Step S26 in which the position detector 251 communicates with the lower (controlling) television 230 connected to the lower IEEE1394 connector $C_D$ through the cable M to obtain information regarding the disposition of the lower multi-television unit U situated below its own multi-television unit U.

After Step S25 or Step S26, in Step S27, the position detector 251 determines whether or not a cable M is connected to the right IEEE1394 connector $C_R$.

When, in Step S27, it determines that a cable M is not connected to the right IEEE1394 connector $C_R$, the process proceeds to Step S28 in which the position detector 251 determines that its own multi-television unit U is the first multi-television unit from the right.

When, in Step S27, it determines that a cable M is connected to the right IEEE1394 connector $C_R$, the process proceeds to Step S29 in which the position detector 251 communicates with the right (controlling) television 230 connected to the right IEEE1394 connector $C_R$ through the cable M to obtain information regarding the disposition of the right multi-television unit U situated on the right of its own multi-television unit U.

After Step S28 or Step S29, in Step S30, the position detector 251 determines whether or not a cable M is connected to the left IEEE1394 connector $C_L$.

When, in Step S30, it determines that a cable M is not connected to the left IEEE1394 connector $C_L$, the process proceeds to Step S31 in which the position detector 251 determines that its own multi-television unit U is the first multi-television unit from the left.

When, in Step S30, it determines that a cable M is connected to the left IEEE1394 connector $C_L$, the process proceeds to Step S32 in which the position detector 251 communicates with the left (controlling) television 230 connected to the left IEEE1394 connector $C_L$ through the cable M to obtain information regarding the disposition of the left multi-television unit U situated on the left of its own multi-television unit U.

After Step S31 or Step S32, in Step S33, the position detector 251 determines whether or not the position is determined.

In the multi-television system 221, as shown in FIGS. 30 and 31, since each television 230 is connected in a cascade form, it takes a predetermined time to obtain information regarding the disposition of a multi-television unit U situated beyond the multi-television unit U which is directly connected to the television 230 of the position detector 251.

For example, in the multi-television system 221 shown in FIG. 30 including the nine televisions 230, in order for the television $230_{31}$, which is the controlling device of the multi-television unit $U_1$, to obtain accurate information regarding the disposition in the multi-television system 221, the television $230_{31}$ obtains both disposition information of the multi-television unit $U_3$ and disposition information of the multi-television unit $U_2$ from the television $230_{32}$ as a result of the television $230_{32}$ of the multi-television unit $U_2$ obtaining the disposition information from the television $230_{33}$ of the multi-television unit $U_3$. Therefore, when the controlling television 230 of each multi-television unit U starts performing the operation for obtaining disposition information at the same time, each controlling television 230 does not have accurate disposition information (that is, disposition information regarding all of the multi-television units U connected in a cascade form).

Consequently, in Step S33, for example, the aforementioned Steps S21 to S32 are repeated a plurality of times to determine that there is no longer a change in the disposition information that is being sent from an adjacent directly connected controlling television 230 or that a predetermined time (sufficient time for obtaining the disposition information of all of the multi-television units U connected in a cascade form) has elapsed. By this, the position detector 251 determines whether or not the position is determined. Then, when, in Step S33, the position detector 251 determines that the position has not yet been determined, the position detector 251 returns to Step S21 to repeat Steps S21 to S33.

Figure 33:
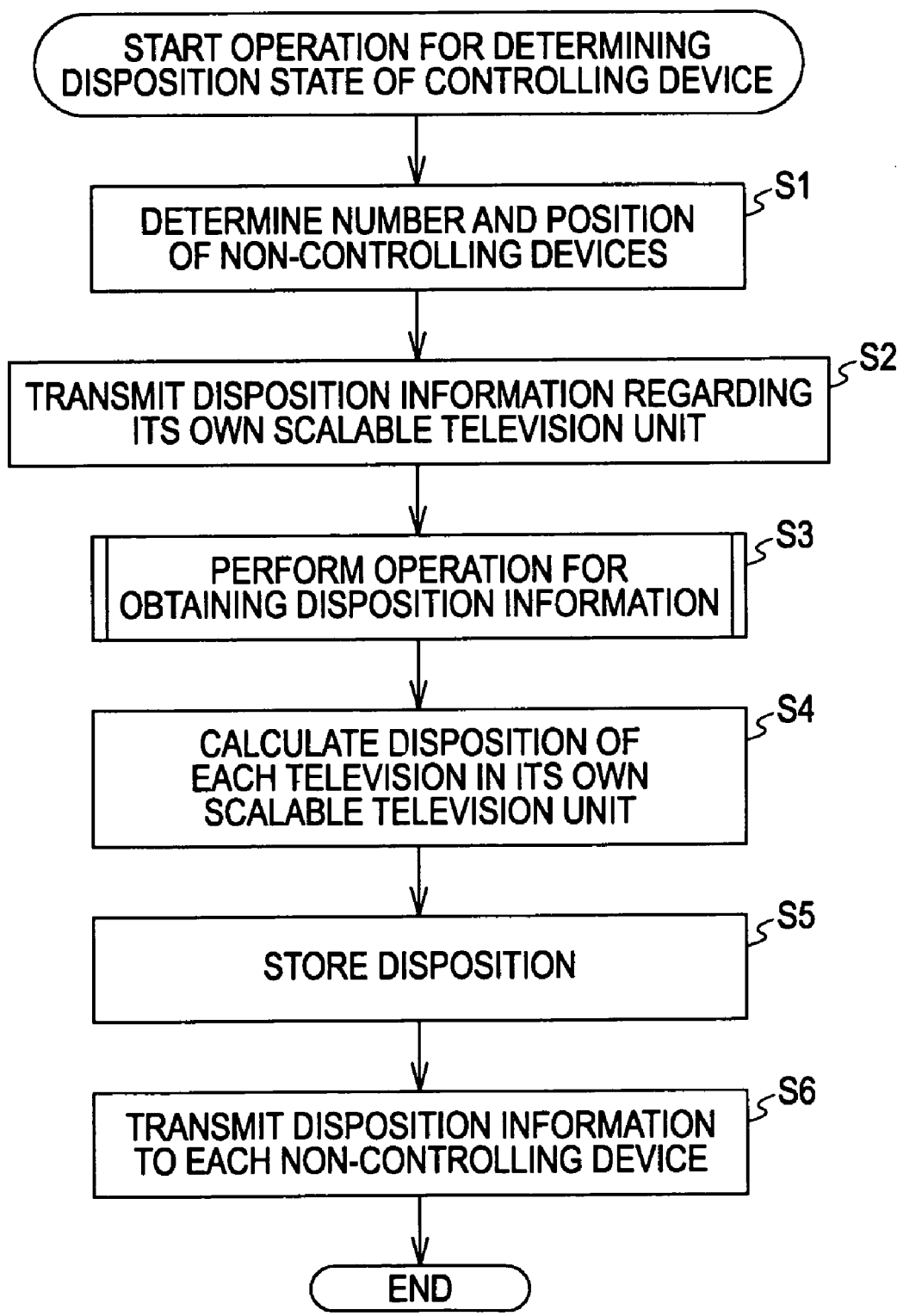
FIG. 33 is a flowchart describing an operation for determining a state of disposition of a controlling device.

In contrast, when, in Step S33, the position detector 251 determines that the position is determined, the position detector 251 returns to Step S3 illustrated in FIG. 33 and, then, proceeds to Step S4.

Next, an operation for determining a disposition state carried out by a/each non-controlling television 230 in a multi-television unit U will be described with reference to the flowchart of FIG. 35.

First, in Step S51, the position detector 251 sends to the controlling television 230 positional information of the non-controlling television or televisions obtained from the DIP switch 292 through the connectors 282 and 293.

In Step S52, the position detector 251 receives the disposition information from the controlling television 230, and the process proceeds to Step S53. Here, the disposition information sent from the controlling television 230 is, as mentioned above, information indicating where the non-controlling television or televisions 230 are disposed in the entire multi-television system 221.

In Step S53, the position detector 251 supplies the disposition information received in Step S52 to the controller 252.

In addition, in Step S53, the controller 252 causes the disposition information to be stored in the storage section 253 and controls the image processor 256 so that it (television 230) displays a consistent image in terms of the multi-television system 221 as a whole, and ends the process.

Figure 34:
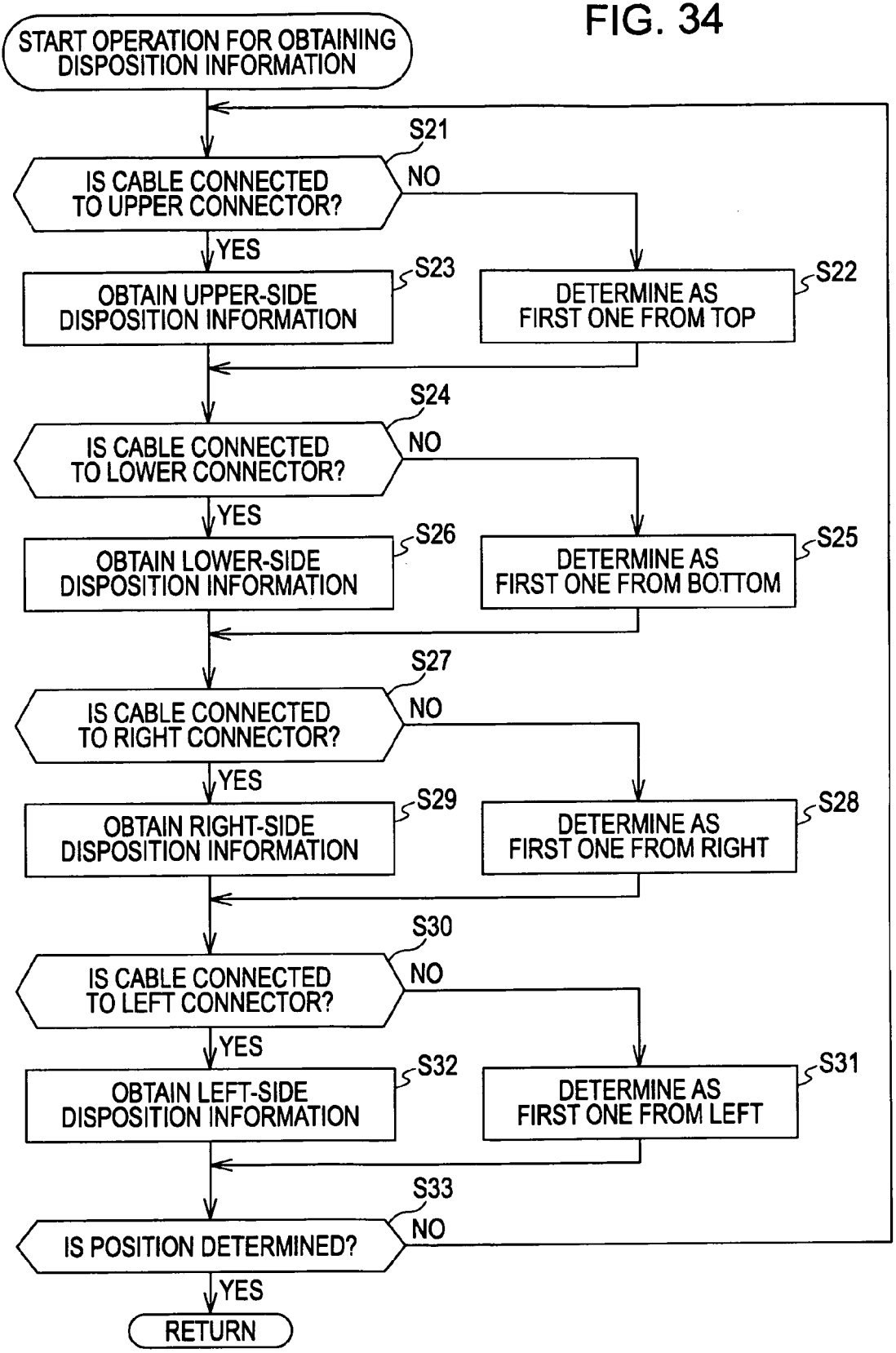
FIG. 34 is a flowchart describing an operation for communication of disposition information between controlling devices.
Figure 35:
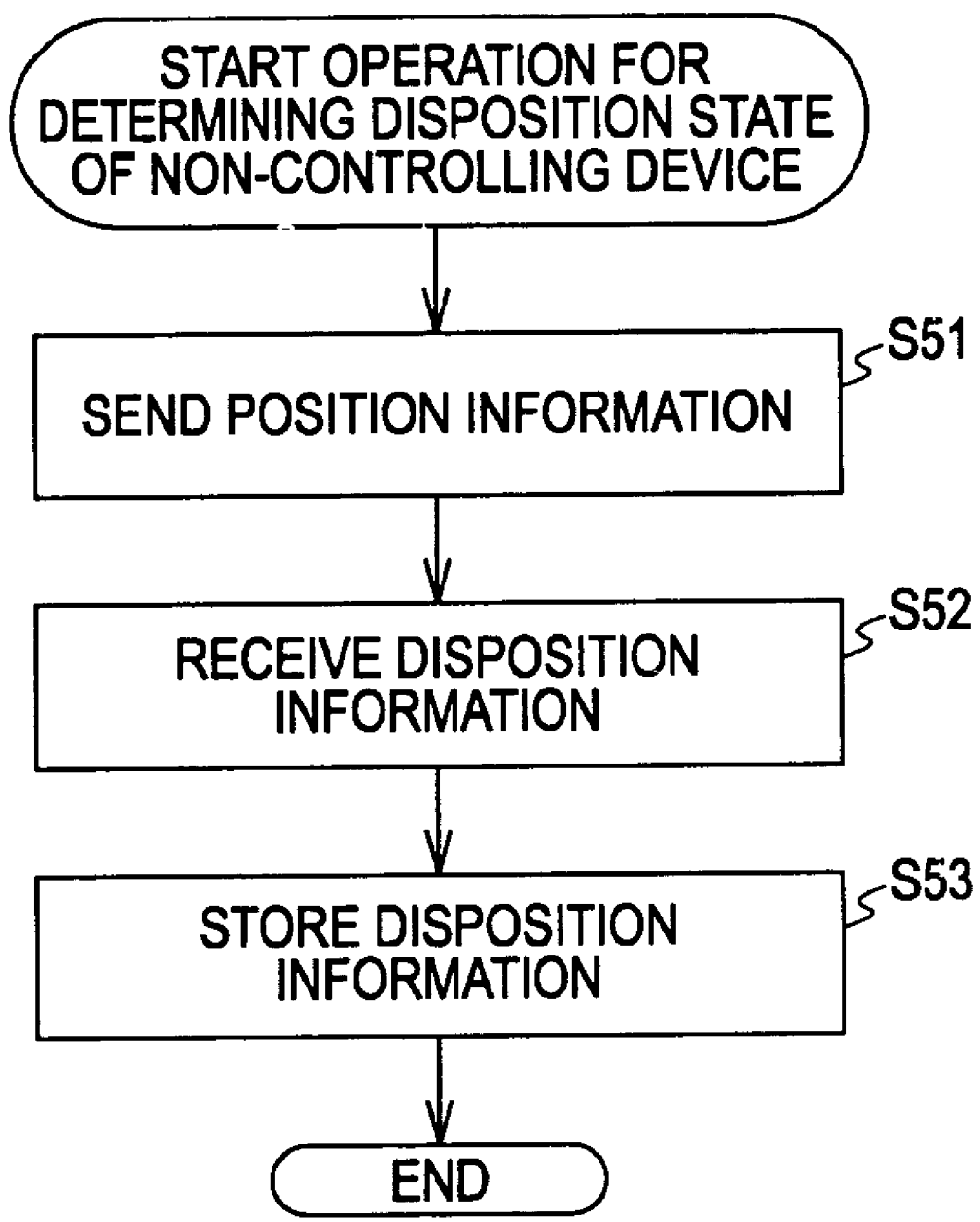
FIG. 35 is a flowchart describing an operation for determining a state of disposition of a non-controlling device.

As can be understood from the foregoing description, according to the operations for determining disposition states in FIGS. 33 to 35, when the position detector 251 of a controlling television 230 makes a detection as to whether or not another controlling television 230 is connected to any one of the IEEE1394 connectors $C_R$, $C_L$, $C_U$, and $C_D$, and detects that another controlling television 230 is connected to the IEEE1394 connectors $C_R$, $C_L$, $C_U$, or $C_D$, the position detector 251 obtains information (disposition information) regarding the structure of the television 230 disposed rightwards, leftwards, upwards, or downwards from itself (controlling television 230) from the television 230 directly connected to the IEEE1394 connector $C_R$, $C_L$, $C_U$, or $C_D$, and determines its position in the multi-television system 221.

When the position detector 251 of a controlling television 230 makes a detection as to whether or not a non-controlling television or non-controlling televisions are connected to any of the IEEE1394 connectors $C_1$ to $C_8$, and detects that a non-controlling television or televisions are connected to any of the IEEE1394 connectors $C_1$ to $C_8$, the position detector 251 obtains information regarding the position(s) of the non-controlling television(s) 23 relative to itself (the controlling television 230), and supplies the absolute position(s) of the non-controlling television(s) in the multi-television system 221 to the non-controlling television(s) 230 connected to any of the IEEE1394 connectors $C_1$ to $C_8$.

This makes it possible to easily determine where each television 230 is disposed in the entire multi-television system 221. In other words, it is possible to easily determine other display devices making up the multi-television system.

Figure 36:
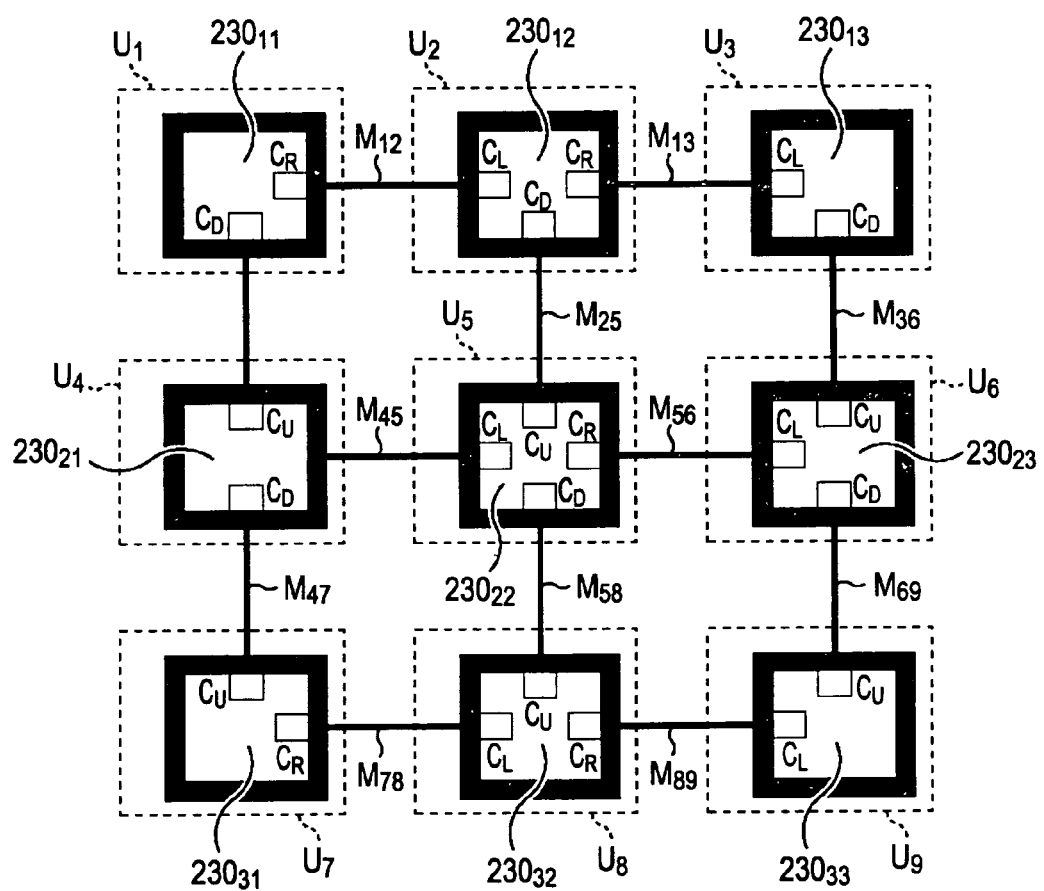
FIG. 36 shows another example of connections of IEEE1394 cables in a multi-television system 221.

As shown in FIG. 36, a multi-television system 221 may have a structure in which each multi-television unit U does not include a non-controlling television 230, that is, includes only controlling televisions 230. In this case, in the operations in FIGS. 33 to 35, the IEEE1394 communication between the controlling device and the corresponding non-controlling devices is omitted.

Figure 37A:
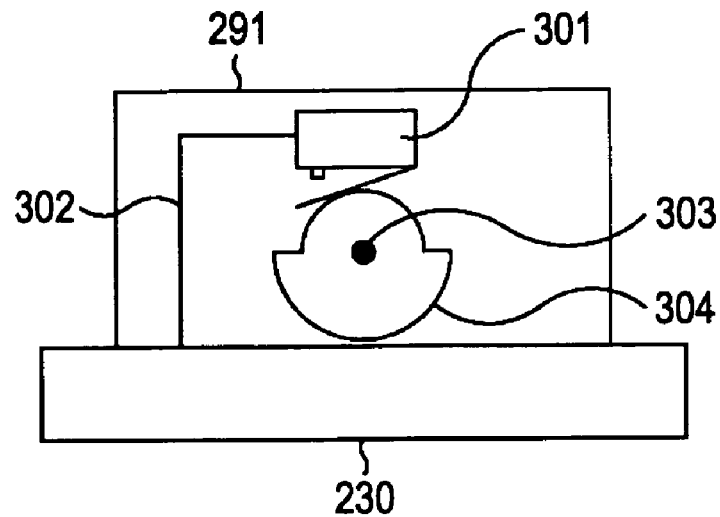
FIGS. 37A and 37B show an example of a structure for generating a rotation signal.
Figure 37B:
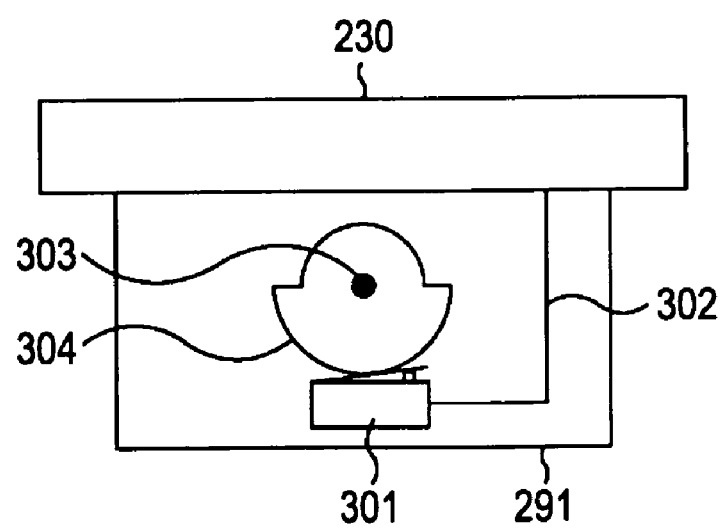

FIGS. 37A and 37B show an example of a structure for generating a rotation signal indicating a rotational state of a television 230 and input to the rotation detector 254. In addition, FIGS. 37A and 37B are each a top view of the television 230 and the rack 291 to which the television 230 is secured.

A microswitch 301 for generating the rotation signal indicating the rotational state of the television 230 is secured within the rack 291 to which the television 230 is secured. The rotation signal generated by the microswitch 301 is supplied to the position detector 251 of the television 230 by a signal cable 302.

The rack 291 to which the television 230 and the microswitch 301 are secured rotates clockwise or counterclockwise around a rotational shaft 303 as a center.

The microswitch 301 is in contact with a cam 304. As viewed from the top of the television 230, the cam 304 has a shape formed as if two semicircles having different radii are adhered together, with the upper half having a radius $R_A$ and the lower half having a radius $R_B$ ($>R_A$). In other words, as viewed from the top of the television 230, the cam 304 has a circular shape whose radius varies every 180 degrees.

By this, for example, as shown in FIG. 37A, when the television 230 is facing the front (one side), the microswitch 301 contacts the circumference of the semicircle having the radius $R_A$ of the cam 304, is turned off, and supplies to the rotation detector 254 an off signal (rotation signal) indicating that the television 230 is facing the front.

In contrast, when, as shown in FIG. 37B, the television 230 rotates through an angle of 180 degrees from the state shown in FIG. 37A, and faces the back (the other side), the microswitch 301 contacts the circumference of the semicircle having the radius $R_B$ of the cam 304, is turned on, and supplies to the rotation detector 254 an on signal (rotation signal) indicating that the television 230 is facing the back. Which of the off signal or the on signal is used as a rotational signal to indicate that the television 230 is facing the front or which of the off signal or the on signal is used as a rotational signal to indicate that the television 230 is facing the back can be appropriately changed (set) in the rotation detector 254.

As can be understood from the foregoing description, the rotation detector 254 receives the off signal or the on signal (rotation signal) supplied from the microswitch 301, and supplies to the controller 252 the result of determination of whether the television 230 is facing the front or the back.

Figure 38:
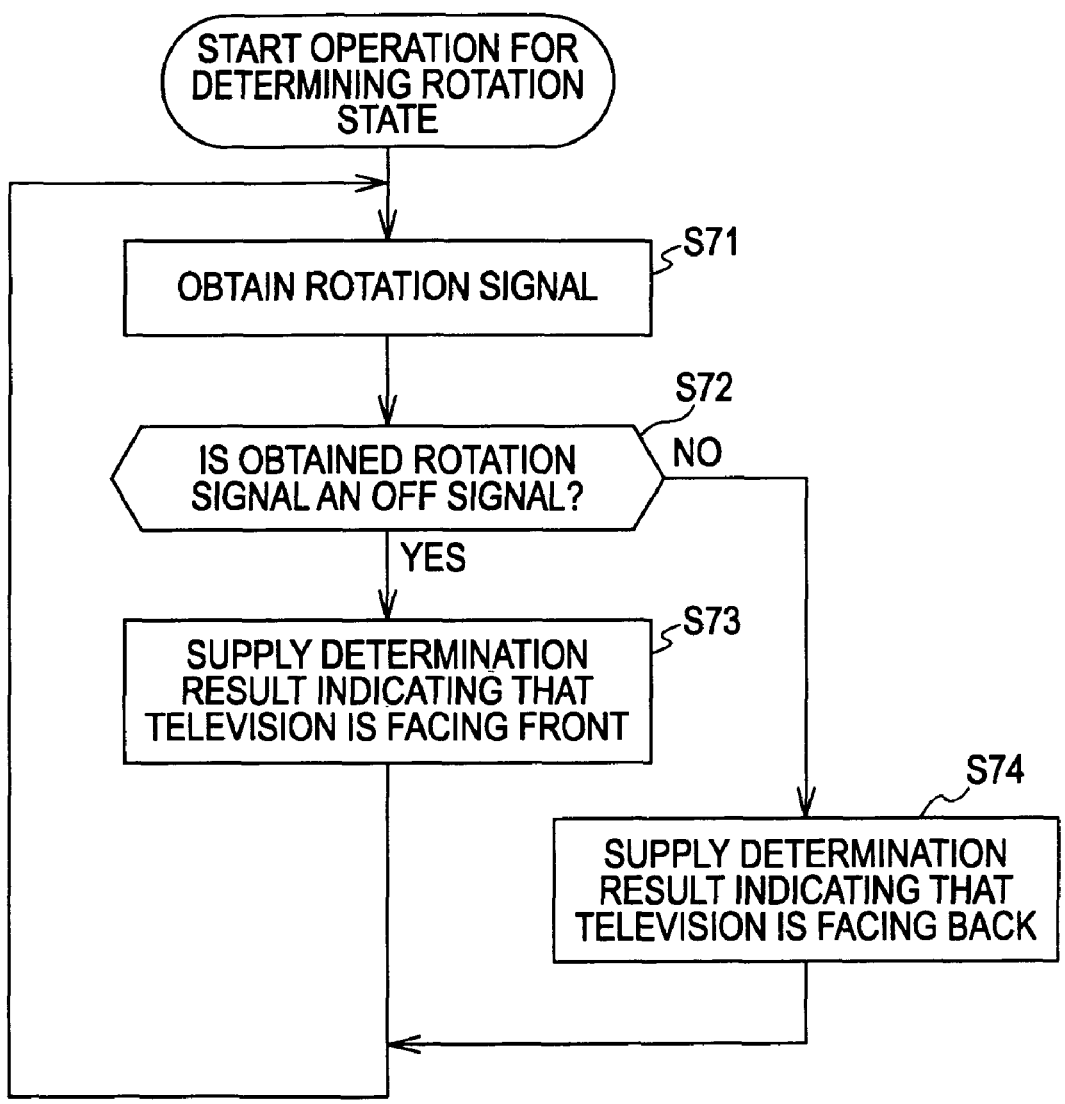
FIG. 38 is a flowchart describing an operation for determining a rotation state.

FIG. 38 is a flowchart describing an operation in which the television 230 determines its own rotation state. This operation is continuously executed when the power supply of the television 230 is turned on.

First, in Step S71, the rotation detector 254 obtains a rotational signal from the microswitch 301, and the process proceeds to Step S72.

In Step S72, the rotation detector 254 determines whether or not the obtained rotational signal is an off signal. When, in Step S72, the rotation detector 254 determines that the rotation signal it has received is an off signal, the process proceeds to Step S73 to supply to the controller 252 the result of the determination indicating that the television 230 is facing the front.

In contrast, when, in Step S72, the rotation detector 254 determines that the rotational signal it has obtained is an on signal, the process proceeds to Step S74 to supply to the controller 252 the result of the determination indicating that the television 230 is facing the back.

After Step S73 or Step S74, the process returns to Step S71, so that the operation is similarly repeated.

According to the operation illustrated in FIG. 38, the controller 252 can quickly and easily determine the rotation state of the television 230.

Hardware for supplying a rotational signal indicating the rotation state of the television 230 to the rotation detector 254 is not limited to the microswitch 301, so that, for example, a potentiometer or a rotary encoder may also be used.

Although, in the above-described position detector 251, the number of controlling televisions 230 of the entire multi-television system 221 is obtained as disposition information by the IEEE1394 communication illustrated in FIG. 34, it may also be obtained by hardware, such as a logical circuit.

Figure 39:
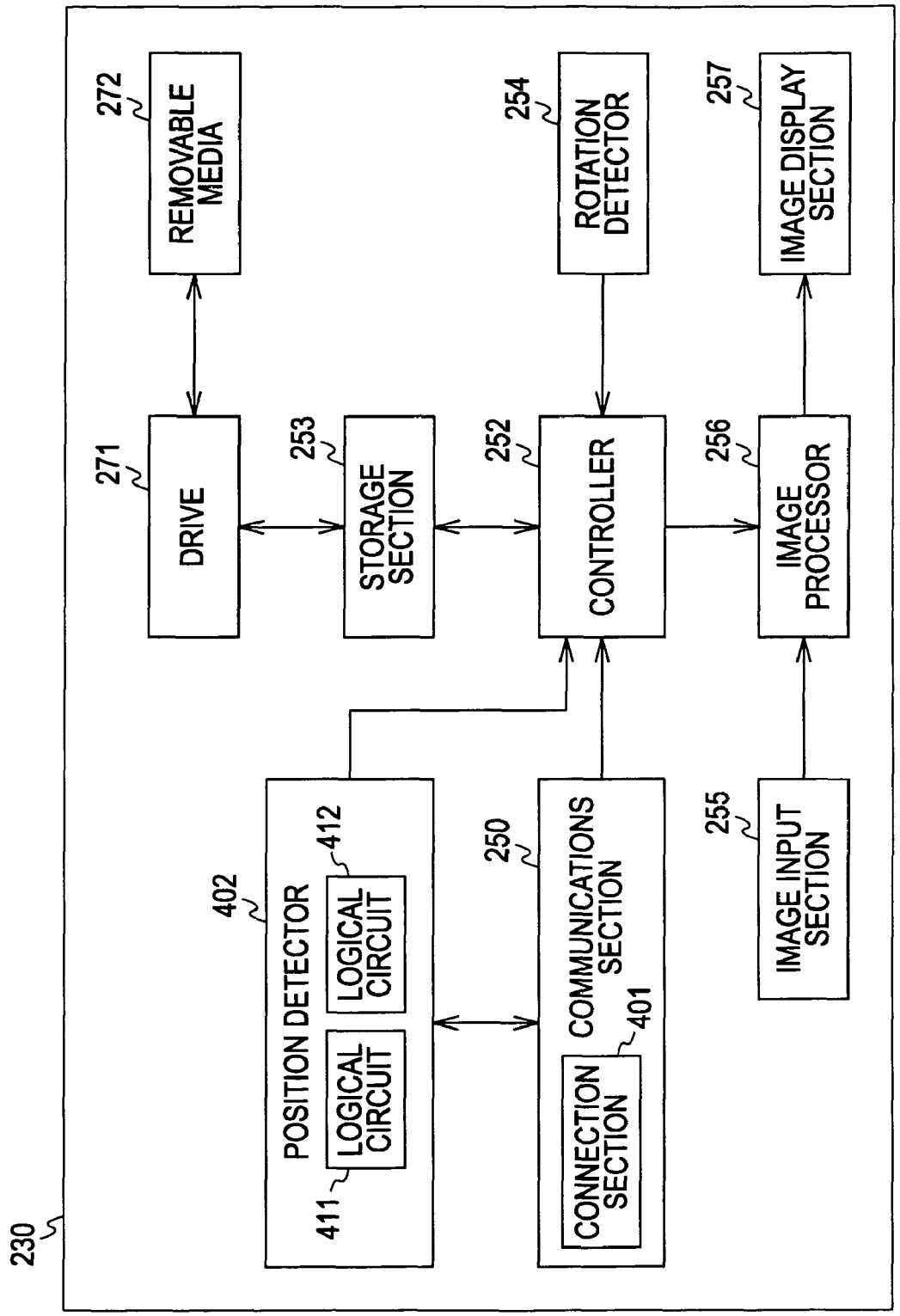
FIG. 39 is a block diagram showing another exemplary structure of a television 230.

FIG. 39 shows another exemplary structure of a television 230, in which the number of controlling televisions 230 in the entire television system 221 is detected by a logical circuit.

In FIG. 39, corresponding parts to those of the television 230 shown in FIG. 28 are given the same reference numerals and will not be described below.

The structural features shown in FIG. 39 differ from those shown in FIG. 28 in that a connection section 401 is provided in place of the connection section 261 shown in FIG. 28, and a position detector 402 is disposed instead of the position detector 251 shown in FIG. 28. The other structural features are the same.

The connection section 402 is structurally the same as the connection section 261 shown in FIG. 28 except that it includes connectors (such as connectors 451 and 452 shown in FIG. 40) for inputting and outputting signals (electrical signals) for logical circuits 411 and 412 that are disposed in the position detector 402.

The position detector 402 is structurally the same as the position detector 251 shown in FIG. 28 except that it includes the logical circuits 411 and 412. The logical circuit 411 counts the number of horizontally connected controlling televisions 230, and the logical circuit 412 counts the number of vertically connected controlling televisions 230.

Figure 40:
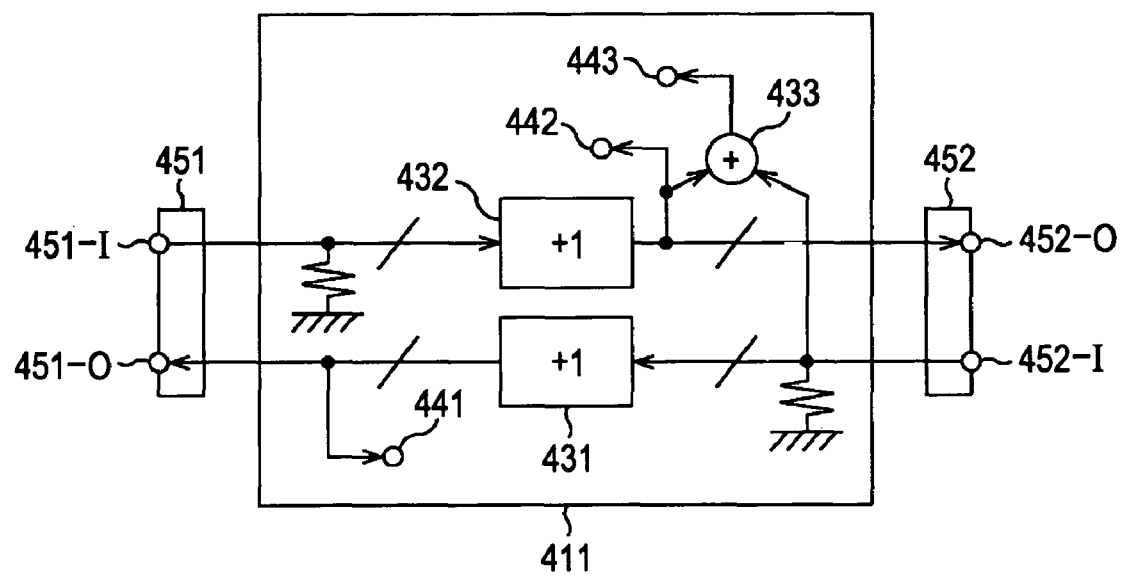
FIG. 40 illustrates a structure and an operation of a logical circuit 411.

With reference to FIG. 40, the structure and operation of the logical circuit 411 for transmitting a bit signal indicating the number of horizontally connected controlling televisions 230 will be described. The structure and operation of the logical circuit 412 that counts the number of vertically connected controlling televisions 230 are similar to those of the logical circuit 411.

The logical circuit (computing portion) includes counters 431 and 432 (first and second adding portions) an adder 433 (adding section), and terminals 441 to 443. The counters 431 and 432 count up input signals (bit signals) by an increment of 1. The adder 433 adds and outputs the two input signals. The terminals 441 to 443 take out the bit signals.

The logical circuit 411 processes the bit signals input to and output from the connector 451 or the connector 452 in the connection section 401 (refer to FIG. 39).

The connector 451 (first input/output portion) includes an input terminal 451-I and an output terminal 451-O, and is connected to a controlling television 230 of a left multi-television unit U. The connector 452 (second input/output portion) includes an input terminal 452-I and an output terminal 452-O, and is connected to a controlling television 230 of a right multi-television unit U.

A bit signal input from the controlling television 230 of the right multi-television unit U is supplied to the counter 431 and the adder 433 through the input terminal 452-I of the connector 452. This bit signal indicates the number of connected controlling devices on the right of their own multi-television unit U.

The counter 431 counts up the supplied bit signal by an increment of 1, and supplies the bit signal to the terminal 441 and the output terminal 451-O of the connector 451. By this, at the terminal 441, it is possible to obtain the number of controlling devices equal to the number of controlling devices on the right of its own multi-television unit U plus the one controlling device of its own multi-television unit U. In addition, it is possible to output the bit signal indicating the number of controlling devices equal to the number of connected controlling devices on the right of its own multi-television unit U plus the one controlling device of its own multi-television unit U to the controlling television 230 of the left multi-television unit U from the output terminal 451-O.

Similarly, a bit signal input from the controlling television 230 of the left multi-television unit U is supplied to the counter 432 through the input terminal 451-I of the connector 451. This bit signal indicates the number of connected controlling devices on the left of its own multi-television unit U.

The counter 432 counts up the supplied bit signal by an increment of 1, and supplies the bit signal to the adder 433, the terminal 442, and the output terminal 452-O of the connector 452. By this, at the terminal 442, it is possible to obtain the number of controlling devices equal to the number of connected controlling devices on the left of its own multi-television unit U plus the one controlling device of its own multi-television unit U. In addition, it is possible to output the bit signal indicating the number of controlling devices equal to the number of connected controlling devices on the left of its own multi-television unit U plus the one controlling device of its own multi-television unit U to the controlling television 230 of the right multi-television unit U from the output terminal 452-O.

The adder 433 adds the bit signal supplied from the input terminal 452-I and the bit terminal supplied from the counter 432, and supplies the added signals to the terminal 443. In other words, the adder 433 adds the number of connected controlling devices on the right of its own multi-television unit U and the number of controlling devices equal to the number of connected controlling devices on the left of its own multi-television unit U plus the controlling television of its own multi-television unit U, and supplies the result of addition to the terminal 443. By this, at the terminal 443, it is possible to obtain a bit signal indicating the number of controlling devices in the entire multi-television system 221. In other words, it is possible to detect (calculate) the total number of controlling devices in the entire multi-television system 221.

When nothing is connected to the connector 451 or the connector 452, that is, when an adjacent controlling television 230 is not connected, the bit signal of the input terminal 451-I or the input terminal 452-I indicates zero controlling devices by a load resistance.

Figure 41:
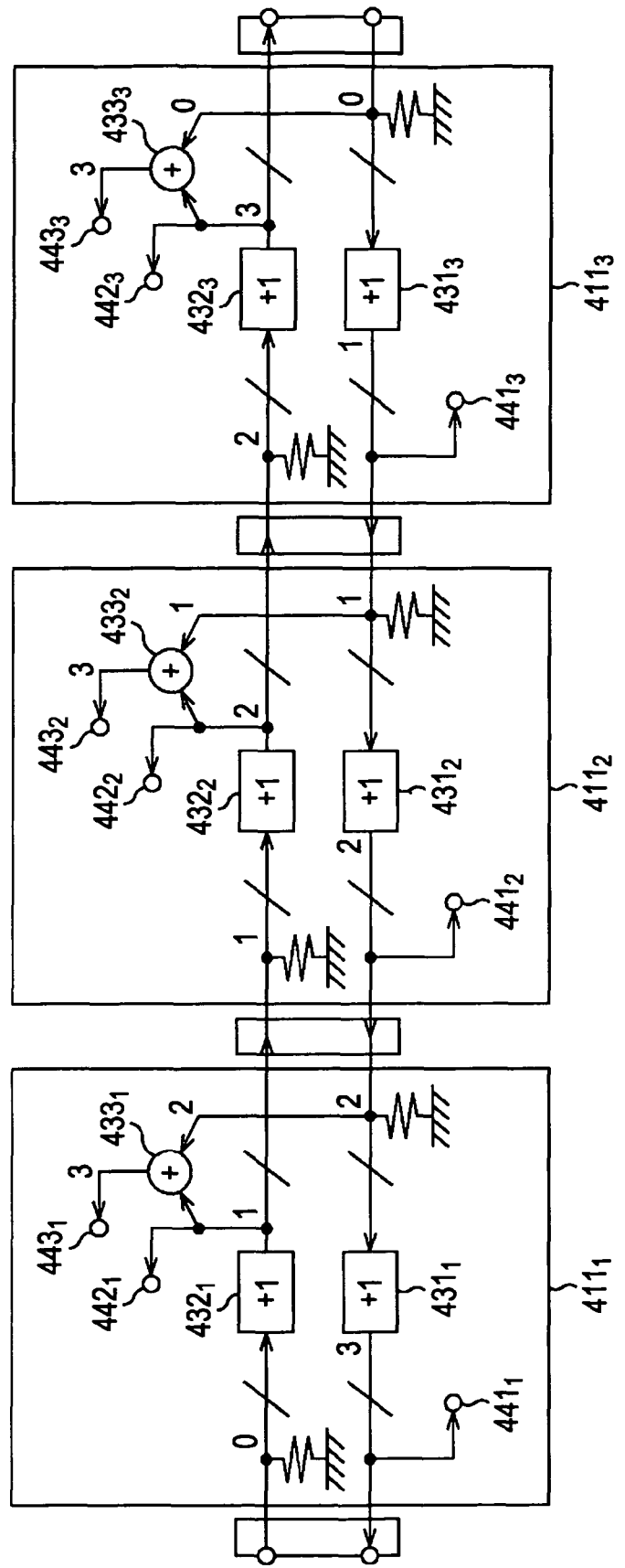
FIG. 41 shows an example of connections in logical circuits 411 when three controlling devices are connected to each other in a horizontal direction.

FIG. 41 shows an example of connections in logical circuits $411_1$ to $411_3$ and the results of calculation of bit signals, when controlling televisions 230 of three multi-television units U are connected to each other in a horizontal direction.

At terminals $443_1$ to $443_3$ of the logical circuits $411_1$ to $411_3$, as shown in FIG. 41, a bit signal indicating 3 as the number of controlling devices in the entire multi-television system 221 can be obtained.

The number of controlling televisions 230 that are disposed horizontally or vertically with respect to the certain television 230 can be detected by the logical circuit 411 (412) instead of by IEEE1394 communication. For example, as shown in FIG. 30 or FIG. 31, when the structures of the televisions of the multi-television units U are the same, the structure of the entire multi-television system 221 can be determined by detecting the number of controlling televisions 230 disposed horizontally or vertically.

In the specification, the steps illustrated in the flowcharts may be carried out in the illustrated order in a time series. If these steps are not carried out in a time series, they may be carried out in concurrently or individually.

In the specification, the term "system" refers to an entire apparatus including a plurality of devices.

According to the second embodiment of the present invention, it is possible to easily determine the other display devices making up the multi-television system.

It should be understood by those skilled in the art that various modifications, combinations, sub-combinations and alterations may occur depending on design requirements and other factors insofar as they are within the scope of the appended claims or the equivalents thereof.

What is claimed is:

1. A display device securing mechanism to which a plurality of display devices that are linearly disposed are mountable, the display device securing mechanism comprising:
   a plurality of housings stacked in a vertical direction with respect to each other and to which the plurality of display devices are mounted;
   first rotating means for respectively rotating the corresponding housings separately around a rotational axis extending in the vertical direction through the stacked plurality of housings;

second rotating means for rotating all of the housings together around the rotational axis extending in the vertical direction through the stacked plurality of housings; and a cylindrical member which is axially disposed in and extending through an interior of the plurality of housings in a direction in which the plurality of housings are disposed in a line such that the location of the cylindrical member coincides with the rotational axis and each of the plurality of housings are configured to rotate around the cylindrical member, the cylindrical member being secured to the second rotating means, and the cylindrical member being configured to rotate around the rotational axis when the second rotating means rotates all of the housings together around the rotational axis.

2. The display device securing mechanism according to claim 1, further comprising securing means for securing the display device securing mechanism to another display device securing mechanism adjacent thereto.

3. The display device securing mechanism according to claim 1, the cylindrical member having a wire disposed along an inner side thereof, the wire being connected to each of the plurality of display devices and being used to supply an image or a sound signal and electrical power that is supplied to the plurality of display devices, the wire passing through the second rotating means.

4. The display device securing mechanism according to claim 3, wherein the cylindrical member has openings in the corresponding housings for bringing out the wire which is connected to each display device and used for supplying the signal and the electrical power.

5. The display device securing mechanism according to claim 1, further comprising electrically conductive members each disposed in the corresponding housing and having a cylindrical shape that is coaxial with a rotary shaft of the corresponding housing, each electrically conductive member coming into contact with a wire at an inner side of the cylindrical shape and with a signal input terminal or a power-supply-receiving terminal of the corresponding display device at an outer side of the cylindrical shape, the wire being connected to each display device and used for supplying an image or a sound signal and electrical power which is supplied to each display device.

6. The display device securing mechanism according to claim 1, further comprising a distributor for distributing an image or a sound signal and electrical power that are supplied from another device to the plurality of display devices and to another display device securing mechanism that is adjacent to the display device securing mechanism.

7. A display system to which a plurality of display devices that are linearly disposed are mounted, the display system comprising:
the plurality of display devices;
a plurality of housings stacked in a vertical direction with respect to each other and to which the corresponding display devices are mounted;
first rotating means for respectively rotating the corresponding housings separately around a rotational axis extending in the vertical direction through the stacked plurality of housings;
second rotating means for rotating all of the plurality of housings together around a rotational axis extending in the vertical direction through the stacked plurality of housings; and a cylindrical member which is axially disposed in and extending through an interior of the plurality of housings in a direction in which the plurality of housings are disposed in a line such that the location of the cylindrical member coincides with the rotational axis and each of the plurality of housings are configured to rotate around the cylindrical member, the cylindrical member being secured to the second rotating means, and the cylindrical member being configured to rotate around the rotational axis when the second rotating means rotates all of the housings together around the rotational axis.

8. A display device securing mechanism to which a plurality of display devices that are linearly disposed are mountable, the display device securing mechanism comprising:
a plurality of housings stacked in a vertical direction with respect to each other and to which the plurality of display devices are mounted;
first rotating members which respectively rotate the corresponding housings separately around a rotational axis extending in the vertical direction through the stacked plurality of housings;
a second rotating member, comprising a bearing, which rotates all of the housings
a cylindrical member which is axially disposed in and extending through an interior of the plurality of housings in a direction in which the plurality of housings are disposed in a line such that the location of the cylindrical member coincides with the rotational axis and each of the plurality of housings are configured to rotate around the cylindrical member, the cylindrical member being secured to the second rotating member, and the cylindrical member being configured to rotate around the rotational axis when the second rotating member rotates all of the housings together around the rotational axis.

9. A display system to which a plurality of display devices that are linearly disposed are mounted, the display system comprising:
the plurality of display devices;
a plurality of housings stacked in a vertical direction with respect to each other and to which the corresponding display devices are mounted;
first rotating members which respectively rotate the corresponding housings separately around a rotational axis extending in the vertical direction through the stacked plurality of housings;
a second rotating member, comprising a bearing, which rotates all of the plurality of housings together around a rotational axis extending in the vertical direction through the stacked plurality of housings; and
a cylindrical member which is axially disposed in and extending through an interior of the plurality of housings in a direction in which the plurality of housings are disposed in a line such that the location of the cylindrical member coincides with the rotational axis and each of the plurality of housings are configured to rotate around the cylindrical member, the cylindrical member being secured to the second rotating member, and the cylindrical member being configured to rotate around the rotational axis when the second rotating member rotates all of the housings together around the rotational axis.

10. The display device securing mechanism according to claim 1, wherein the first rotating means is provided within at least one of the plurality of housings and allows the at least one of the plurality of housings to rotate around the rotational axis while the other of the plurality of housings do not rotate.

11. The display device securing mechanism according to claim 1, further comprising:

a display mount upon which the plurality of housings are mounted, the second rotating means being secured to the display mount such that all of the housings rotate together around the rotational axis when a force is applied to the display mount.

12. The display device securing mechanism according to claim 11, further comprising:

a distributor for distributing an image or a sound signal and electrical power to the plurality of display devices, wherein the display mount is disposed between the distributor and the plurality of housings.

* * * * *